US006847892B2

(12) United States Patent
Zhou et al.

(10) Patent No.: US 6,847,892 B2
(45) Date of Patent: Jan. 25, 2005

(54) SYSTEM FOR LOCALIZING AND SENSING OBJECTS AND PROVIDING ALERTS

(75) Inventors: Peter Y. Zhou, Riverside, CA (US); Dexing Pang, Riverside, CA (US); Yiu-Cho Alan Tong, Anaheim, CA (US); Ning Lin, Anaheim, CA (US); David Ralph Addington, Lake Elsinore, CA (US); Rowena Lampa Albanna, Riverside, CA (US); Amro Albanna, Riverside, CA (US); Keith I. Bolton, Parkland, FL (US)

(73) Assignee: Digital Angel Corporation, South St. Paul, MN (US)

( * ) Notice: Subject to any disclaimer, the term of this patent is extended or adjusted under 35 U.S.C. 154(b) by 0 days.

(21) Appl. No.: 10/169,477

(22) PCT Filed: Oct. 29, 2001

(86) PCT No.: PCT/US01/48539

§ 371 (c)(1),
(2), (4) Date: Dec. 17, 2002

(87) PCT Pub. No.: WO02/44865

PCT Pub. Date: Jun. 6, 2002

(65) Prior Publication Data

US 2003/0149526 A1 Aug. 7, 2003

(51) Int. Cl.[7] .............................................. G08B 23/00
(52) U.S. Cl. ...................... 701/213; 701/36; 340/426.1; 340/426.119; 342/357.07; 455/404.1
(58) Field of Search ................ 701/36, 213; 340/426.1, 340/426.12, 426.19, 989, 426, 425.5, 825.3; 342/357.07, 357, 450; 455/404.1, 521, 562.1, 277.1, 273

(56) References Cited

U.S. PATENT DOCUMENTS

| 4,163,447 | A | 8/1979 | Orr ............................ 600/479 |
| 4,468,656 | A | 8/1984 | Clifford et al. ......... 340/539.11 |
| 4,531,526 | A | 7/1985 | Genest ....................... 600/300 |
| 4,619,653 | A | 10/1986 | Fischell ................. 604/891.11 |
| 4,665,385 | A | 5/1987 | Henderson ............. 340/539.26 |
| 4,706,689 | A | 11/1987 | Man .......................... 600/302 |
| 5,043,736 | A | 8/1991 | Darnell et al. ........... 342/357.1 |
| 5,119,102 | A | 6/1992 | Barnard ................. 342/357.09 |
| 5,153,584 | A | 10/1992 | Engira .................... 340/870.18 |
| 5,204,670 | A | 4/1993 | Stinton ...................... 340/10.5 |
| 5,223,844 | A | 6/1993 | Mansell et al. |

(List continued on next page.)

Primary Examiner—Thomas G. Black
Assistant Examiner—Tuan C To
(74) Attorney, Agent, or Firm—Stroock & Stroock & Lavan LLP

(57) ABSTRACT

The present invention generally relates to systems, methods and applications utilizing the convergence of any combination of the following three technologies: wireless positioning or localization technology, wireless communications technology and sensor technology. In particular, certain embodiments of the present invention relate to a remote device that includes a sensor for determining or measuring a desired parameter, a receiver for receiving position data from the Global Positioning System (GPS) satellite system, a processor for determining whether or not alert conditions are present and a wireless transceiver for transmitting the measured parameter data and the position data to a central station, such as an application service provider (ASP). The ASP, in turn, may communicate the measured data, position data and notification of any alerts to an end user via an alert device. The present invention also relates to various applications and systems utilizing the capabilities of such a device.

1 Claim, 57 Drawing Sheets

U.S. PATENT DOCUMENTS

| | | |
|---|---|---|
| 5,235,633 A | 8/1993 | Dennison et al. ......... 455/456.3 |
| 5,299,132 A | 3/1994 | Wortham .................... 455/457 |
| 5,379,224 A | 1/1995 | Brown et al. ............... 701/215 |
| 5,389,934 A | 2/1995 | Kass ....................... 342/357.07 |
| 5,416,468 A | 5/1995 | Baumann ................. 340/573.1 |
| 5,418,537 A | 5/1995 | Bird ...................... 342/352.04 |
| 5,461,365 A | 10/1995 | Schlager et al. ......... 340/573.4 |
| 5,462,051 A | 10/1995 | Oka et al. .................... 600/300 |
| 5,481,245 A | 1/1996 | Moldavsky ................. 340/540 |
| 5,491,636 A * | 2/1996 | Robertson et al. .......... 342/357 |
| 5,519,403 A | 5/1996 | Bickley et al. ............. 342/352 |
| 5,519,760 A | 5/1996 | Borkowski et al. ...... 455/404.2 |
| 5,552,772 A | 9/1996 | Janky et al. ............. 340/573.4 |
| 5,557,254 A | 9/1996 | Johnson et al. |
| 5,565,858 A | 10/1996 | Guthrie ................... 380/10.33 |
| 5,587,715 A | 12/1996 | Lewis |
| 5,594,425 A | 1/1997 | Ladner et al. ......... 340/825.49 |
| 5,624,376 A | 4/1997 | Ball et al. ..................... 600/25 |
| 5,626,630 A | 5/1997 | Markowitz et al. ........... 607/60 |
| 5,629,678 A | 5/1997 | Gargano et al. ......... 340/573.4 |
| 5,630,206 A | 5/1997 | Urban et al. ............. 455/456.1 |
| 5,650,770 A | 7/1997 | Schlager et al. ......... 340/573.1 |
| 5,652,570 A | 7/1997 | Lepkofker ............... 340/573.4 |
| 5,686,888 A | 11/1997 | Welles, II et al. ...... 340/539.13 |
| 5,712,619 A | 1/1998 | Simkin ................... 340/539.13 |
| 5,714,931 A | 2/1998 | Petite et al. ........... 340/539.17 |
| 5,724,025 A | 3/1998 | Tavori .................... 340/573.1 |
| 5,729,199 A | 3/1998 | Cooper et al. ............... 340/541 |
| 5,742,233 A | 4/1998 | Hoffman et al. ......... 340/573.1 |
| 5,742,509 A | 4/1998 | Goldberg et al. ........... 701/211 |
| 5,748,147 A | 5/1998 | Bickley et al. ............. 342/457 |
| 5,751,246 A | 5/1998 | Hertel ................... 342/357.07 |
| 5,767,788 A | 6/1998 | Ness ..................... 340/828.49 |
| 5,771,001 A | 6/1998 | Cobb ...................... 340/573.1 |
| 5,772,586 A | 6/1998 | Heinonen et al. ........... 600/300 |
| 5,791,294 A | 8/1998 | Manning .................... 119/721 |
| 5,835,012 A | 11/1998 | Wilk ..................... 340/539.26 |
| 5,838,237 A | 11/1998 | Revell et al. ............ 340/573.1 |
| 5,874,897 A | 2/1999 | Klempau et al. ........ 340/573.1 |
| 5,892,454 A | 4/1999 | Schipper et al. ....... 340/825.37 |
| 5,905,450 A | 5/1999 | Kim et al. .................. 340/967 |
| 5,917,405 A * | 6/1999 | Joao .......................... 340/426 |
| 5,917,425 A | 6/1999 | Crimmins et al. ..... 340/825.49 |
| 5,939,982 A | 8/1999 | Gagnon et al. ........ 340/539.17 |
| 5,963,130 A | 10/1999 | Schlager et al. ............ 340/540 |
| 5,971,931 A | 10/1999 | Raff ........................... 600/485 |
| 5,977,913 A | 11/1999 | Christ ........................ 342/465 |
| 5,982,281 A | 11/1999 | Layson, Jr. ............ 340/539.13 |
| 6,026,304 A | 2/2000 | Hilsenrath et al. ....... 455/456.2 |
| 6,028,514 A | 2/2000 | Lemelson, deceased et al. ....... 340/539.13 |
| 6,031,454 A | 2/2000 | Lovejoy et al. ........ 340/539.24 |
| 6,034,622 A | 3/2000 | Levine .................... 340/573.4 |
| 6,046,687 A | 4/2000 | Janky ...................... 455/404.1 |
| 6,057,779 A | 5/2000 | Bates ........................ 340/5.21 |
| 6,067,007 A * | 5/2000 | Gioia ......................... 340/426 |
| 6,069,570 A | 5/2000 | Herring ................... 340/572.1 |
| 6,072,396 A | 6/2000 | Gaukel .................... 340/573.1 |
| 6,078,804 A | 6/2000 | Alperovich et al. ... 340/539.11 |
| 6,084,512 A | 7/2000 | Elberty et al. ............. 701/213 |
| 6,121,881 A | 9/2000 | Bieback et al. ........ 342/457.07 |
| 6,127,925 A | 10/2000 | Bonsignore et al. ... 342/357.08 |
| 6,131,067 A | 10/2000 | Girerd et al. ............... 701/208 |
| 6,140,956 A | 10/2000 | Hillman et al. ........ 342/357.07 |
| 6,140,957 A | 10/2000 | Wilson et al. ......... 342/357.08 |
| 6,148,261 A | 11/2000 | Obradovich et al. ........ 701/208 |
| 6,154,676 A | 11/2000 | Levine ........................ 607/58 |
| 6,157,841 A | 12/2000 | Bolduc et al. ........... 455/456.5 |
| 6,160,478 A | 12/2000 | Jacobsen et al. ....... 340/539.12 |
| 6,160,481 A | 12/2000 | Taylor, Jr. ................ 340/573.4 |
| 6,166,627 A * | 12/2000 | Reeley ....................... 340/426 |
| 6,166,642 A | 12/2000 | Farshid .................... 340/573.1 |
| 6,167,276 A | 12/2000 | Pite ........................ 455/456.3 |
| 6,169,484 B1 | 1/2001 | Schuchman et al. ..... 340/573.1 |
| 6,172,640 B1 | 1/2001 | Durst et al. ............ 342/357.07 |
| 6,175,308 B1 | 1/2001 | Tallman et al. ........ 340/539.11 |
| 6,198,394 B1 | 3/2001 | Jacobsen et al. ....... 340/573.01 |
| 6,198,930 B1 | 3/2001 | Schipper .................. 340/573.1 |
| 6,199,550 B1 | 3/2001 | Wiesmann et al. ......... 455/440 |
| 6,208,290 B1 | 3/2001 | Krasner ................. 342/357.05 |
| 6,211,781 B1 | 4/2001 | McDonald .................. 340/505 |
| 6,219,556 B1 | 4/2001 | Lee ......................... 455/456.4 |
| 6,225,901 B1 | 5/2001 | Kail, IV ................ 340/534.11 |
| 6,236,358 B1 | 5/2001 | Durst et al. ............ 342/352.09 |
| 6,253,129 B1 | 6/2001 | Jenkins et al. |
| 6,263,280 B1 | 7/2001 | Stingone, Jr. |
| 6,300,903 B1 | 10/2001 | Richards et al. ............ 342/450 |
| 6,313,791 B1 | 11/2001 | Klanke .................. 342/357.17 |
| 6,421,001 B1 | 7/2002 | Durst et al. ............ 342/357.07 |
| 6,433,677 B1 * | 8/2002 | Flick ......................... 340/426 |
| 6,587,040 B2 * | 7/2003 | Seto ......................... 340/426.1 |
| 6,697,810 B2 * | 2/2004 | Kumar et al. ................ 707/10 |
| 6,703,930 B2 * | 3/2004 | Skinner ................. 340/539.11 |
| 2001/0026240 A1 * | 10/2001 | Neher ................... 342/357.07 |

* cited by examiner

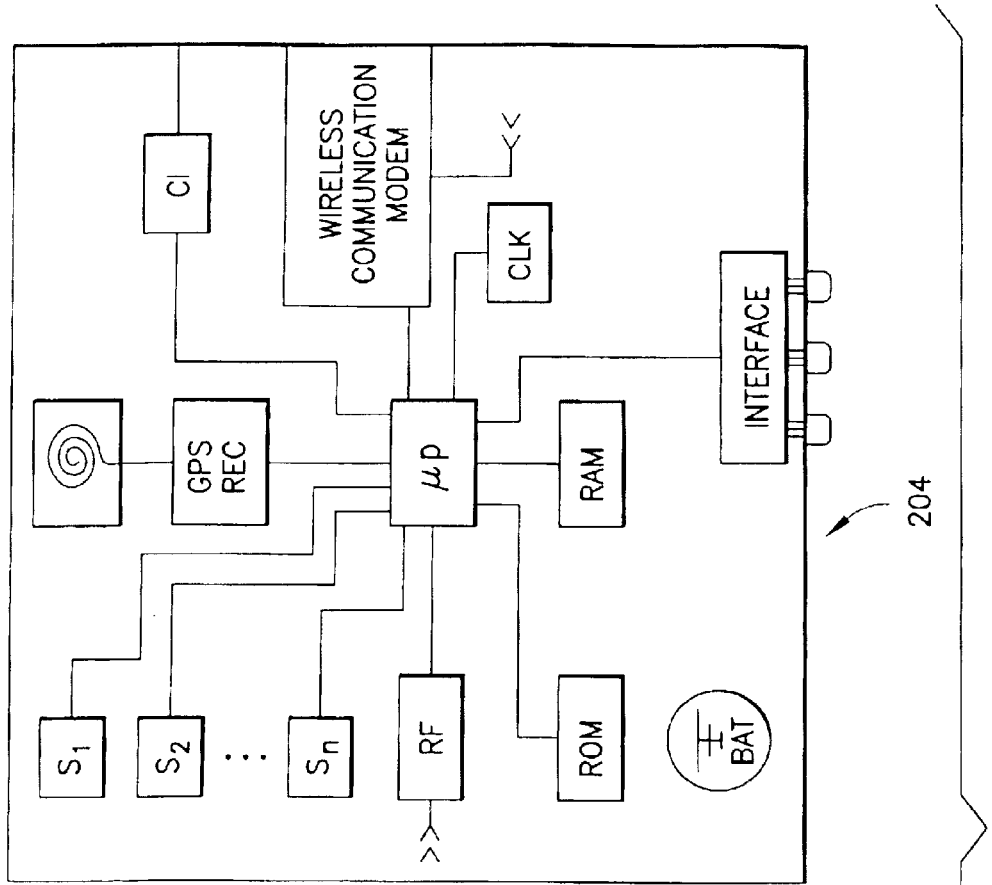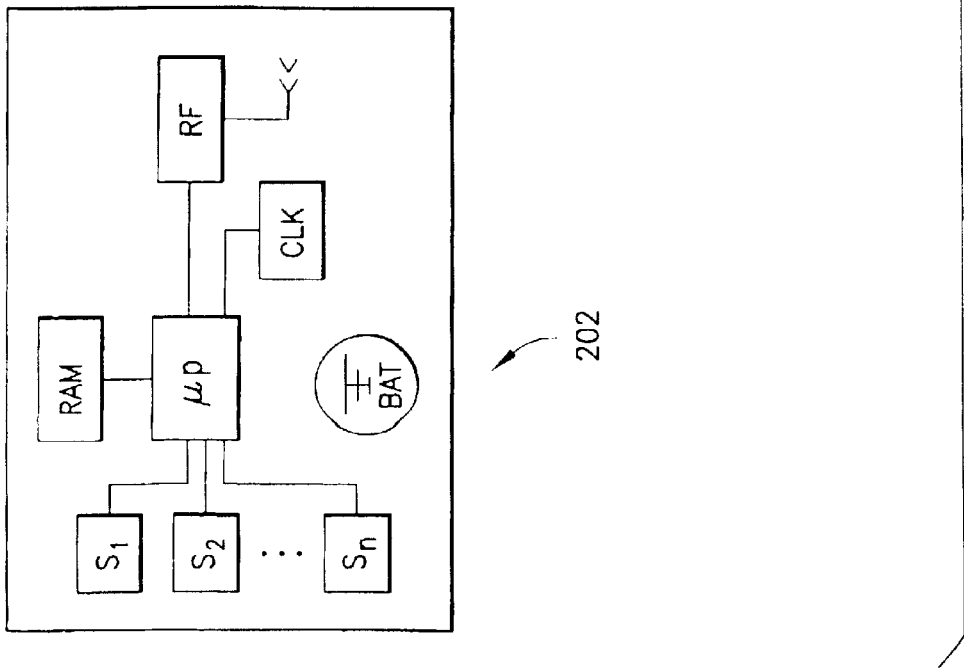
FIG.2a

| tblDevice_log_values | | | |
|---|---|---|---|
| Column Name | Data Type | Length | Allow Null |
| ⚷ Idevice_log_values_id | int | 4 | |
| Idevice_parameters_id | int | 4 | |
| sparameter_value | varchar | 50 | |
| Idevice_log_id | int | 4 | |

| tblparameter_value_type | | | |
|---|---|---|---|
| Column Name | Data Type | Length | Allow Null |
| ⚷ Iparameter_value_type_id | int | 4 | |
| sparameter_value_type_description | varchar | 10 | |

| FIG.3c-1 | FIG.3c-2 |
|---|---|

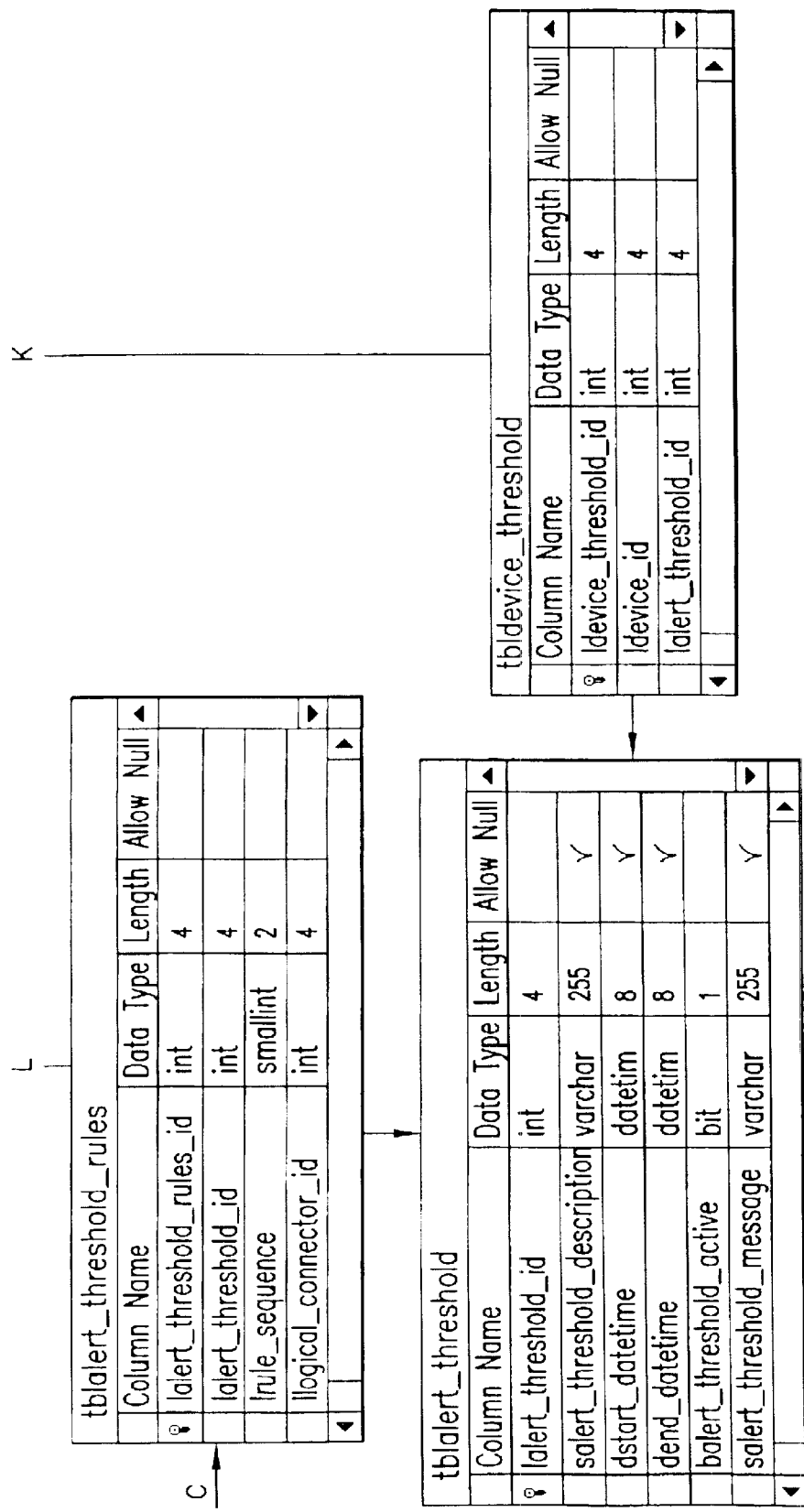

tblaccount_user

| Column Name | Data Type | Length | Allow Null |
|---|---|---|---|
| laccount_user_id | int | 4 | |
| luser_id | int | 4 | |
| laccount_id | int | 4 | |

— P tblgroup_user

| Column Name | Data Type | Length | Allow Null |
|---|---|---|---|
| lgroup_user_id | int | 4 | |
| luser_id | int | 4 | |
| lgroup_id | int | 4 | |

— Q

FIG.3f–2 tblnotification_type

| Column Name | Data Type | Length | Allow Null |
|---|---|---|---|
| 🔑 lnotification_type_id | int | 4 | |
| snotification_type_description | varchar | 100 | ✓ |
| bneed_response | bit | 1 | ✓ |
| lresponse_timeout | int | 4 | ✓ | tblPrimKeys

| Column Name | Data Type | Length | Allow Null |
|---|---|---|---|
| 🔑 ID | int | 4 | |
| TableName | varchar | 50 | ✓ |
| LastID | int | 4 | ✓ |

FIG.3i tblcurrent_db_version

| Column Name | Data Type | Length | Allow Null |
|---|---|---|---|
| major | int | 4 | ✓ |
| minor | int | 4 | ✓ |
| revision | int | 4 | ✓ |
| comments | text | 16 | ✓ | tblnotification

| Column Name | Data Type | Length | Allow Null |
|---|---|---|---|
| Inotification_id | int | 4 | |
| Inotification_type_id | int | 4 | |
| dnotification_datetime | datetime | 8 | ✓ |
| snotification_content | varchar | 255 | ✓ |
| snotification_message | varchar | 100 | ✓ |
| inotification_status | int | 4 | ✓ |
| idevice-id | int | 4 | |
| icontact_pos | int | 4 | ✓ |

FIG.3j

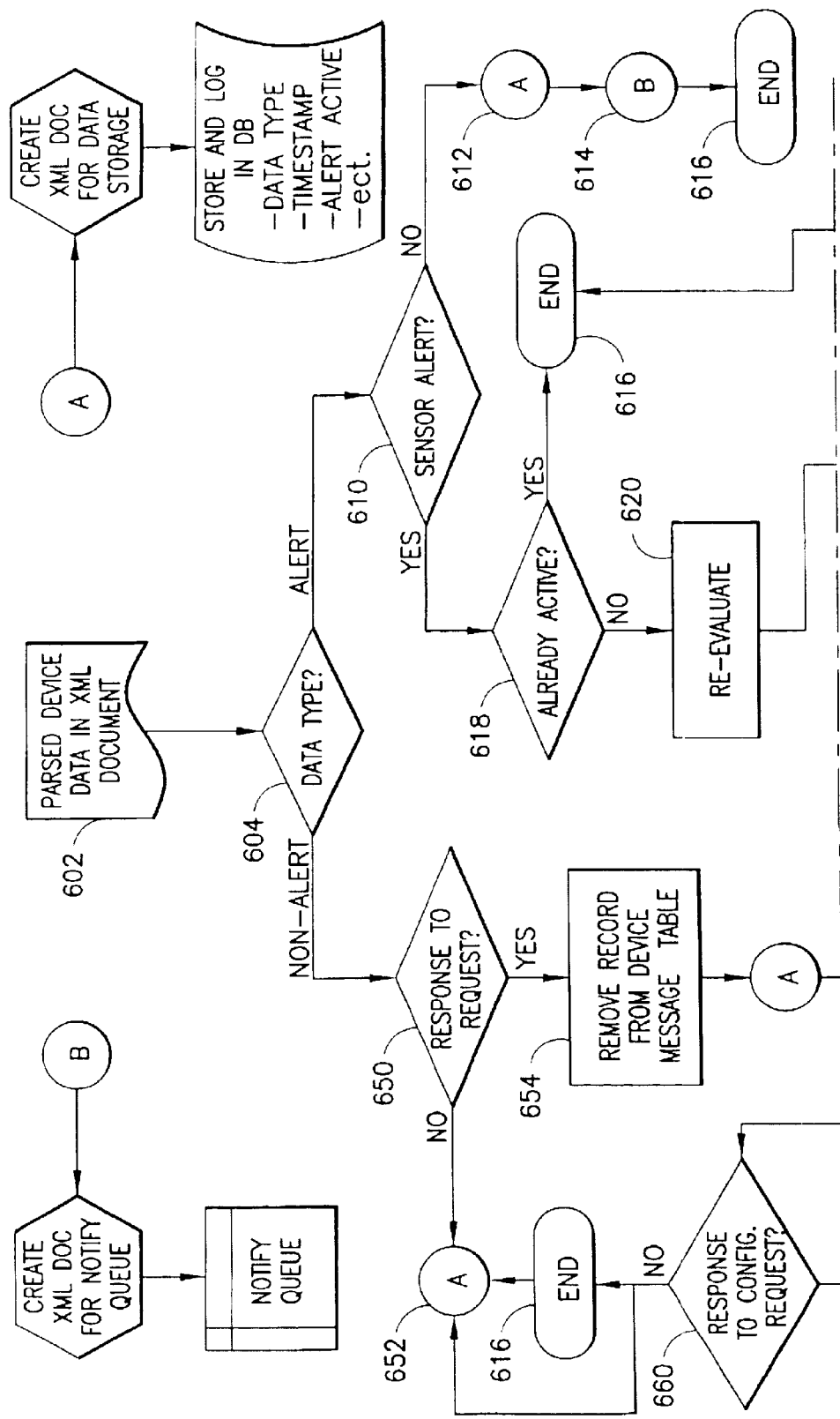

STDP-1 PROTOCOL

| ID | NAME | DESCRIPTION | LENGTH (BYTE) | ATTRIB. | NOTES | |
|----|------|-------------|---------------|---------|-------|---|
| 1 | TOP | HEADER | 2 | HEX | AA55H | |
| 2 | CONTROL1 | CONTROL BYTE | 1 | HEX | CENTER CONTROL COMMAND | 00H |
| | | | | | DEVICE REGISTER | 01H |
| | | | | | ASP'S ACK | 10H |
| | | | | | DEVICE'S ACK | 20H |
| | | | | | EMERGENCY CALL | 02H |
| | | | | | DEVICE DATA | 0FH |
| | | | | | LOW VOLTAGE ALARM | 1FH |
| | | | | | FALL DOWN ALARM | 2FH |
| | | | | | POSITION RANGE ALARM | 4FH |
| | | | | | TEMP. RANGE ALARM | 8FH |
| 3 | DATA LENGTH1 | DATA LENGTH | 2 | HEX | DATA1 | |
| 4 | DATA1 | DATA AREA | DATA LENGTH | | 0-65535 BYTE | |
| 5 | CRC | CRC | 1 | | CONTROL1=DATA LENGTH1+DATA1 XOR | |
| 6 | MESSAGE ID | ID | 1 | HEX | | |
| 7 | END | TAILOR | 2 | HEX | CC33H | |

FIG.8b

STDP-2 PROTOCOL

| ID | NAME | DESCRIPTION | LENGTH (BYTE) | ATTRIB. | NOTES | |
|---|---|---|---|---|---|---|
| 1 | CONTROL2 | CONTROL | 1 | HEX | RESERVED | 00H |
| | | | | | GPS DATA | 02H |
| | | | | | TEMP. DATA | 03H |
| | | | | | FALL DOWN DATA | 04H |
| | | | | | PRE-SET CENTER CALL COMMAND | 01H |
| | | | | | PRE-SET TIME CALL COMMAND | 05H |
| | | | | | PRE-SET POSITION RANGE ALARM COMMAND | 06H |
| | | | | | PRE-SET FALL DOWN ALARM COMMAND | 07H |
| | | | | | PRE-SET TEMP. RANGE ALARM COMMAND | 08H |
| | | | | | RESERVED | 09H-FFH |
| 2 | DATA LENGTH2 | DATA LENGTH | 1 | HEX | DATA2 | |
| 3 | DATA2 | DATA AREA | DATA LENGTH | | 0-255 BYTE | |

FIG.8c

STDP-3 PROTOCOL

| ID | COMMAND | FORMAT | LENGTH (BYTE) | ATTRIB. | NOTES |
|---|---|---|---|---|---|
| 1 | GPS DATA | ddmm.mmmm, N(S), ddmm.mmmm, E(W) hhmmss, A(V) | 33 | ASCII | ddmm.mmmm LATITUDE<br>ddmm.mmmm LONGITUDE<br>N=NORTH S=SOUTH<br>E=EAST W=WEST<br>hhmmss HOUR/MINUTE/SECOND<br>A: GPS DATA VALID<br>V: GPS DATA INVALID<br>dd/ddd: DEGREE<br>mm.mmmm: MINUTE |
| 2 | TEMP. DATA | TTTDDD | 6 | TTT-ASCII DDD-HEX | TTT ASCII CODE INDICATES TT.T DEGREE CELSIUS, WHEN TTT=AAA, TEMPERATURE DATA INVALID.<br><br>DDD 3 BYTE HEX NUMBER, THE WATCH ID FROM 0 TO 3FFFFFH (4,194,303) |
| 3 | FALL DOWN DATA | X | 1 | HEX | 00H FALL DOWN<br>01H NORMAL |

FIG.8d-1

| FIG.8d-1 |
| FIG.8d-2 |
| FIG.8d-3 |

| | | | | |
|---|---|---|---|---|
| 4 | PRE-SET CENTER CALL COMMAND | CenCall XX | 10 | ASCII | XX: ANY ASCII CODE, TERMINAL DEVICE IGNORES |
| 5 | PRE-SET TIME CALL COMMAND | TimeCall XXX | 12 | ASCII | XXX: 3 ASCII CODE: THE TIME INTERVAL BETWEEN CALLS FROM THE CENTER IN MINUTES. WHEN XXX=000, THE CALL TERMINATES. MAXIMUM INTERVAL IS 255 MINUTES. |
| 6 | PRE-SET POSITION RANGE ALARM COMMAND | AAAAFBBBBGCC CCHDDDDIT | 21 | | AAAA (4 BYTE): LATITUDE OF THE UPPER LEFT CORNER. F (1 BYTE): NORTH/SOUTH (N/S) DIRECTION OF THE LATITUDE OF THE UPPER LEFT CORNER. BBBB 4 BYTE: LONGITUDE OF THE UPPER LEFT CORNER. G (1 BYTE): EAST/WEST (E/W) DIRECTION OF THE LONGITUDE OF THE UPPER LEFT CORNER. CCCC (4 BYTE): LATITUDE OF THE LOWER RIGHT CORNER. H (1 BYTE): NORTH/SOUTH (N/S) DIRECTION OF THE LATITUDE OF THE LOWER RIGHT CORNER. DDDD (4 BYTE): LONGITUDE OF THE LOWER RIGHT CORNER. I (1BYTE): EAST/WEST (E/W) DIRECTION OF THE LONGITUDE OF THE LOWER RIGHT CORNER. T=1, AREA ALARM CALL STARTS. T=0, AREA ALARM CALL TERMINATES. |

FIG.8d-2

| | | | | |
|---|---|---|---|---|
| 7 | PRE-SET FALL DOWN ALARM COMMAND | X | 1 | HEX | X=0, FALL DOWN ALARM TERMINATES<br>X=1, FALL DOWN ALARM STARTS |
| 8 | PRE-SET TEMPERATURE RANGE ALARM COMMAND | MMNN | 4 | ASCII | MM: TEMPERATURE UPPER LIMIT IN CELSIUS, MM<=60C<br>NN: TEMPERATURE LOWER LIMIT IN CELSIUS, NN>=0C<br>MM=NN TERMINATES TEMPERATURE RANGE ALARM |

NOTE

AAAA AND CCCC (4 BYTES) ARE LATITUDE
BBBB AND DDDD (4 BYTES) ARE LONGITUDE

THE FIRST BYTE IS DEGREE, SECOND BYTE IS MINUTE, THE THIRD AND FOURTH BYTE ARE FRACTIONAL PART OF MINUTE

LATITUDE

| 0 | 1 | 2 | 3 |
|---|---|---|---|
| dd | mm | mm | mm |

LONGITUDE

| 0 | 1 | 2 | 3 |
|---|---|---|---|
| ddd | mm | mm | mm |

FIG.8d-3

| ID | STDP-1 CONTROL1 FIG.8b | STDP-2. DATA1 | | DIRECTION | ANSWER REQUESTED | NOTES |
|---|---|---|---|---|---|---|
| | | STDP-2 CONTROL2 FIG.8c | STDP-2. DATA2 (STDP-3 ID) FIG.8d | | | |
| 1 | 00H | 01H | 4 | ASP TO DEVICE | YES | PRE-SET CENTER CALL COMMAND SET BY ASP |
| 2 | | 05H | 5 | ASP TO DEVICE | YES | PRE-SET TIME CALL COMMAND SET BY ASP |
| 3 | | 06H | 6 | ASP TO DEVICE | YES | PRE-SET POSITION RANGE COMMAND SET BY ASP |
| 4 | | 07H | 7 | ASP TO DEVICE | YES | PRE-SET FALL DOWN COMMAND SET BY ASP |
| 5 | | 08H | 8 | ASP TO DEVICE | YES | PRE-SET TEMP RANGE ALARM COMMAND SET BY ASP |
| 6 | 10H | NULL | | ASP TO DEVICE | NO | ASP REPLIES TO DEVICE MESSAGE |
| 7 | 20H | NULL | | DEVICE TO ASP | NO | DEVICE REPLIES TO ASP MESSAGE |

FIG.8e-1

| FIG.8e-1 |
|---|
| FIG.8e-2 |

| | | | | |
|---|---|---|---|---|
| 8 | 02H | 02H | 1 | DEVICE TO ASP | YES | EMERGENCY CALLS FROM DEVICE |
| | | 03H | 2 | | | |
| 9 | 0FH | 02H | 1 | DEVICE TO ASP | YES | GENERAL DATA MESSAGE FROM DEVICE |
| | | 03H | 2 | | | |
| 10 | 1FH | NULL | | DEVICE TO ASP | NO | LOW VOLTAGE ALARM MESSAGE |
| 11 | 2FH | NULL | | DEVICE TO ASP | YES | FALL DOWN ALARM MESSAGE FROM DEVICE |
| 12 | 4FH | 02H | 1 | DEVICE TO ASP | YES | POSITION RANGE ALARM MESSAGE FROM DEVICE |
| | | 03H | 2 | | | |
| 13 | 8FH | NULL | | DEVICE TO ASP | YES | TEMPERATURE ALARM MESSAGE FROM DEVICE |
| 14 | 01H | NULL | | DEVICE TO ASP | NO | DEVICE REGISTER COMMAND |

FIG.8e-2

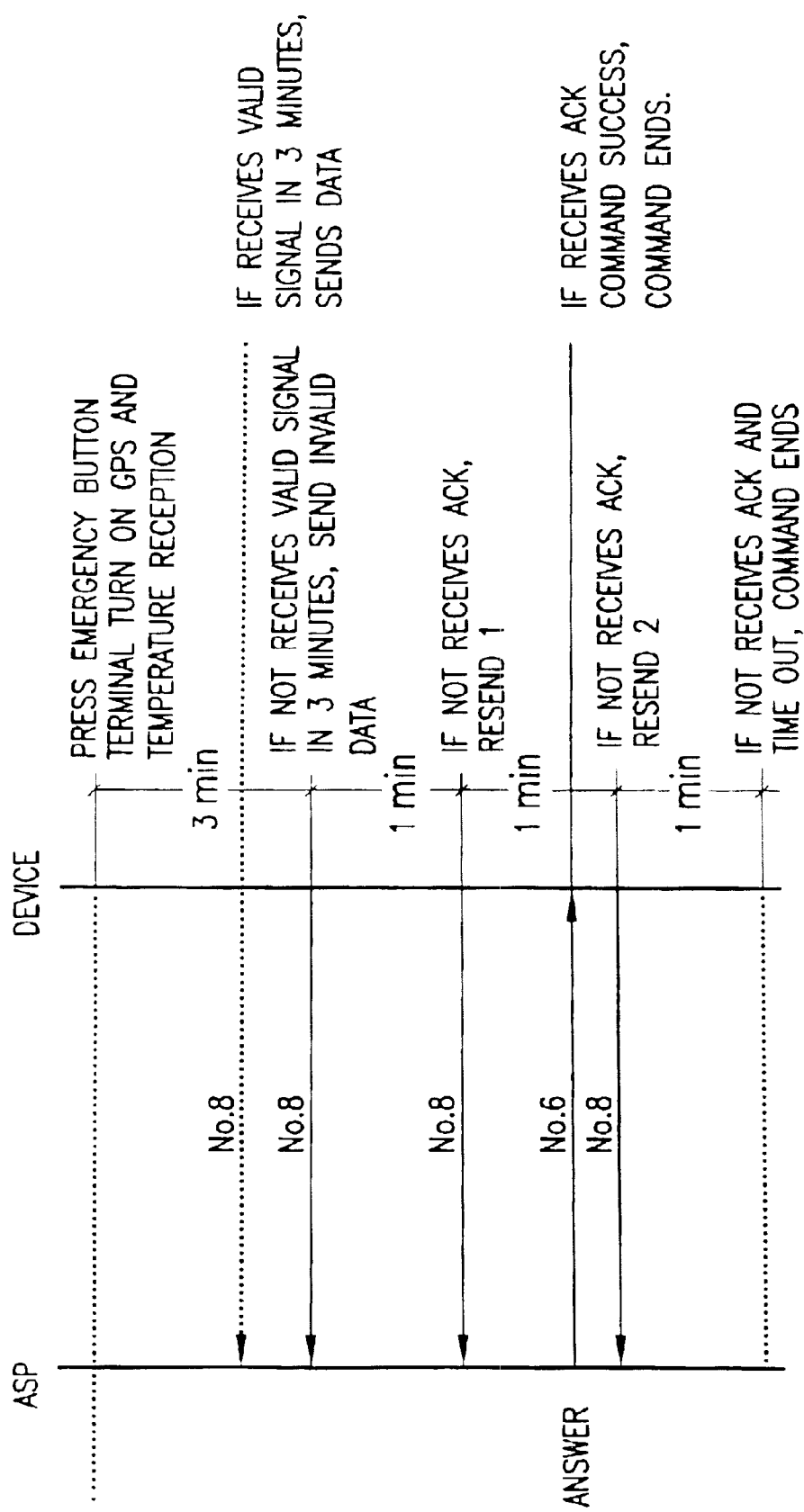

SYSTEM FOR LOCALIZING AND SENSING OBJECTS AND PROVIDING ALERTS

RELATED U.S. PATENT APPLICATIONS

This application claims the benefit under 35 U.S.C. §365 (c) of International Application No. PCT/US01/48539, filed Oct. 29, 2001, entitled SYSTEMS AND METHODS FOR MONITORING AND TRACKING and published in English under Publication No. WO 02/44865, which claims the benefit under 35 U.S.C. §365(c) of: U.S. application Ser. No. 60/243,915, filed Oct. 27, 2000; U.S. application Ser. No. 60/250,347, filed Nov. 30, 2000; U.S. application Ser. No. 09/813,477, filed Mar. 21, 2001, which is a continuation of U.S. application Ser. No. 09/608,095, filed on Jun. 30, 2000, which is now abandoned; and U.S. application Ser. No. 09/820,551, filed on Mar. 29, 2001, which is a continuation of U.S. application Ser. No. 09/608,913, filed on Jun. 30, 2000, which is now abandoned, all of which are hereby incorporated herein by reference.

BACKGROUND OF THE INVENTION

1. Field of the Invention

In general, the present invention relates to systems and methods for monitoring and tracking individuals and objects and to business applications utilizing such systems and methods.

2. Description of Related Art

Various systems for localizing and sensing animate and inanimate objects are known in the art. Such systems, however, are generally inflexible and inefficient. More specifically, existing systems suffer from being incapable of being efficiently utilized for multiple business application having different types of remote monitoring needs and devices. Furthermore, many such systems are generally incapable of generating alert messages based on both simple and complex alert parameters. As such, there exists a need for improved localization and sensing system having a flexible structure.

SUMMARY OF THE INVENTION

The present invention satisfies the foregoing and other needs. Embodiments of the invention generally relate to systems, methods and applications utilizing the convergence of any combination of the following three technologies: wireless positioning or localization technology, wireless communications technology and sensor technology. In particular, certain embodiments of the present invention relate to a remote device that includes a sensor for determining or measuring a desired parameter, a receiver for receiving position data from the Global Positioning System (GPS) satellite system, a processor for determining whether or not one or more alert conditions are satisfied and a wireless transceiver for transmitting the measured parameter data and the position data to a central station, such as an application service provider (ASP). The ASP, in turn, may communicate the measured data, position data and notification of any alerts to an end user via an alert device. The present invention also relates to various applications, systems and methods utilizing one or more of the capabilities of such a device.

BRIEF DESCRIPTION OF THE DRAWINGS

FIGS. 8a–e are schematic and tables setting forth the protocol of message packets between the ASP and a Device according to one embodiment of the present invention.

DETAILED DESCRIPTION OF PREFERRED EMBODIMENTS

Figure 1:
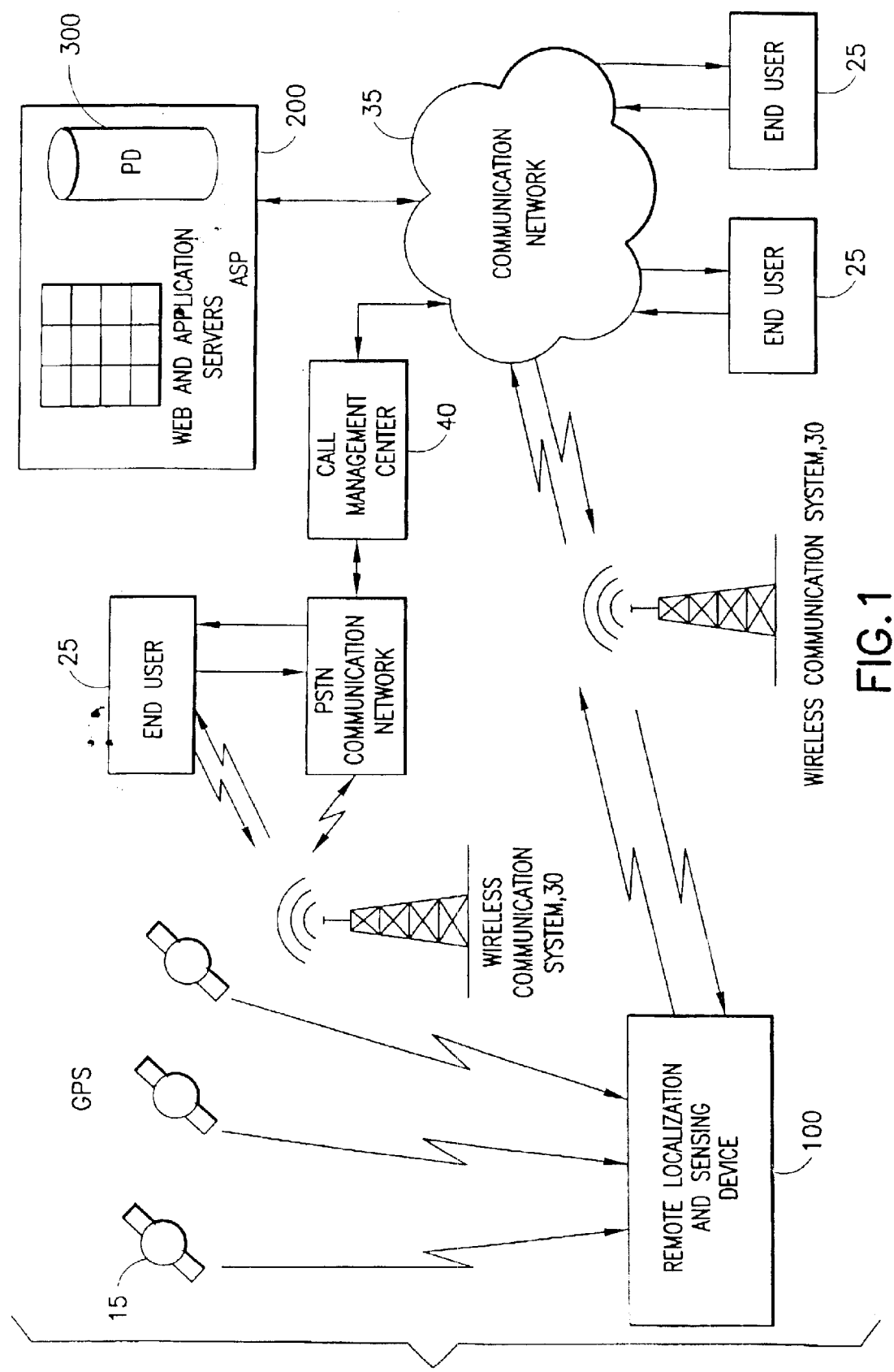
FIG. 1 is a general schematic overview of a system according to one embodiment of the invention.

Certain embodiments of the present invention will now be discussed with reference to the aforementioned figures, wherein like reference numerals refer to like components.

OVERVIEW

The schematic of FIG. 1 provides an overview of the components of one embodiment of the present invention and the components' relation to each other. In general, the system of the present embodiment collects position and sensor data via one or more remote localization and sensing devices (each a "Device") 100, stores the device data at an Application Service Provider ("ASP") 200 and, via the ASP 200, makes such Device position and sensor data available to one or more end users 25. As described in greater detail below, the present embodiment provides the flexibility to accommodate multiple users 25 across multiple applications. More specifically, the system can be used to service multiple business applications, each having different business rules and models and each utilizing Devices with different configurations, sensors and the like. Depending upon the application of the system, end users 25 may be individuals, for example, caregivers monitoring patients, parents monitoring children and the like, and/or companies, such as common carriers monitoring fleets of trucks, merchants monitoring shipments, government entities monitoring individuals, companies monitoring employees and the like. Furthermore, independent of the applications, the system can logically associate end users 25 with accounts and/or groups of users within an account, and the system can assign different access privileges to end users 25 based on such group and account assignment.

Each Device 100, described in greater detail below, receives position data from a localization system, such as the Global Positioning Satellite (GPS) System 15 and sensor data from one or more types of known sensors. As such, the Device 100 is coupled to or associated with the individual or object being monitored and tracked. It should be understood that, the present invention is not limited to any particular localization system or sensor. Accordingly, alternate embodiments utilize other localization systems and technology, including, for example, triangulation, radio frequency triangulation, dead reckoning and the like, or any combination thereof. Similarly, sensors may include those for monitoring physiological parameters, such as heart rate, body temperature, brain activity, blood pressure, blood flow rate, muscular activity, respiratory rate, and the like, and/or sensors for monitoring ambient parameters, such as temperature, humidity, motion, speed, existence of particular chemicals and light. Specialized sensors, such as inertial device-based fall detectors (for example, those utilizing one or more accelerometers) provided by Analog Devices under the trade name ADXL202, are also used. Other exemplary sensors include pulse rate sensors from Sensor Net, Inc., under Model No. ALS-230 and temperature sensors (type NTC) from Sensor Scientific, Inc., under Model No. WM303 or Model No. SP43A. Pulse rate sensors are available from Sensor Net Inc., Model No. ALS-230; Infrared optical sensors are available from Probe Inc. As described in greater detail below, the Device 100 and/or ASP 200 monitor the sensor output and generate alert messages to the end users 25 if the sensor data exceeds an alarm threshold.

In general, each Device 100 communicates the position and sensor data to the ASP 200 through a wireless communications system 30. The systems can potentially utilize any number of commercially available wireless data communications solutions available from a number of different service providers. Some examples of the types of wireless data communications interfaces that may be used include: Cellular Digital Packet Data (CDPD), Global System for Mobile Communications (GSM) Digital, Code Division Multiple Access (CDMA), and digital data transmission protocols associated with any of the 'G' cellular telephone standards (e.g., 2.5 G or 3 G). In the present embodiment, the system uses CDPD as the communication technology and user datagram protocol (UDP) with Internet protocol (IP) as the transmission protocol, although other protocols may be used such as transmission control protocol (TCP). As such, and as described in greater detail below, the Device 100 is assigned an IP address. In the present embodiment, the wireless communication system 30 passes the data to a wired communication network 35, such as the Internet, with which the ASP 200 is in communication. As described below, the communication system 30 and communication network 35 provide for two-way communication between the Device 100 and ASP 200.

The position and sensor data is preferably stored at an Application Service Provider ("ASP") 200, which serves as an intermediary between the Devices 100 and end users 25. As such, end users 25 are able to monitor the instantaneous and historical position and sensor data for one or more Devices 100. ASP 200, described in greater detail below, receives the position and sensor data from the communication system 35 and serves as a link between the device data and the end users 25 of the system. In general, ASP 200 comprises one or more servers (e.g., web server(s), application server(s), electronic mail server(s) and/or database server(s)) and one or more platform databases (PD) 300. ASP 200 provides end users 25 the ability to access the device data, specify alert threshold values for comparison to measured sensor values and receive notifications from the ASP 200. For example, in the event a measured sensor value exceeds an alert threshold, the ASP 200 notifies the appropriate end user 25. End users 25 receive such alerts through any number of alert devices ("Alert Devices"), such as a cellular telephone, telephone, pager, WAP enabled cellular telephones, Personal Digital Assistants (PDAs), computer or other devices having electronic mail, Short Message Service (SMS) messages, or Instant Messages (IM) capability, fax, computer generated voice phone calls/voicemail, or messages sent to a Call Management Center, which will generate a human phone call to alert the user 25, such as the caregiver of an Alzheimer patient or the parent of a child.

In the present embodiment, end users 25 access device data, specify alert thresholds, and access account information through a user device, such as a computer, WAP enabled cellular telephone, a PDA or other device including those identified as possible Alert Devices. In the present embodiment, the user interface device is a computer coupled to the Internet for accessing a secure website provided by ASP 200 on the communication network 35. The user interface device may be the Alert Device. End users 25 who do not have direct access to the communication network 35, can also access the device data and specify alert threshold values using conventional telephone communication networks to contact a central Call Management Center (CMC) 40 that is staffed with personnel that can access the ASP 200 via the communication network 35 or other networks, such as a wide area network (WAN), a local area network (LAN) or the like. The CMC 40 may also include a computerized, automated response system allowing end users 25 to call in and receive device data, alerts and other system information. The ASP 200 can forward a message to the CMC 40 whenever an alert, as described in greater detail below, is generated. This information can be used by personnel at the CMC 40 to respond to inquiries from end users 25 who may call the CMC 40 for additional information beyond the basic message generated by the ASP's automatic notification system. The personnel at the CMC 40 would also be available for users who have difficulty accessing or using the system Website, described in greater detail below, to configure the Device 100. The CMC 40 will also be charged with fielding phone calls from users responding to alerts. In addition, the CMC 40 will proactively call users to verify changes that have been suggested to their alert parameters that may generate a large number of spurious alerts. In an alternate embodiment, if users do not have access to the Internet or to a CMC 40, an automated telephone system hotline will be available to obtain real-time data after PIN verification.

The System may potentially implement a number of different security measures to safeguard the personal location and sensor data of users 25 and location of Devices 100, to prevent illicit commands from malicious third parties and to secure the data stream from potential interlopers. The data channel itself, since it may use standard UDP/IP or TCP/IP protocols, can be protected using a number of commercially available schemes including Secure Socket Layer (SSL) encryption for the data stream between the Device 100 and the ASP 200. The raw data itself may be further encrypted by the Device 100 and/or ASP 200 in addition to the SSL as well. Embedding additional encryption and device/server identification techniques into the ASP 200, Devices 100 and/or user interface devices can enable further protection.

DEVICE

FIG. 2a illustrates components of the Device 100 according to the present embodiment of the invention. In general, the Device 100 of the present embodiment comprises two separate components: the first component 202, for example a watch unit, comprises, for example, at least one sensor for monitoring the person or thing being tracked, and the second component 204, for example, a "belt" communication unit (so called because it may be designed for an individual to wear on her belt), for communicating with the watch unit 202 via short-range radio frequency (RF), Blue Tooth or other known technology, and for communicating with the ASP 200.

In a preferred embodiment, the watch unit 202 comprises a microprocessor (mp), having a system clock (CLK), which is programmed to operate in accordance with the discussion herein: Coupled to the microprocessor are one or more sensors ($S_1, S_2, S_n$), for receiving physiological or ambient readings, random access memory (RAM) for temporarily storing the measured sensor readings, and a radio frequency transceiver (RF) and antenna for communicating with the belt unit 204. The watch unit 202 is powered by a battery (BAT).

In a preferred embodiment the belt unit 204 also comprises a microprocessor (up), having a clock (CLK), which is programmed to operate as described herein. Such programming may be stored in read only memory (ROM) coupled to the microprocessor. In alternate embodiments the functionality of the belt (and/or watch) unit 204 is effectuated in firmware. The belt unit 204 may also include one or more sensors ($S_1, S_2, S_n$) for collecting data. In the present embodiment, belt unit 204 includes a fall-down sensor comprising a two-axis accelerometer, the output of which is interpreted by the belt unit's microprocessor. Tri-axis accelerometers are also envisioned. In general, the accelerometer output indicates a fall (or sudden change in posture) when based on the user's sudden change in acceleration and sudden deceleration or stop.

As with the watch unit 202, the belt unit 204 also includes a random access memory (RAM) for temporary storage of data, including alert threshold values.

A GPS receiver (GPS REC), having a patch or other suitable antenna, is coupled to the microprocessor. The GPS REC receives the GPS satellite signals, which in a preferred embodiment are interpreted by the microprocessor to determine the longitudinal and latitudinal coordinates of the belt unit 204. In an alternative embodiment, the GPS satellite signals may be interpreted at the ASP level for determining the longitudinal and latitudinal coordinates of the belt unit 204.

Also coupled to the belt unit is a wearer interface (INTERFACE) for conveying information to and receiving inputs from the wearer or user of the Device 100. For example, in a preferred embodiment, the INTERFACE includes a power switch, a panic or emergency button and light emitting diodes (LEDS) and/or an audible alarm and/or vibrating alarm. As described in greater detail, below, the panic button causes the sensor and GPS position data to be sent to the ASP 200. In an alternate embodiment, the Device 100 includes a privacy button which causes the microprocessor to deactivate one or more predefined sensors. The LEDs provide indication of the status of the device; for example, on/off, functioning properly, sensor(s) enabled/disabled, malfunction, and the like.

Lastly, in a preferred embodiment, the belt unit 204 includes a communication interface (CI), such as a serial port, for receiving updates of software and data, and a wireless communication modem (MODEM), having an antenna, for communicating with the ASP 200 via the UDP protocol. As discussed herein, the UDP MODEM has associated with it an IP address for identifying the Device 100.

As described in greater detail below, the watch unit 202 acquires the sensor readings and transmits them via RF to the belt unit 204 where the microprocessor analyzes the sensor readings (including that of any sensor on the belt unit 204). The microprocessor on the belt unit 204 also receives the GPS signals and determines the position data of the belt unit 204.

Based on the state of the Device 100 and the requests received from the ASP 200, the belt unit 204 will determine whether or not the sensor readings trigger an alarm and/or read the position and sensor data back to the ASP 200 via the modem.

In one embodiment, the belt unit and/or the watch unit processor monitors the separation distance between the "watch" and "belt" units by monitoring the total power of the RF transmission signal from the "watch" to the "belt" unit. When the total power of the signal drops below a present value, the belt unit will then trigger an alert—to both the Device 100 (e.g., visual, audible or tactile) and to an Alert Device via the ASP 200—to notify wearer of the separation of the two units. The mounting of the watch unit 210 to the wearer must be snug enough to obtain useful physiological data and durable enough not to be easily removed, while still being comfortable enough for long-term use. An embodiment of the invention contemplates the use of a semi-permanent, elastic band for the watch unit.

It should be understood that use of the foregoing terms "watch" and "belt" are descriptive of merely one embodiment or use of the Device of FIG. 2a. For example, the watch unit may be placed inside a container of goods with a radio frequency or other wireless or wired communication link to the belt unit, which may be mounted in any suitable location, such as in the cab of a truck transporting the container. Furthermore, the specific sub-components of the Device 100 of FIG. 2a are merely exemplary, and the division of sub-components and functionality between the watch and belt units may be altered; for example, all sensors may be placed on one component, the GPS receiver may be placed on the watch unit, the watch unit microprocessor could analyze the sensor data to determine whether or not an alert threshold has been exceeded, the watch unit may have the wearer/user interface, and various other modifications are within the scope of the present invention.

Figure 2B:
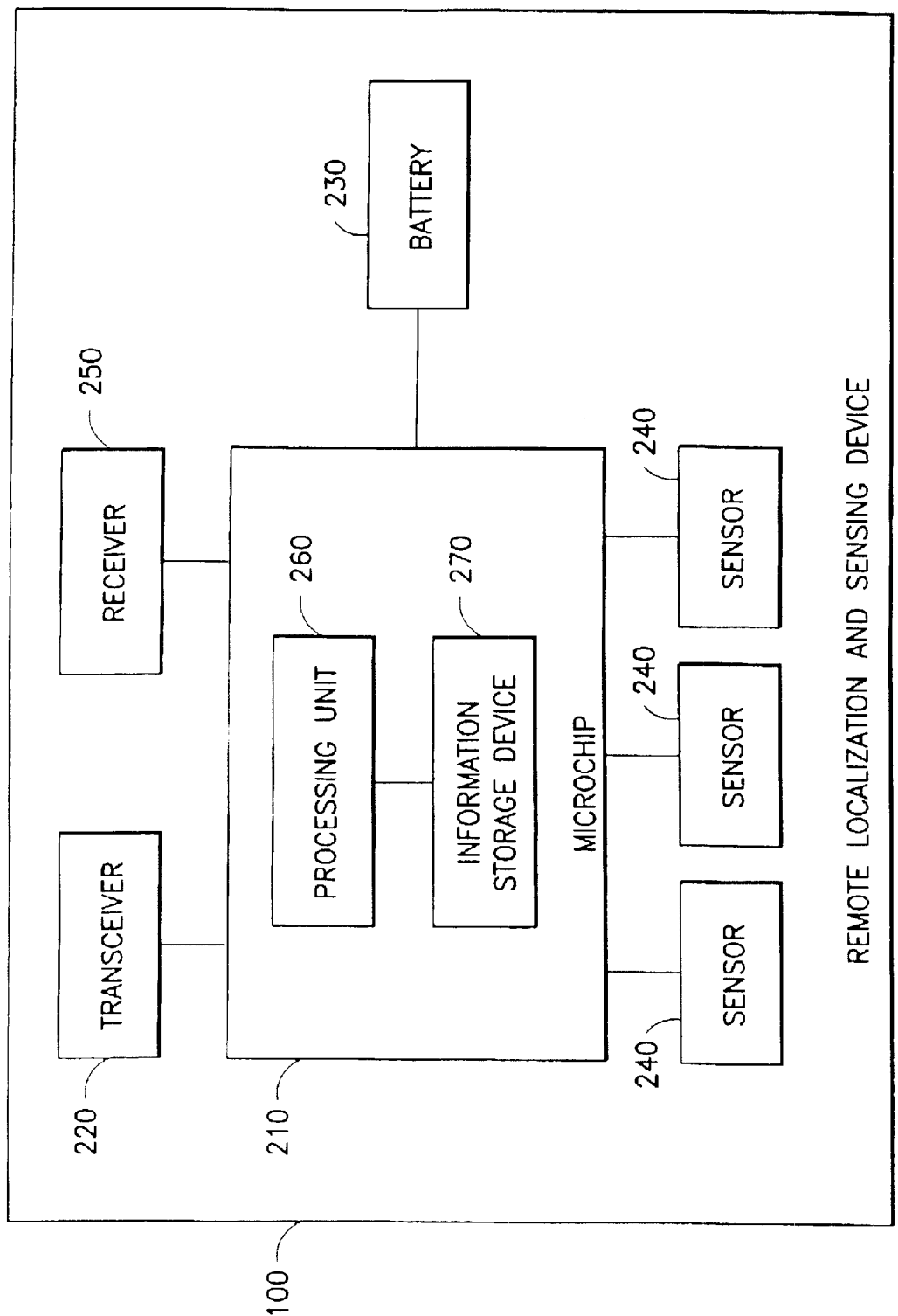
FIG. 2 is a schematic of a Remote Localization and Sensing Device, according to one embodiment of the present invention.
Figure 3A:
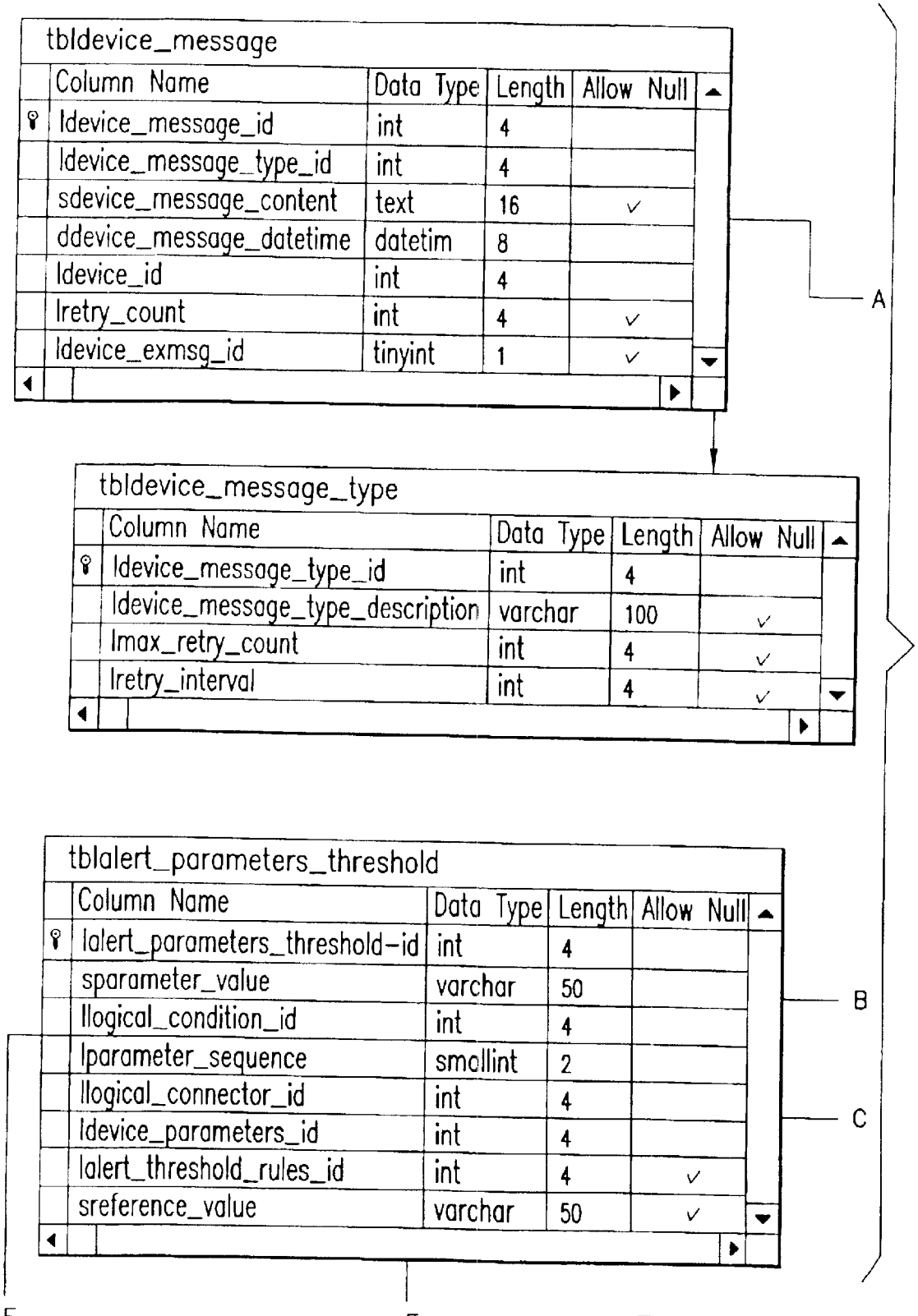
FIG. 3 is a schematic illustrating a platform database according to one embodiment of the present invention.
Figure 3B:
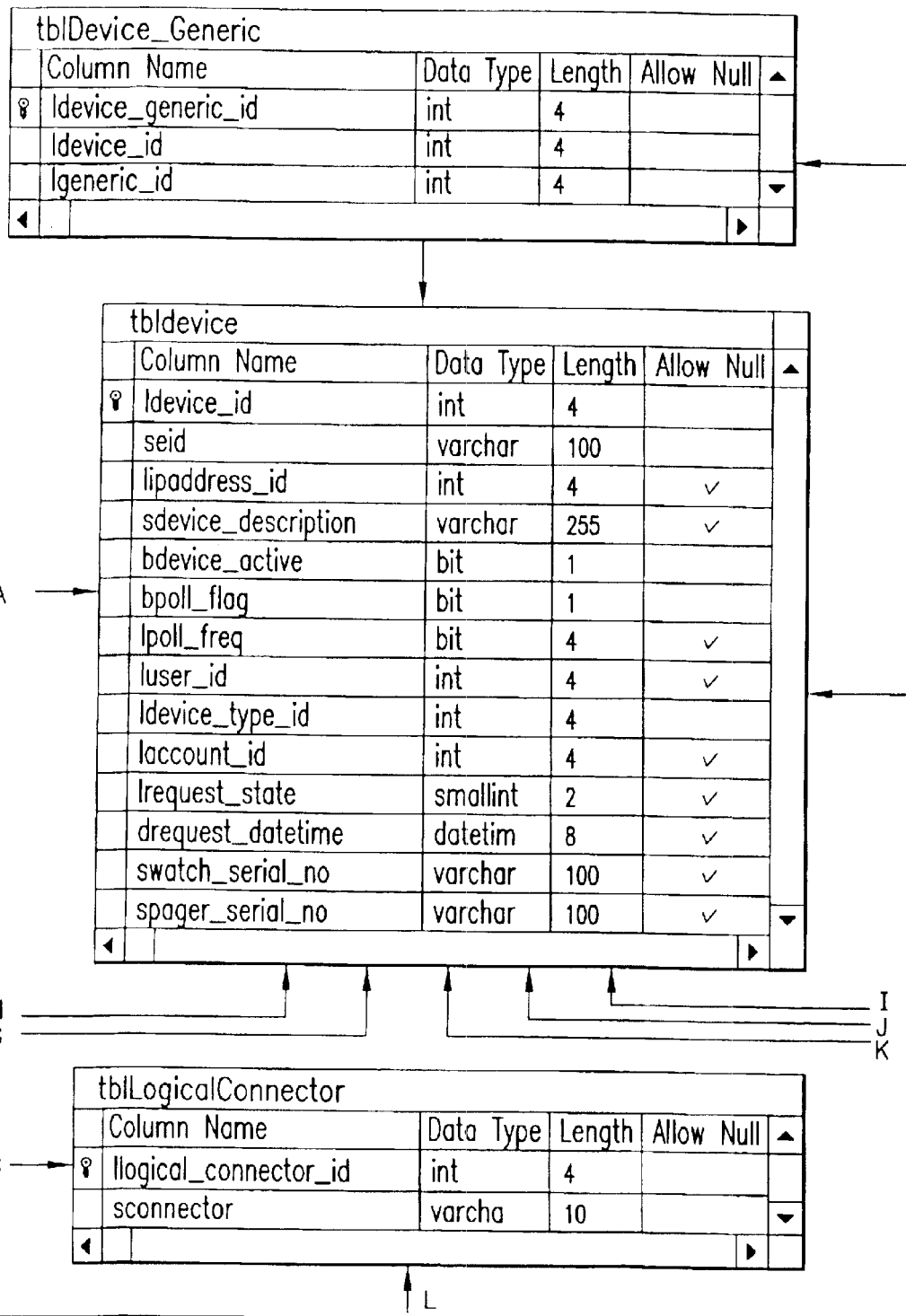
Figures 2, 3B:
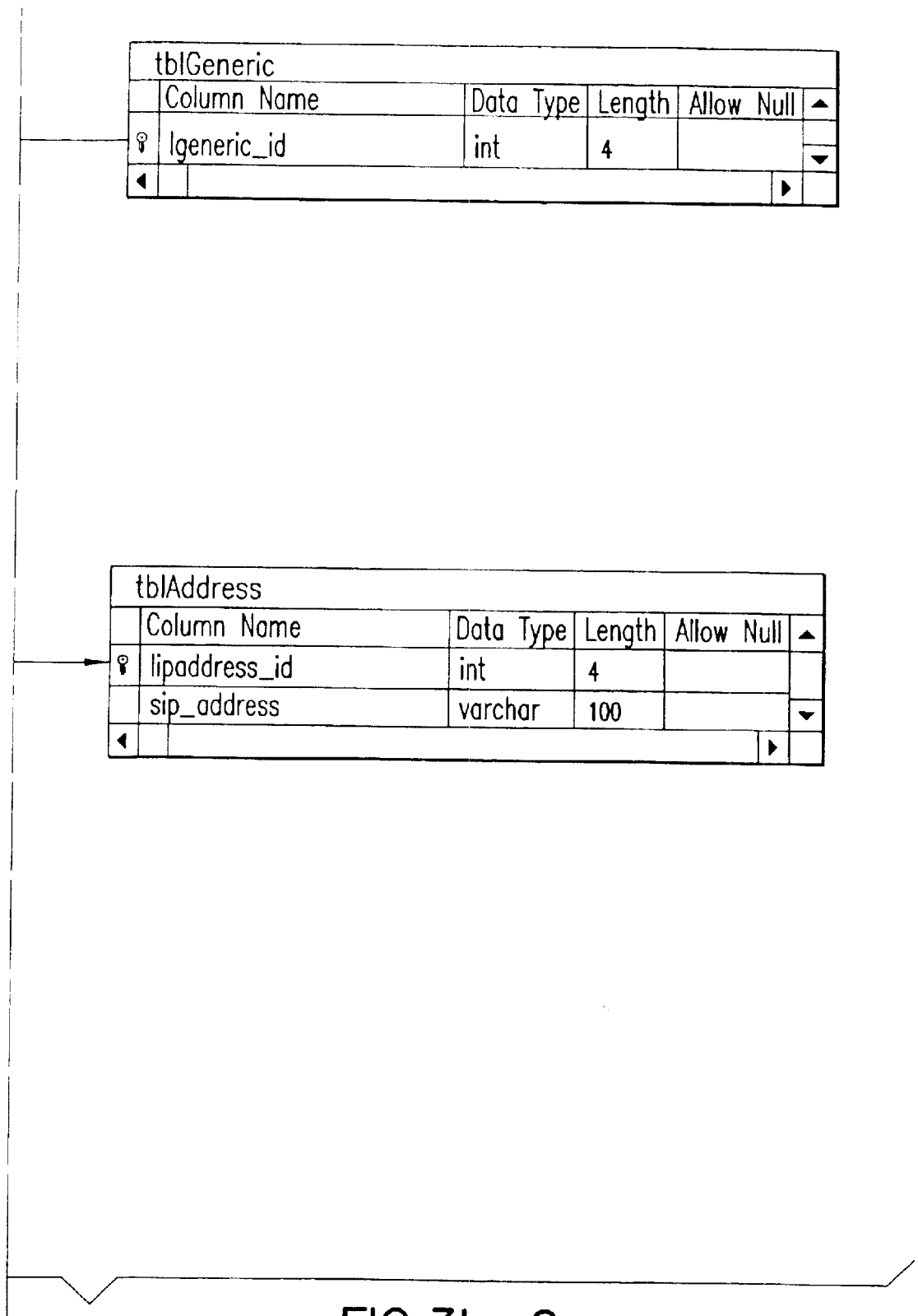
Figures 2, 3C:
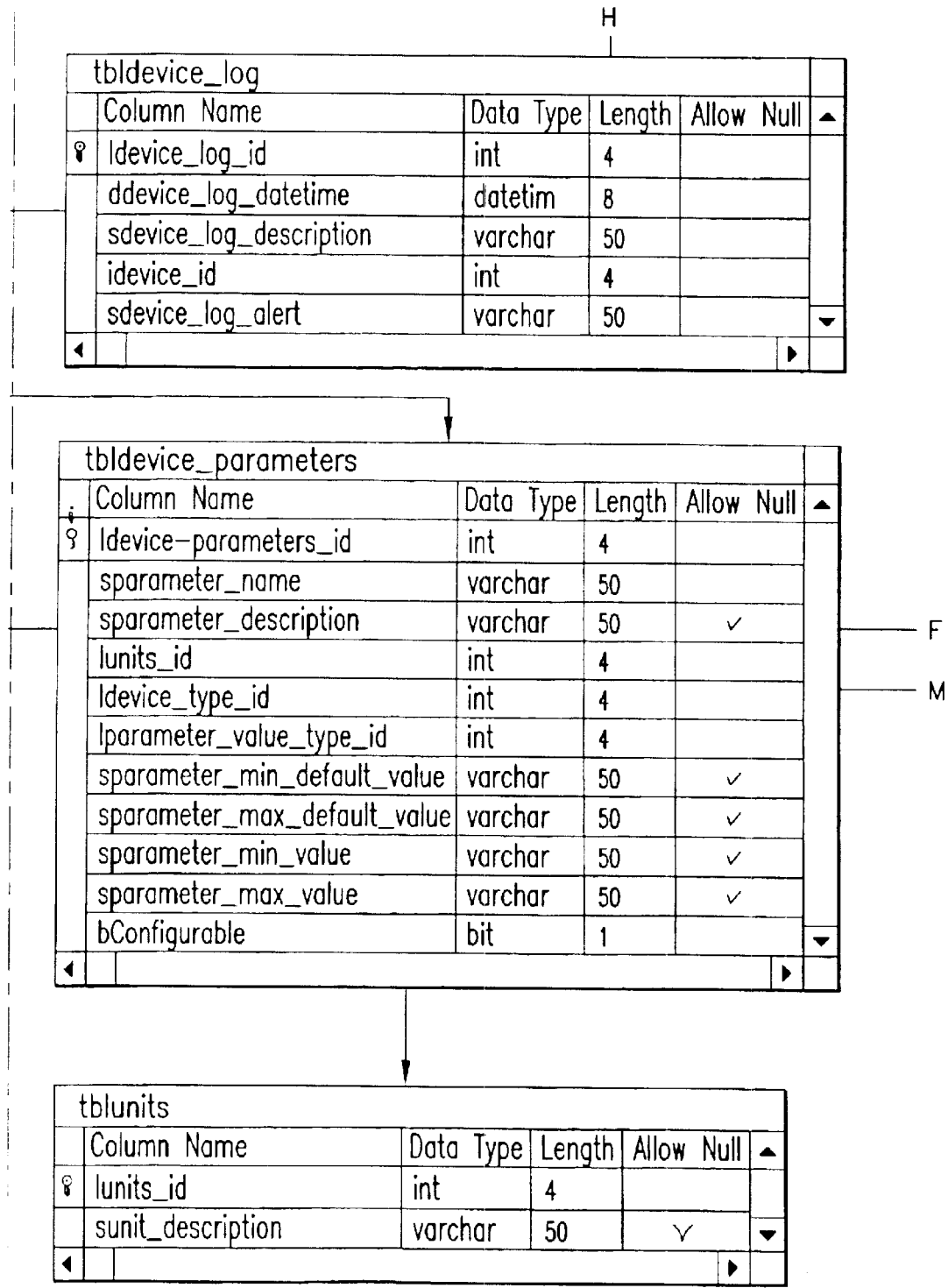
Figure 3D:
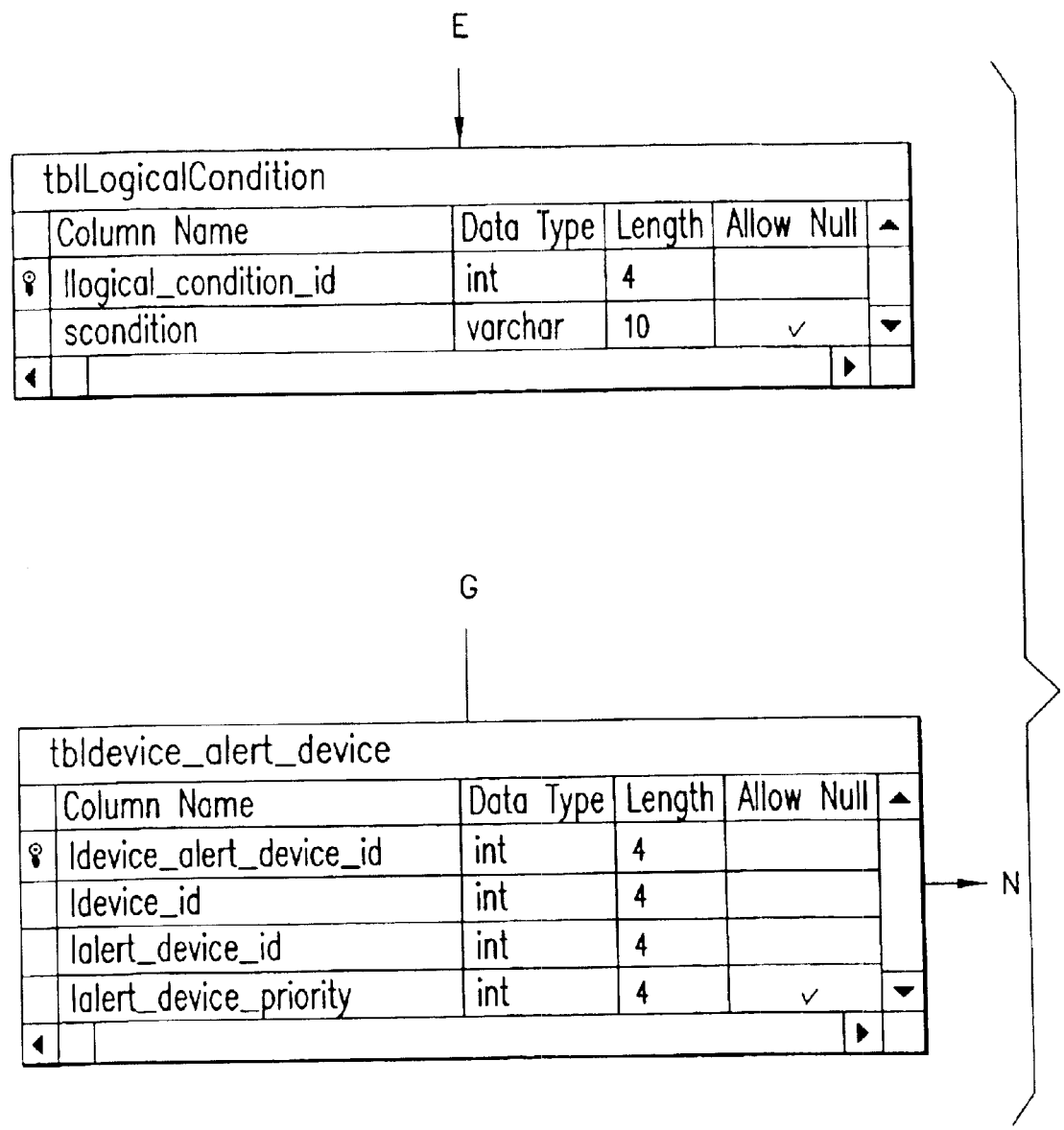
Figures 2, 3E:
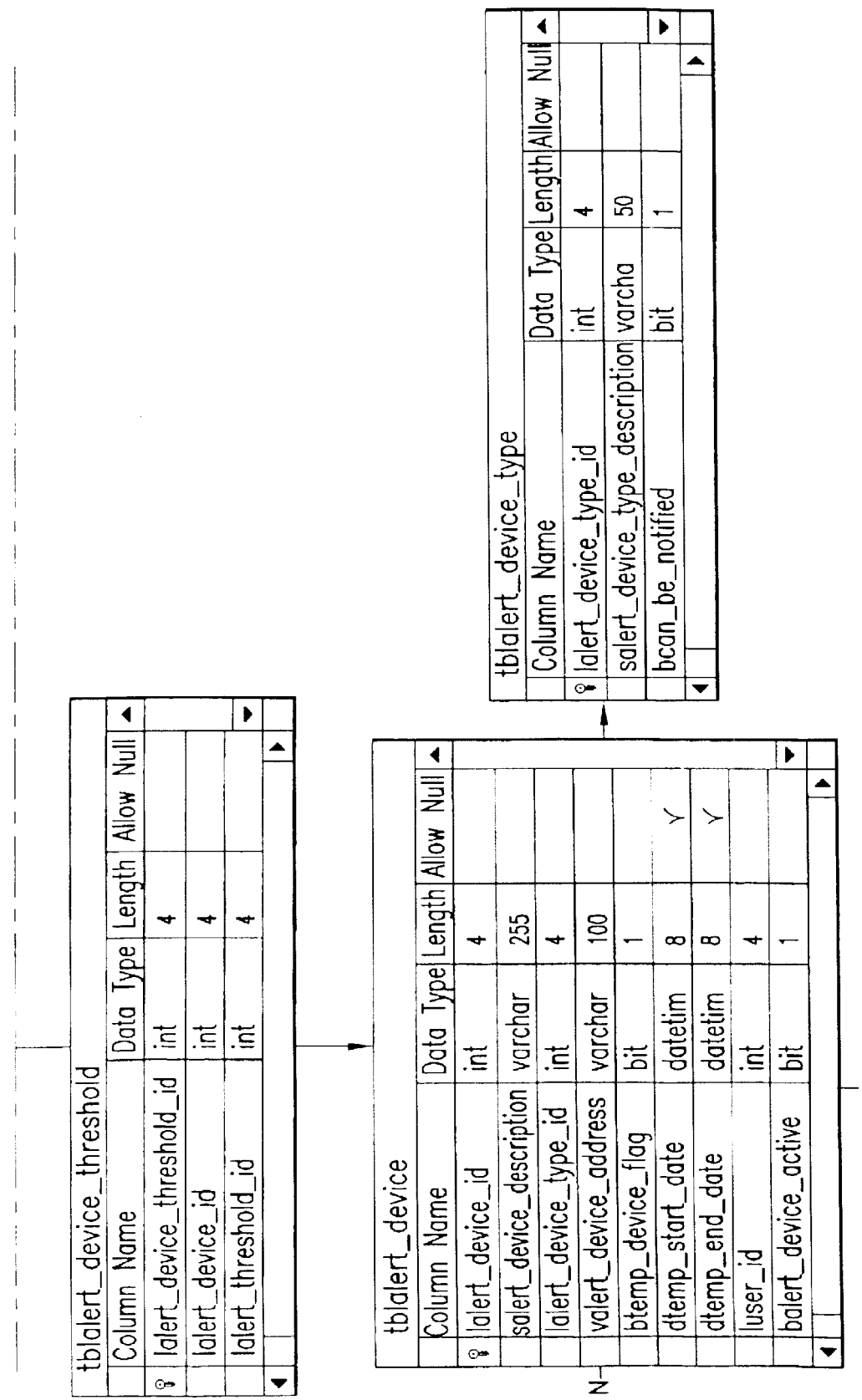
Figures 1, 3F:
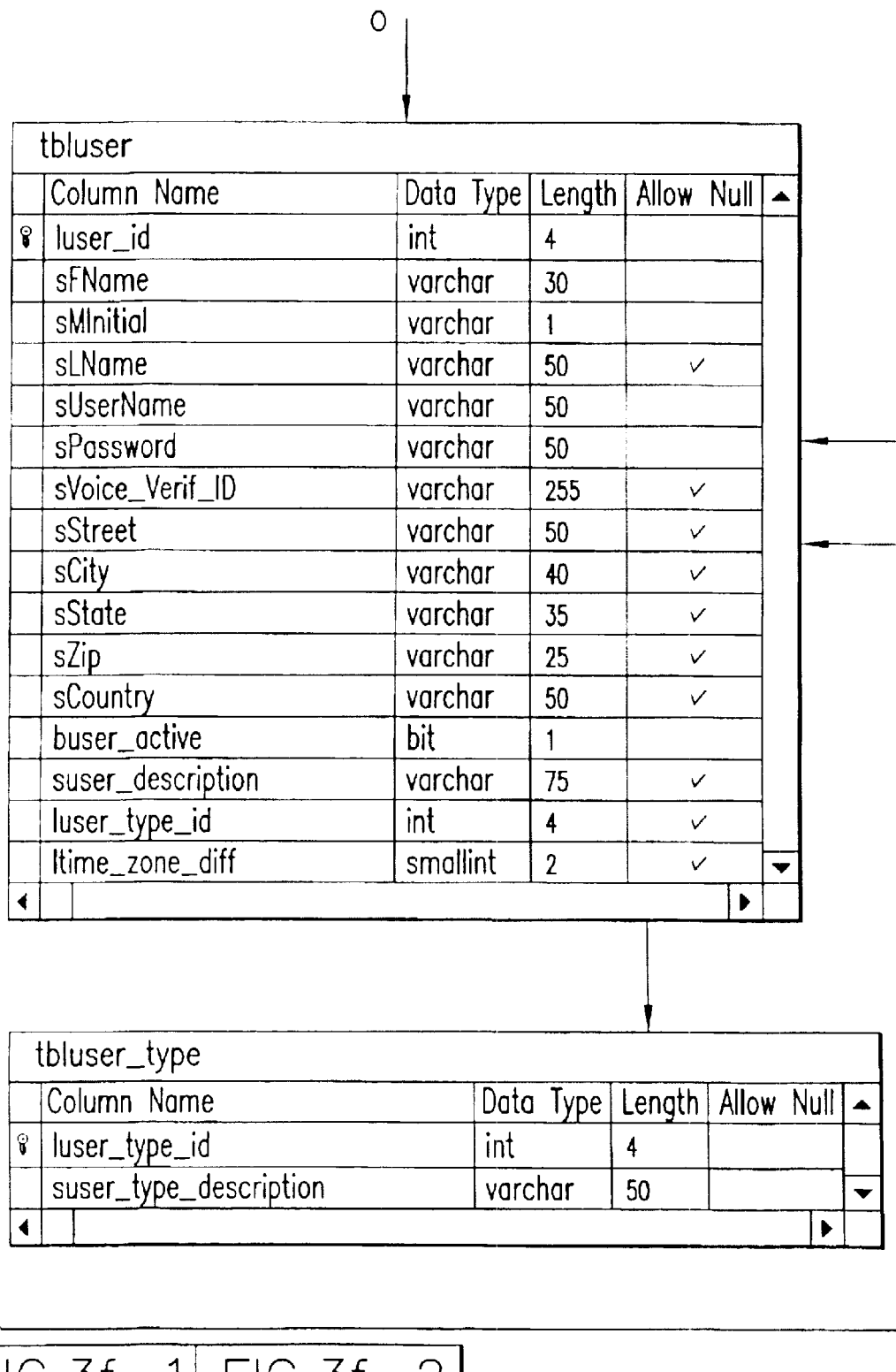
Figures 1, 3G:
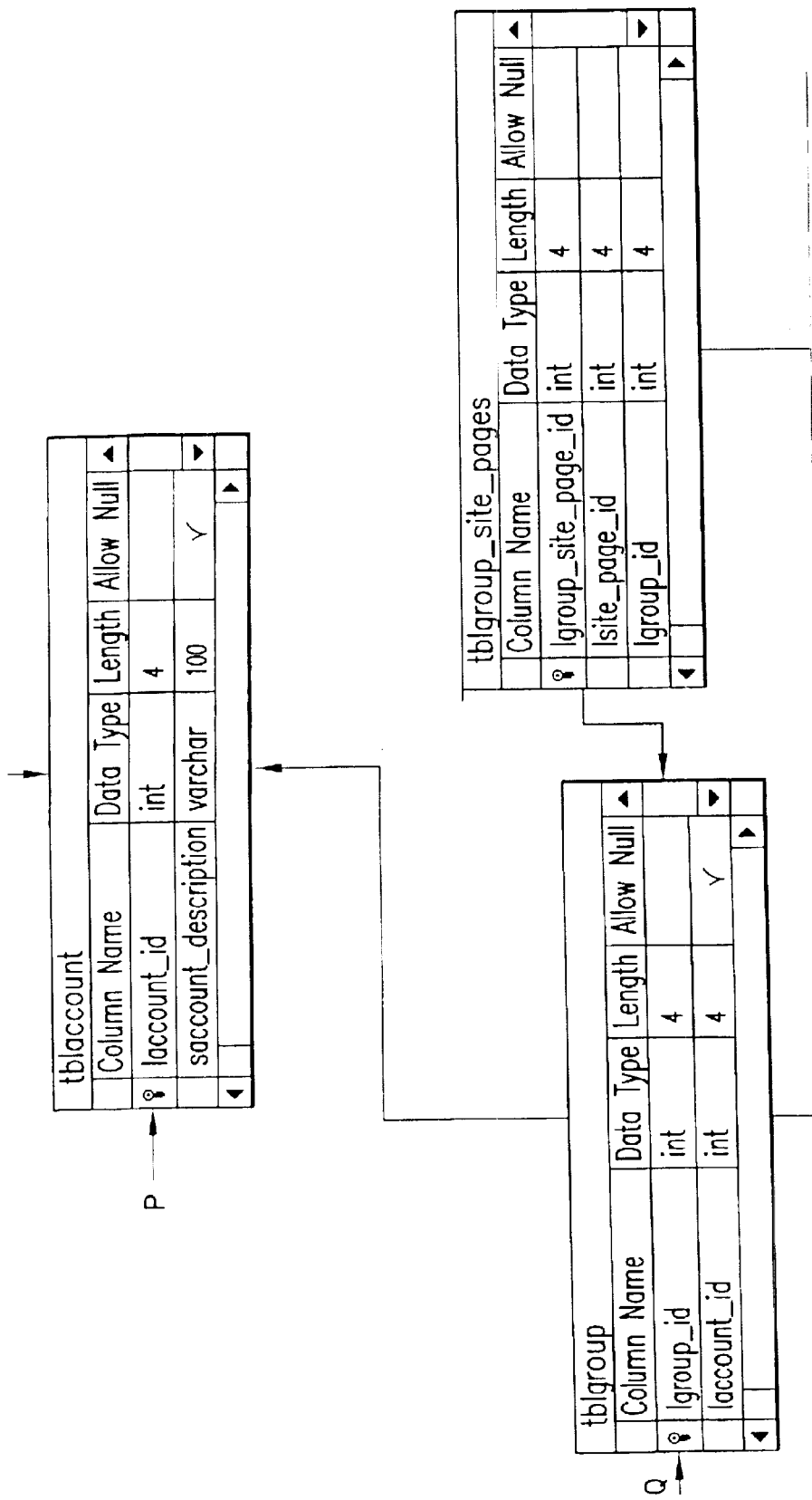
Figures 2, 3G:
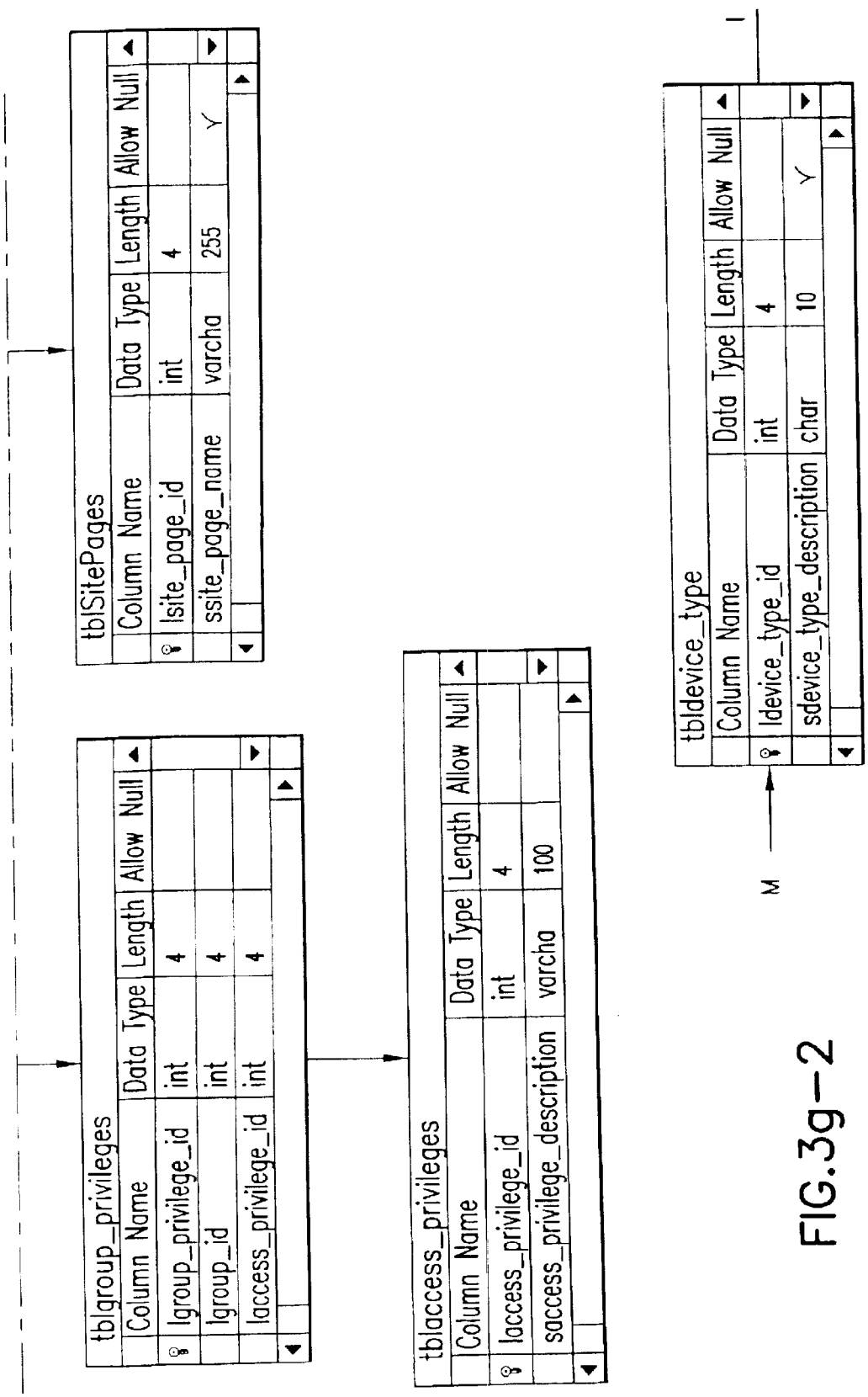
Figure 3H:
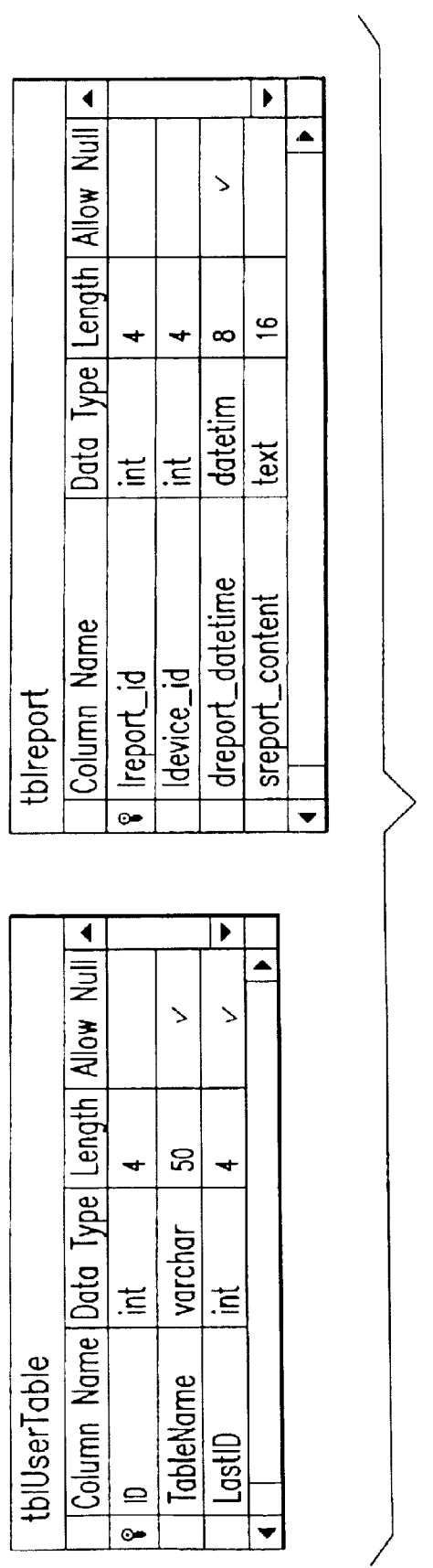
Figure 3K:
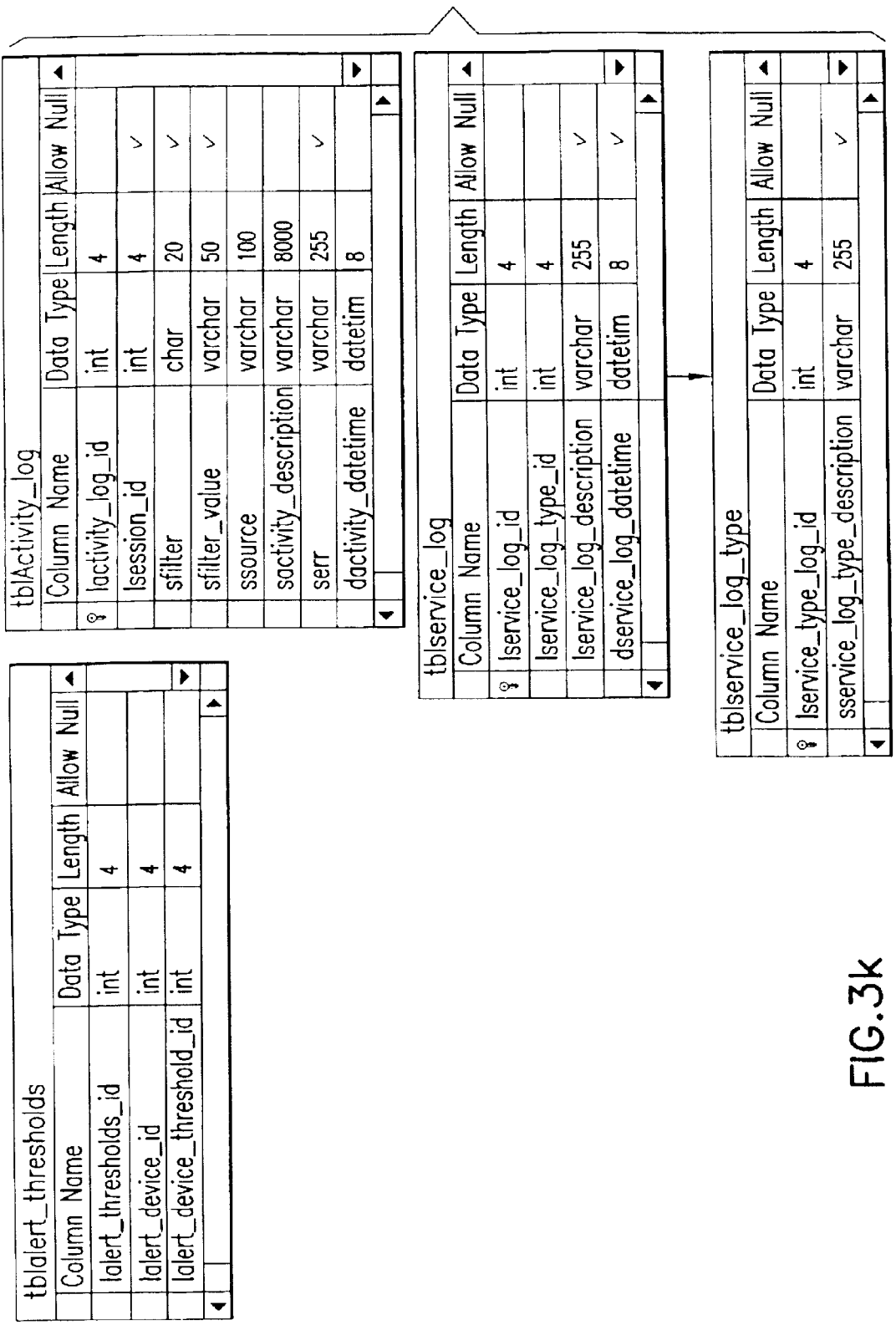

In this regard, FIG. 2b illustrates an alternate embodiment of the invention wherein the Device is a single component comprising a microchip 210, a transceiver 220, a receiver 250, a battery 230, and at least one sensor 240.

The microchip 210 includes a processing unit 260 and an information storage device 270. Although FIG. 2a illustrates some parts included on the microchip 210 and some parts coupled to the microchip 210, one of ordinary skill in the art understands, and the present invention contemplates, that different levels of integration may be achieved by integrating any of the coupled parts as illustrated in FIG. 2b onto the microchip 210.

In an embodiment according to the present invention, the battery 230, the at least one sensor 240, the transceiver 220, and the GPS receiver 250 are each coupled to the processing unit 260 within the microchip 210. The processing unit 260 is, in turn, coupled to the information storage device 270, also within the microchip 210. The battery 230 powers the microchip 210, including the processing unit 260 and the information storage device 270. The battery 230 may also power directly or indirectly the transceiver 220, the at least one sensor 240 and the receiver 250. The battery 230 may be a rechargeable (e.g., self-rechargeable) or a single-charge power supply device.

Where a self-rechargeable battery is used, the battery 230 may be recharged by energy sources internal to a body of the person being monitored. Such energy sources may be, for example, acoustic, mechanical, chemical, electrical, electromagnetic or thermal in nature as derived from, for example, bodily temperature differences, muscle activity and vibrations due to pulse, speaking, moving, breathing, etc. In other embodiments where the battery is self-rechargeable, the battery 230 is recharged by energy sources external to the body of the person being monitored. Such energy sources may be, for example, acoustic, mechanical, chemical, electrical, electromagnetic, or thermal in nature as derived from, for example, temperature differences between the ambient and the body, vibrations due to ambient noise, ambient light, or an external device providing energy for the rechargeable battery 230.

In the present embodiment of the invention, the transceiver 220 is adapted to be in two-way wireless communication with the ASP 200 through the communication network 35, such as the Internet, and in one-way wireless communication with the GPS satellite 130. The transceiver 220 may have a single antenna or an antenna array, for example.

While the transceiver 220 is in two-way wireless communication with the ASP 200 through the communication network 35, the receiver 250 is in one-way wireless communication with the GPS system satellite 130. The use of the transceiver 220 and the receiver 250 may be advantageous in that the Device 100 may generally consume less energy. GPS frequencies tend to be relatively high and sending information over such frequencies by the Device 100 via the transceiver 220 can be energy intensive. This preferred embodiment contemplates the receiver 250 being adapted for receiving at high frequencies and the transceiver 220 being adapted for receiving and sending at lower frequencies. The sending of information over lower frequencies by the transceiver 220 results in less energy consumption by the Device 100. This two-part configuration allows physical environment sensor packages to be reduced in size and mounted in otherwise GPS signal or mobile wireless data transmission unfriendly environments. For example, a remote sensing unit can be placed inside the steel walls of a cargo container to gather environmental information on the cargo while the unit with the wireless interface and the GPS receiver 250 can be placed outside the container for superior signal performance. An alternate embodiment of the invention omits a separate receiver and contains only a transceiver that receives both sensor data from the at least one sensor 240 and/or position data from the GPS satellites 130.

The microchip 210 includes the processing unit 260 and the information storage device 270. The processing unit 260 may include, for example, a microprocessor, a cache, input terminals, and output terminals. The processing unit 260 may include an information storage device 270, which includes an electronic memory, which may or may not include the cache of the processing unit 260. Similar configurations of the processing unit 260 are contemplated by the invention.

In operation, the GPS receiver 250 receives position data from the GPS satellites 130. The GPS data is received by the microchip 210 and in particular, the processing unit 260. Although the GPS receiver 250 continuously receives position data, the processing unit 260 may periodically (e.g., via a time-based trigger), or on command (e.g., via manual intervention or as a function of circumstance, for example, the sensing of a particular biological or ambient condition) receive the GPS data. The GPS data may then be processed in the processing unit 260, which may include determining the physical location of the Device 100 and thus, the person or object being monitored. The GPS data and/or the determined physical location are stored in the information storage device 270.

The at least one sensor 240 senses biological and/or ambient parameters. These parameters are converted into electrical signals by the at least one sensor 240 and received by the processing unit 260. As described in detail below, the sensing of parameters by the at least one sensor 240 may be a periodic (e.g., time based) or on command (e.g., triggered by a request from the processing unit 260 or as a function of circumstance, for example, the sensing of a particular parameter). The processing unit 260 stores the processed and/or unprocessed electrical signals in the information storage device 270. The transceiver 220 receives the interrogation signal, for example, from the ASP 200. The transceiver 220 then sends the interrogation signal to the microchip 210, in particular, to the processing unit 260. Upon receiving the interrogation signal, the processing unit 260 uploads the information stored in the information storage device 270 onto the transceiver 220. The transceiver then sends the uploaded information to the ASP 200 via the communication network 35, such as the Internet, and the wireless communication system 30.

As mentioned above, the ASP 200 ultimately receives the information where it is available for review by a qualified person or analyzed via an automated process. If the information is indicative of a condition in need of a response, a response signal is sent by the qualified person or via the automated process from the ASP 200 to the Device 100 via the communication network 35 such as the Internet. The processing unit 260 receives the response signal either via the transceiver 220 or the GPS receiver 250. The processing unit 260 processes the response signal and optionally, information retrieved from the information storage device 270 to formulate a control signal. Information regarding the generation of the control signal may be a function of information supplied by at least one of the response signal and the information storage device 270.

For example, the system and the method according to the present invention may be adapted to monitor and to respond to the person suffering an asthma attack. The Device 100 monitors biological parameters such as blood pressure, heart rate, respiratory rate and/or lung capacity. Information related to the biological parameters is sent to the ASP 200 as described above.

The information storage device 270 may store preset information relating to identification, personal information or special medical information, for example. This information may have been programmed before the coupling of the Device 100 to the person. Alternatively, the information may have been transmitted to the Device 100 after the Device 100 was coupled to the person. Such information may include the person's name, home address, phone number and/or a listing of relatives to contact in case of emergency. Furthermore, the information permanently stored in the Device 100 may relate to special medical information such as allergies to medication or that the patient is diabetic or asthmatic, for example. All of this information may be uploaded onto the transceiver 220 and transmitted to the ASP 200 for review and analysis. Such information may be of special significance to medical personnel when the person is disoriented or unconscious and unable to communicate.

Incorporating updateable firmware in the Device 100 allows it to be updated without a recall of the physical Device 100. The Device 100 may be configured for direct user update by plugging it into a computer and running an update program provided. In an alternate embodiment, the Device 100 may be updated by downloading firmware updates through a wireless link. This would allow multiple Devices 100 to be updated at essentially the same time, thereby minimizing support issues and reducing required customer maintenance.

OUTPUT UNIT

In yet another alternate embodiment, the Device 100 further includes a component for providing various forms of feedback or stimuli to a person, animal or object via an output unit. Output units can take any form to achieve the intended function. By way of non-limiting example, output units may take the form of syringes, electrodes, pumps, vials, injectors, drug and/or pharmaceutical or medicinal delivery mechanisms or systems, tactile stimulators, etc. Such an output unit may be integral with the Device or a separate component in communication with the ASP 200 and/or Device 100 by either wireless or wired communication link as a matter of application specific design choice.

In one such embodiment, such an output unit, which itself includes a microprocessor or logic for interpreting commands, may be coupled to the microprocessor of the device shown in FIG. 2b. In such an embodiment, Device 100 may be adapted to respond to a condition of the person (or animal, etc.) via an output unit. The Device 100 controls the output unit such that the output unit provides stimuli (e.g., acoustic, thermal, mechanical, chemical, electrical and/or electromagnetic stimuli) to the person. For example, the output unit may release an appropriate amount of medicine or provide electrical stimulation to a muscle. In another example, the output unit may be part of a conventional heart stimulator system that has been adapted to be controlled by the Device 100 and to provide electrical stimulation to the heart of the person 100.

Alternatively, in an embodiment according to the present invention in which the output unit is partially or wholly integrated into the Device 100, it is the Device 100 which provides the stimuli via the output unit which acts as an interface between the Device 100 and the person. For example, the Device 100 may be directly coupled to the heart of the person 100. Accordingly, the Device 100 may directly provide electrical stimulation to the heart via its interface (e.g., via the output unit).

In light of the information received by the ASP 200, an automatic, semiautomatic or manual response may be needed. For example, upon reviewing the information received by the ASP 200, a doctor may diagnose a condition and/or a substantial deviation in a biological parameter of the person and authorize the activation of a medical response. Alternatively, after analyzing the information received by the ASP 200, a program being run by the ASP 200 may ascertain a particular condition (e.g., myocardial infarction) and/or an above-threshold deviation in a biological parameter (e.g., substantial restriction in blood flow) of the person and authorize the activation of a medical response (e.g., the release of nitroglycerin into the body of the person). Then, a response signal is generated by the ASP 200 and provided to the Device 100 via the ASP 200. In response to the response signal, the Device 100 controls the output unit to provide the stimulus requested via the response signal to the person. Alternatively, if the output unit is partially or wholly integrated into the Device 100, the Device 100 directly provides the stimulus requested via the response signal to the person.

The output unit is adapted to be controlled by the Device 100 and, in particular, the processing unit 260. The output unit may also be partially or wholly integrated with the Device 100. For example, the output unit may be integrated wholly with the Device 100 and coupled to the microchip 210. Alternatively, the output unit may be integrated wholly with the Device 100 and may be integrated wholly with the microchip 210.

The output unit is further adapted to be provide stimuli (e.g., acoustic, thermal, mechanical, chemical, electrical and/or electromagnetic stimuli). For example, the output unit may be in contact with a muscle or an organ. Furthermore, the output unit may be an adapted conventional device such as a pace maker or a module that releases chemicals (e.g., medication) into the blood stream or into the stomach, for example. The present invention also contemplates that the output unit may provide sensor information to the Device 100. In addition, the output unit may be placed on the person, on the surface of the skin of the person, just below the surface of the skin of the person, deep within the body of the person, or anywhere therebetween. For example, the output unit may be adapted to be a part of an artificial body part of the person or an apparatus worn by the person (e.g., clothing, eye glasses, etc.)

The Device 100 controls the output unit via the control signal, the output unit providing the appropriate stimuli. For example, the system and the method according to the present invention may be adapted to monitor and to respond to the person suffering an asthma attack. The Device 100 monitors biological parameters such as blood pressure, heart rate, respiratory rate and/or lung capacity. Information related to the biological parameters is sent to the ASP 200 as described above. If qualified medical personnel and/or an automated process determines that a patient is having a serious asthma attack, a response signal can be sent to the Device 100 to remedy the condition. Upon receiving the response signal, the processing unit 260 controls the output unit to release a drug (e.g., adrenaline) into the blood stream of the person. Information relating to the amount, duration and/or frequency of the dosage may contained in the response signal, the processing unit 260 and/or the information storage device 270. Furthermore, control unit 140 can send subsequent response signals corresponding to different doses of the drug, for example, depending upon the improving or deteriorating condition of the person.

In another embodiment according to the present invention, the microchip is activated only when the transceiver 220 receives the interrogation signal and/or the response signal from the ASP 200. This embodiment has an advantage in that energy consumption is minimized. Upon receiving the interrogation signal, the processing unit 260 accepts data from the receiver 250 and the at least one sensor 240. The processing unit 260 may accept the data over a time interval to achieve more stable data or to develop a history of data. Such data may be processed and/or stored in the information storage device 270. Upon completion of the processing and/or storing of the data, the information contained in the information storage device is uploaded onto the transceiver 220 and transmitted to the ASP 200. After completing the transmission of the uploaded data via the transceiver 220, the processing unit 260 is no longer active in receiving, processing and/or storing information until the next interrogation signal or the response signal is received from the ASP 200. Upon receiving the response signal, for example, the Device 100 and the output unit act as described above. After completing the action, the processing unit 260 is no longer active in controlling the output unit or in receiving, processing and/or storing information until the next interrogation signal or the next response signal is received from the ASP 200. The present invention also contemplates the Device 100 and/or the output unit being activated via a manual switch or programmed button actuated by the person.

As alluded to above, the information storage device 270 may store information relating to different types of stimuli provided by the output unit as well as stimuli parameters such as frequency, amount and/or duration. The information storage device 270 may also store preset information relating to identification, personal information or special medical information, for example. This information may have been programmed before the coupling of the portable device 100 to the person. Alternatively, the information may have been transmitted to the portable device 100 after the Device 100 was coupled to the person. Such information may include the person's name, home address, phone number and/or a listing of relatives to contact in case of emergency. Furthermore, the information permanently stored in the Device 100 may relate to special medical information such as allergies to medication or that the patient is diabetic or asthmatic, for example. All of this information may be uploaded onto the transceiver 220 and transmitted to the ASP 200 for review and analysis. Such information may be of special significance to medical personnel when the person is disoriented or unconscious and unable to communicate.

OPERATIONAL MODES

As will be described herein, various embodiments of the present invention employ power-saving features to prolong the life of the Device's battery. In this regard, in certain embodiments the Device 100 is capable of being turned on (from a low-power wait state) or off (into either a low-power state or completely off) remotely. Such function is controlled by messages received from the ASP 200 and, more specifically, by the microprocessor(s) of the Device. This allows the ASP 200 to remotely power individual Devices 100 up or down on-demand as necessitated by either business requirements or user request. In addition, the ASP 200 can remotely turn individual sensors in the Device 100 on or off (i.e., enable/disable) to provide enhanced monitoring corresponding to higher service levels, or to conserve power on the Device 100. Both of these features re-effectuated, in part, by particular messages and message protocols.

In the alternate embodiment of FIG. 2b, the microchip 210 is activated only when the transceiver 220 receives the interrogation signal and/or the response signal from the ASP 200. This embodiment has an advantage in that energy consumption is minimized. Upon receiving the interrogation signal, the processing unit 260 accepts data from the GPS receiver 250 and the at least one sensor 240. The processing unit 260 may accept the data over a time interval to achieve more stable data or to develop a history of data. Such data may be processed and/or stored in the information storage device 270. Upon completion of the processing and/or storing of the data, the information contained in the information storage device 270 is uploaded onto the transceiver 220 and transmitted to the ASP 200. After completing the transmission of the uploaded data via the transceiver 220, the processing unit 260 is no longer active in receiving, processing and/or storing information until the next interrogation signal or the next response signal is received from the ASP 200. Upon receiving the response signal, for example, the Device 100 acts as described above. The present invention also contemplates the Device 100 being activated via a manual switch or programmed button actuated by the person.

In another embodiment according to the present invention, the transceiver 220, without the GPS receiver 250, is adapted to receive the GPS data from the satellite 130 and the interrogation signal and/or the response signal from the ASP 200. Furthermore, the transceiver 220 transmits information from the processing unit 260 to the ASP 200. Operation is similar as described above.

A privacy mode may be incorporated in the Device 100 that will allow it to temporarily stop reporting information. Privacy mode may take a number of different forms. It may place the unit into a deep sleep mode where the system is completely unable to respond to any requests for data and does not collect any data. Alternatively, the privacy mode may simply suppress the collection of particular type of data (such as location information) while still keeping the system up and running to provide a baseline level of information. The system will respond to requests from the ASP 200 with either a notice that the system is operational and not responding with data due to a privacy mode block, or only respond with a limited set of information. Privacy mode would generate a flag in the PD 300, described in greater detail below, to prevent further polling of the Device 100 by the ASP 200 and a false alarm that the unit is not functioning properly. In addition, the Device 100 can be recalibrated from the ASP 200 during normal operation via the wireless data link to enable resealing of sensor gains or sensor offset.

The Device 100 may also have a system sleep mode, which reduces power consumption between data collection and transmission intervals. To conserve power, the Device 100 will only power-up the wireless data line transceiver 220 to determine if a message is waiting for it. If there is no message, the Device 100 will power down until the next prescheduled check time. If a message is waiting, the Device 100 will begin "waking up" specific components needed to respond to the message. In addition to this scheme, the GPS receiver 250 can also self-power down when it does not receive a usable set of satellite signals. Both of these sleep modes save Device 100 power and extend battery life.

The Device 100, and more particularly the device microprocessor(s), can preferably conduct both startup testing and continuous system checking during operation for self-monitoring. Information such as low-battery warnings, sensor malfunctions, no GPS signal and the like may be detected by a Device microprocessor and communicated to the ASP 200.

ASP PLATFORM DATABASE

The PD 300 will now be described in greater detail with reference to FIG. 3, which illustrates the logical relationship of the data stored by PD 300. In general, the tables incorporated into the PD 300 have been designed to be application independent, namely, that none or very few of the tables contained within the PD 300 need to be changed when the system is applied to a new business application. Therefore, the PD 300 structure is the same regardless of the end use of the system and types of Devices 100 used, which simplifies management and maintainability of the overall system. The PD 300 includes numerous logically related, discrete tables of information to be described below. These tables are intended to be illustrative and not exhaustive, as other arrangements with fewer or more tables and fewer or more data fields are within the scope of the present invention.

More specifically, the PD 300 comprises tables directed to three main functional areas, which will be described in greater detail below. The first functional area is directed to information pertaining to the specific Devices 100. In particular, these tables contain identifying information for the Devices 100 and device messages. The second functional area is directed to information pertaining to end users 25, such as, for the caregiver of an Alzheimer patient, the parent of a child being monitored, or the supervisor of a fleet of vehicles. The third functional area is directed at setting and implementing alerts, and includes tables containing threshold parameters, alert signals, and logical alert rules associated with each Device 100. The tables in each of the three functional areas will now be described in greater detail. Organization of the tables into these functional areas is for ease of discussion and should not be interpreted as limiting the scope of the invention.

DEVICE INFORMATION TABLES

The first functional area of the PD 300 contains tables relating to the Device 100 and its various functions. The PD 300 is designed to accommodate a number of different types of Devices 100 with varying capabilities, such as different sensors suites, without any modification to the structure of the PD 300 itself. To this end, the Device Table contains a record for every Device 100, as identified by a unique Device identifier (ID). Each record in the Device Table also contains a field for a description of the Device 100, a field for the frequency of interrogation of the Device 100, indicating for example, how often to poll the sensor Device 100 for position and/or data, and fields for the serial numbers of the watch unit and belt unit 204 for the embodiment where the Device 100 is comprised of two separate components, as previously described. The Device Table also contains a field for the Account ID that associates the Device 100 with a particular account. The Account ID field in the Device Table links to the Account Table, described below. The Device Table also contains a field for a unique Internet Protocol (IP) address ID associated with each Device 100 and a field for a unique Device Type ID, identifying the particular type of Device 100, for example, a Device 100 for position and fall detection only or a Device 100 for position, pulse rate, and body temperature, and so forth. The IP Address ID field links the Device Table to the IP Address Table, which contains a field for the Device's actual IP address or some other identifying descriptor. The Device Type ID links the Device Table to the Device Type Table, which contains a field for a description of the particular Device 100 type.

The Device ID provides the link between the Device Table and several other device related PD 300 tables. Two of these tables, the Device Generic Table and the Generic Table, are optional. The Device Generic Table is linked to the Device Table through the Device ID and contains fields for a unique Generic ID and a Device Generic ID, which, in turn, relates to the Generic Table for identifying additional, special case fields. These tables are directed to Devices 100 that have non-standard configurations of sensors and/or internal settings.

The Device ID also links the Device Table, and thus each Device 100, with the Device Message Table, which stores messages sent to the Device 100 from the ASP 200 that require an acknowledgement of being received by the Device 100. This table prevents repeated messages from being created every time it has to be sent to a Device 100. The Device Message Table also contains fields for the message content, a unique Device Message Type ID, the date and time the message was sent, and the number of times the system has tried to resend the message to the Device. The Device Message Table is linked to the Device Message Type Table through the Device Message Type ID. The Device Message Type Table, tracks the messages sent to the Device 100, including the maximum number of times the system will attempt to resend the message and the retry interval. As described in greater detail below, these Tables are used to determine when a Device has failed.

The PD 300 also has tables for archiving and displaying historical Device 100 data and status information. This information is useful for long-term monitoring of Devices 100 and associated wearers or tracked items. The Device ID links the Device Table to the Device Log Table, which is an archival table that tracks instances when data is received from each Device 100, as identified by Device ID. Each entry is assigned a unique Device Log ID, which links each record in the Device Log Table to one or more records in the Device Log Values Table. The Device Log Values Table tracks the actual data received from the Device 100 and creates records for these values.

USER INFORMATION TABLES

The second functional area of the PD 300 contains tables that store end user information. The PD 300 is designed to enable multiple end users 25 to be associated with a single Device 100. Furthermore, PD 300 is preferably structured to allow different privilege or access levels to be assigned to the end user(s) 25 associated with each Device 100 and the information it produces.

To this end, the User Table in the PD 300 contains fields that store information related to each user's personal information, such name, address, a description of the user, a unique identifier for the type of user, and a secure user name and password for use when an end user 25 requests access to secure data or other account information or to set alert thresholds.

The Account Table and Account User Table associate accounts, as identified by unique account IDs, with end users 25. To this end, Account Table includes an account ID and an account description.

The Account User Table within the PD 300 contains fields that uniquely identify individual users 25, the details of which are stored in the User Table, with an account, as stored in the Account Table. A User Type ID is associated with different types of users 25, for example, caregivers, physicians, parents, or fleet supervisors. The user type ID links the User Table to the User Type Table, which also contains a field for a description of the user type. Within the PD 300, multiple users 25 can be associated with a single account, such as all the caregivers within one nursing home account. The user ID links the User Table to the Account User Table, which contains unique identifiers for both the account user and the account. The account ID links the Account User Table with the Account Table, which contains a field to describe the account.

The Group Table is linked to both the Group User Table and the Account Table and serves to associate individual groups, identified by group ID, with an account, as identified by account ID. For example, an account consisting of a nursing home that monitors patients may include one group of all nurses and a second group of all supervisors. The Group Table in the PD 300 contains unique identifying information for each defined group, including a Group ID and associated account ID.

The Group User Table, in turn, contains a record for each association of group and user 25. As illustrated, a user 25 may be associated to multiple groups.

The Group ID links the Group Table to the Group Privileges Table, which associates privileges with each group. The access privilege ID within the Group Privileges Table links to the Access Privileges Tables, which contains a detailed description of each privilege. It is within the scope of the present invention that users can belong to more than one group with different access privileges. The Group Privilege and Access Privilege Tables, therefore, contain fields to uniquely identify the group, the associated level of access privileges, and a description of the access privilege. For example, physicians may have access to both position data and biological data for a monitored patient with two-way communication capability for setting alert thresholds, while nurses and orderlies, who belong to a different group, would only have access to receive alerts or some subset of data.

Finally, the Group Site Pages Table and Site Pages Table are optional tables for assigning groups of users to specific ASP website pages to which they can access. The Group Table is linked to the Group Site Pages Table through the Group ID. For security purposes, The Group Site Pages Table contains fields for unique IDs identifying individual or groups of web pages associated with a group of users. The Site Pages Table associates a Site Page ID with the full website URL locator or some other identifier of the web page.

In sum, a single account record in the Account Table can be associated with several user records in the User Table. Similarly, a record in the Group Table can be associated with several user records. Finally, groups, and thus users, are associated with privileges as set forth in the Group Privileges and Access Privileges Tables. For example, a single nursing home would represent one account with different users. Within the nursing home account, user groups such as nurses, doctors, and orderlies can be defined with different privileges assigned to each user group.

ALERT AND ALERT DEVICE INFORMATION TABLES

The third functional area of the PD 300 contains tables associated with alert threshold values for determining whether or not to issue alerts, alerts for the threshold values and logical rules to combine threshold values. It will be appreciated that PD 300 allows for the flexible setting of both simple and complex alert thresholds. More specifically, the present embodiment stores both raw alert threshold values for triggering a response from the ASP 200, and tables for combining and associating individual threshold values into potentially complex alert threshold rules to determine if an actual alert has occurred. These rules and values are stored in the PD 300 in a flexible manner that allows extensive alert profiles to be built and maintained in the PD 300 for each Device 100 without any modification of the database structure.

It should also be noted that alert threshold evaluation preferably occurs at two levels. A basic threshold evaluation occurs at the Device 100, specifically in the microprocessor of the belt unit 204 (of FIG. 2a) or the processing unit 260 of the microchip 210 (of FIG. 2b) to determine if the Device 100 should generate an alert and transmit the data to the ASP 200, as previously described. The second level of alert evaluation is a more sophisticated evaluation that occurs at the ASP 200 using logical rules, that will be described in greater detail below. Each threshold parameter or combinations of parameters can be combined to create an alert threshold rule. For example, authorized users 25 may set threshold temperature or biological values for different locations or patients. The rules for evaluating parameters are embodied within the PD 300 itself. Each of the evaluation rules can be user programmed through secure web pages, having forms, on the ASP Website or via other user interface device. The end user 25, for example, a parent monitoring a child on a school bus or a caregiver monitoring an Alzheimer patient, can program the evaluation rules via the communication network 35, such as the Internet. The PD 300 can associate multiple Alert Devices of various types with each individual user to be contacted. For example, it can store pager information, e-mail information, and phone information as the primary alert notification sources for each user. Based upon information in these tables, the PD 300 associates different threshold parameters with different Alert Devices. For example, temperature alerts 25 for a user may only generate e-mail alerts while location alerts may only generate pager alerts. This functionality results, in part, from the structure of the PD 300.

Furthermore, a user 25, such as a caregiver or parent, may specify a radius around a given address or other global location for the alert threshold. For example, the ASP 200 can convert postal code addresses into latitude and longitude information for the user to adopt as the "center" of an alert zone. The user 25 can then specify a radius around that central point for the alert zone. Whenever a user inputs specific values for alert parameter thresholds, for example, Max Body Temperature>=103.5 F., the "Middle Tier" within the ASP 200, described in greater detail below, can evaluate the parameter to determine whether the value has a potential to generate excessive alerts or an insufficient number of alerts. If so, the ASP 200 will generate a call to the CMC 40 to contact the user to advise him or her that the value may need to be re-evaluated.

The Alert Device Table generally associates Alert Devices with users 25. The Alert Device Table links to the User Table, previously described, through the unique User ID. The Alert Device Table contains a field for a unique Alert Device Type ID to identify the type of alert device, for example, a pager or cellular phone, a field for a description of the alert device, an Alert Device ID field to identify a particular alert device, and a field for the alert device's IP address or some other identifying descriptor. The Alert Device Table also contains start date and end date fields to specify a time interval during which that Alert Device (as opposed to another Alert Device of that user 25) is to be notified. The Alert Device Type ID links the Alert Device Table to the Alert Device Type Table, which contains a field to describe the alert device type and a field to specify whether the corresponding entry in the Alert Device Table refers to an Alert Device to which notices can be sent or simply refers to other user contact information.

The Alert Device ID links the Alert Device Table to the Device Alert Device Table, which in turn, is linked to the Device Table, previously described, through the Device ID. The Device Alert Device Table associates specific Devices 100 with Alert Devices, for example, a particular Device 100 for monitoring only position and pulse rate is associated with an alert to a particular pager or particular cellular phone only. The Device Alert Device Table also stores the priority of multiple Alert Devices for each Device 100. For example, if a location alert is triggered, a user may specify to first try an e-mail (having the highest priority) and if no response is received, to try a specified cellular phone (having the second highest priority). The Notification Service, described in greater detail below, uses the Device Alert Device Table.

Another alert related table, the Device Threshold Table, associates each Device 100 with its alert thresholds. The Device Threshold Table is linked to the Device Table, previously described, through the Device ID. To this end, each record, identified by a unique Device Threshold ID includes Device ID and Alert Threshold ID. The Alert Threshold ID links the Device Threshold Table to the Alert Threshold Table, which contains alert identifying information for each alert. For example, each record contains a field for the actual alert message associated with the Alert Threshold ID and a description of the alert threshold. The Alert Threshold Table also contains fields for start and end dates to specify a time period during which the alert threshold is applicable. The Alert Threshold Active field within the Alert Threshold Table stores whether a particular Alert Threshold has been enabled.

The Alert Threshold ID links the Alert Threshold Table to the Alert Device Threshold Table, which associates specified alert thresholds with specific Alert Devices. For example, in the Alzheimer patient application, the system can be directed to notify the patient's son at his pager if the location exceeds a specified distance from a central point or his cellular telephone if the patient's temperature exceeds the threshold. The Alert Device Threshold Table is also linked to the Alert Device Table, previously described, through the Alert Device ID, thereby associating an Alert Device with an alert threshold.

The Alert Threshold ID links the Alert Threshold Table to the Alert Threshold Rules Table, which contains fields to construct the logical alert rule associated with an Alert Threshold ID. Multiple rules, as embodied in the Alert Threshold Rules Table, may be associated with a single entry (and Device) in the Alert Threshold Table. The Alert Threshold Rules Table embodies the logical rules processed by the ASP 200 whenever an end user, such as a caregiver, is setting alert threshold rules and when the ASP 200 is determining whether or not an alert has occurred.

More specifically, the Alert Threshold Rules Table associate an alert rule, as identified by an Alert Threshold Rules ID, with specified alert parameters, logical conditions, logical connectors, and the sequence of the parameters. Each alert rule, as identified by the Alert Threshold Rules ID in the Alert Threshold Rules Table, is associated with one or more alert parameters, as identified by an alert parameters threshold ID in the Alert Threshold Table. For example, a first exemplary alert parameters is: temperature is greater than or equal to 100° F.; and a second alert parameter is: heart rate is greater than or equal to 90. An exemplary alert rule consisting of these two parameters is: activate the alert if (temperature is greater than or equal to 100° F.) or (heart rate is greater than or equal to 90). The Alert Parameters Threshold Table and Alert Threshold Rules Table would embody this rule.

In general, the Alert Parameters threshold table includes the details on each of the two parameters, including the parameter values (e.g., 100, 90), the logical condition connecting the two parameters (e.g., greater than, less than, equal to, greater than or equal to, less than or equal to, and the like) as specified in the Logical Condition Table, the sequence of the parameters comprising a rule, the logical connector joining the multiple parameters (e.g., and, or, not, exclusive or, and not, and the like), as specified in the logical connector table, and a reference value for the parameter. In the present embodiment, the reference value is used only for the location/position parameter and indicates the longitude and latitude ordered pair of the center of the radius threshold. Each record in the Alert Parameters Threshold Table also includes a device parameters ID, which links the table to the Device Parameters Table.

The Device Parameters Table contains all the sensor data parameters that a Device 100 can provide. The Device Parameters Table includes fields for default minimum and maximum threshold values for each alert parameter, actual minimum and maximum threshold values for each alert device (which set acceptable bounds for user specified threshold values), and parameter names and descriptions. The Device Parameters Table links to the Device Log Values Table, previously described, through the Device Parameters ID. The parameter values in the Device Parameters Table are associated with an Alert Device through the Device Type ID, which links the Device Parameter Table to the Device Type Table, previously described. The Device Parameters Table is linked to the Parameter Value Type Table through the Parameter Value Type ID. The Parameter Value Type Table is a lookup table for a description of the parameter (or sensor) type. The Device Parameters Table is also linked to the Units Table through the Units ID field. The Units Table is a lookup table that assigns a unique Units ID to a description of a unit of measurement, for example, degrees Fahrenheit, miles, and so forth. Notably, the Table is not hard coded for specific sensors and parameters; instead, the PD 300 provides new parameter types to be specified by adding entries in the Parameter Value Type and Units Tables.

MISCELLANEOUS TABLES

In addition to the three primary functional areas, the PD 300 also includes other miscellaneous tables that serve additional functions. Specifically, the Notification Table stores notifications generated by a Device 100 that require responses from the user 25 and tracks any active or unconfirmed notifications, such as low battery, out of range, etc. In the present embodiment, only alert notifications require a user response, so only alert notifications are reflected in the Table. While the present embodiment requires the user response before providing the alert details, other embodiments may provide the alert details with the notification message. The Notification Table contains fields for a unique Notification ID; a Notification Type ID; and the date, time, and status of the notification. Each record in the Notification Table is associated with a Device 100 through the Device ID, previously described. The Notification Type Table in the PD 300 contains descriptions of the various types of notifications that can be sent by the Notification Service, as described below.

The ASP 200 preferably also includes an independent Master Database that is generally used for system-wide tracking of activity and system maintenance. The Master Database according to one embodiment may contain the following exemplary tables. An Activity Log Table that records system-wide data activity and stores it for use in detecting and correcting system problems. A Current Database Table is used to record the current version of the Master Database that is in use. A Primary Keys Table in the Master Database is used to track all the tables in the Master Database and the last ID that was assigned in each of the tables. An Alert Device Table in the Master Database associates particular alert devices with notifications of system problems. For example, if the SM 450 detects that the Data Processor 260 is not responding and cannot be successfully restarted, it will send a notification to the specified alert device. An Alert Device Type Table is used to record the various alert devices that can be used to send system notifications. An Application Table stores the various system applications in use, for example, cargo transportation, patient monitoring, child monitoring, and so forth. An Application Queue Table lists all the queues currently in use, for example, the notify and log queues. An Application Address Table is used by the Data Monitor 450 to associate Device 100 IP addresses with specific applications of the system so incoming data from the Device 100 can be identified with its associated application.

ASP MIDDLE TIER

In the present embodiment according to the present invention, the ASP 200 includes an Application Server (AS) having software and/or collection of software components, collectively referred to as the "Middle Tier" 400, which functions as the interface between the PD 300, the end users 25, and the Devices 100, whether they be on persons or objects, such as a patient or the cargo in a truck, and between the PD 300 and the end-users 25, such as a caregiver, parent, or school authorities. The Middle Tier is conceptually comprised of four main conceptually logic software levels that allow the system to interact with users, control the configuration of the Devices 100, gather and store data from individual Devices 100, notify users of alert conditions, provide report information and perform the other operations described herein. The Middle Tier 400 also includes various services, described below. In general, the services are "out of process" components (e.g., .exe files) and thus, operate independent of each other. The logic levels, however, are "in-process" components and are hosted by the services.

All major components of the Middle Tier 400 are preferably implemented using Microsoft Distributed Component Object Model (DCOM), which allows for individual functions to be physically removed from the rest of the system. Thus, as the system becomes larger, it can be readily expanded over a number of different ASP servers to increase performance. This distributed software model is further enhanced by the use of standard extensible Markup Language (XML) formatted data objects within the system.

Figure 4:
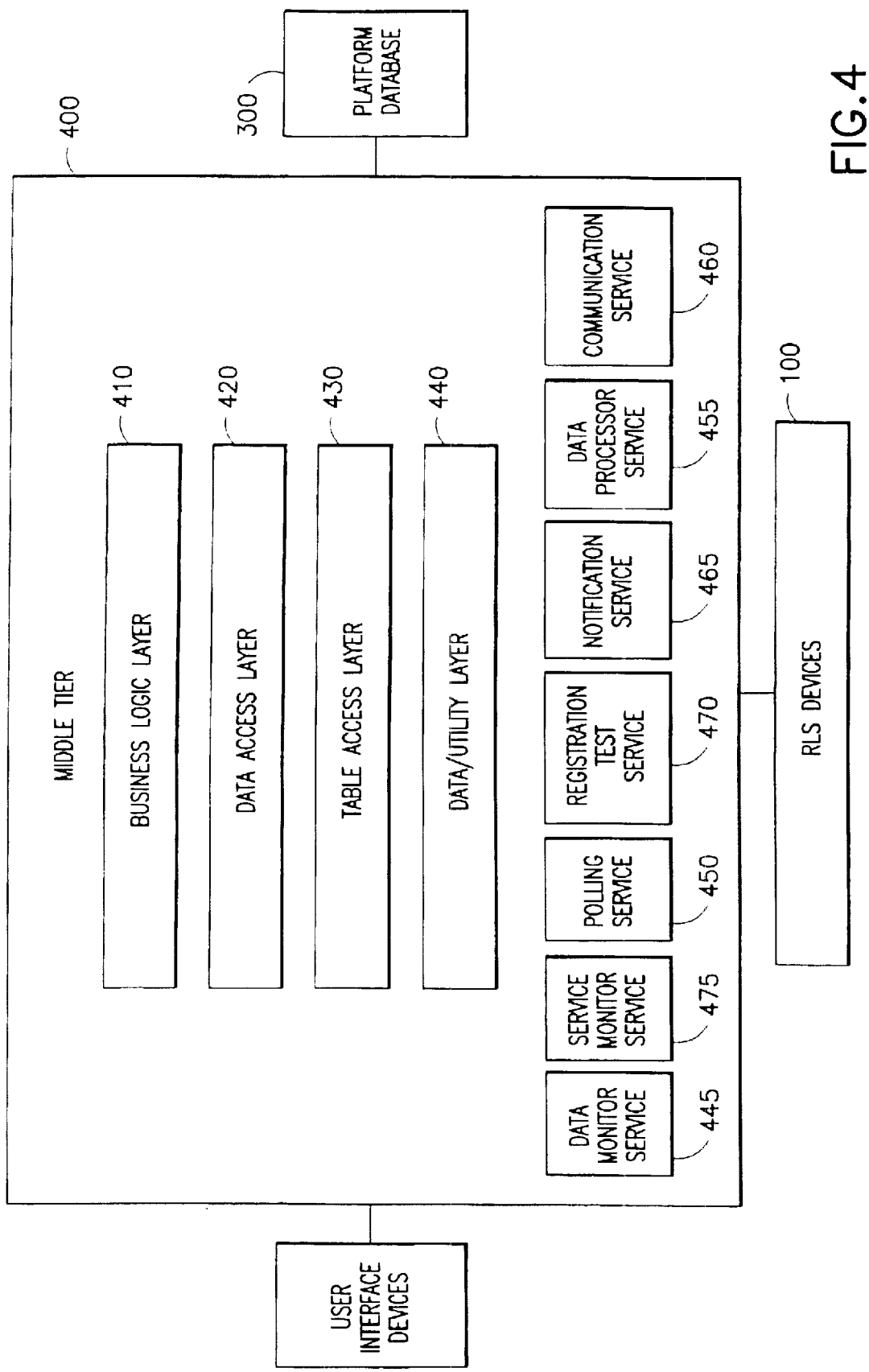
FIG. 4 is schematic overview illustrating the logical conceptual hierarchy of software components of a Middle Tier according to one embodiment of the present invention.

The four conceptual logic levels of the Middle Tier 400 will now be described in greater detail with reference to FIG. 4. The highest level of the Middle Tier 400 is the Business Logic Layer 410, which converts high level functions into progressively more focused commands entered by an end user 25. Each user can be given customizable access to particular functions of the system and information. The Business Logic Layer 410 implements this selective access with user information contained in the PD 300. Input to the Business Logic Layer 410 can come from the Device 100 in the manner previously described, or from an end user through any known interface device. For example, a caregiver can use the Internet to input instructions to send an alert if a patient's pulse rate drops below a specified level or if the patient's body temperature reaches a certain level. This logical rule is first processed at the Business Logic Layer 410. The Business Logic Layer 410 is independent of the PD 300 and the Business Logic Layer 410 preferably has no knowledge of the information in the PD 300.

Where the system simultaneously supports multiple business applications, for example through multiple websites (or other interfaces), each of which is associated with a separate application, the Middle Tier preferably includes multiple Business Logic Layers, each directed to one application. In such embodiments, each application has an associated application ID, which is passed from the website, to the Middle Tier, where a software component interprets it and calls the appropriate Business Logic Layer. Similarly, each Business Logic Layer uses the identifier to communicate with the appropriate website (or other interface).

From the Business Logic Layer 410, the information is passed to the Data Access Layer 420, which is conceptually the second logic level of the Middle Tier 400. The Data Access Layer 420 provides commands for accessing the appropriate database tables in the PD 300 required to carry out high-level commands from the Business Logic Layer 410.

The third conceptual logic level of the Middle Tier 400 is the Table Access Layer 430, which translates data in the PD 300 from independent, standard XML into a suitable form for passing to the upper levels. Conversely, the Table Access Layer 430 also translates commands and data received from the higher tiers into a XML format for storage in the PD 300.

The fourth conceptual logic level of the Middle Tier 400 is the Data/Utility Level 440, which is the lowest level within the AS 400. In general, the Data/Utility Level 440 implements the high level commands from the Business Logic Layer 410 and extracts the required data from the appropriate PD 300 tables. More specifically, the Data/Utility Level 440 includes a utility component for implementing standard functions, such as reading from and writing to the registry, and a data component for accessing the PD 300. By isolating such functions in the Data/Utility Level 440, only this level would need to change when changing the database technology (e.g., from SQL to that provided by Oracle Corporation).

It is also to be understood that the data conversion of the present embodiment allows easy third-party access to the information while easing the flow of information through the rest of the platform. For example, end user 25, such as a courier, could establish its own customer ASP interfaces (e.g., web site and call center) by extracting data from the ASP 200 in XML or other format such as electronic data interchange (EDI), text, or direct access. Furthermore, such a third party may issue a request to the ASP for particular data and/or for the ASP to perform a particular function and return to the third party the result of the function. In such an embodiment, which may be implemented using tools provided by the Microsoft Corporation under the tradename .NET, the Middle Tier is programmed to receive requests from a third party in a predetermined format. For example, one or more software objects of the Middle Tier interprets the request, identifying the requested data and/or requested function and corresponding data parameters necessary to perform the function. The data is retrieved from the database as described herein, and the function, which may be embodied in a separate object or component, is performed. The resulting data is provided to the third party in essentially any format, including XML, electronic data interchange (EDI), text, by direct access, and the like.

In addition to the four software logical levels, the Middle Tier 400 also contains discrete functional components or services implemented in the server software. The first is the Data Monitor 445, which is the interface between the Business Logic Layer 410 and the Device 100. The Data Monitor 445 uses a UDP/IP (or TCP/IP in alternate embodiments) socket protocol to communicate with the Device 100 through the Device's unique IP address. The Data Monitor 445 is a dedicated component that monitors a specific designated port for incoming Device 100 data, collects incoming data from deployed Devices 100, and posts the data to either an Alert Notify Queue, when the device data is an alert, or a Non-Alert Notify Queue, when the device data is not the result of an alert.

The second functional component is the Polling Service 450, which causes a polling of the Devices 100 based on the polling frequency with the Device Table. Without interrupting normal operations, the amount of time between each data point can be adjusted by adjusting the polling frequency. The method of identifying the devices to be polled utilizes the Polling Service 470 and the PD 300 to generate a report of devices that need to be polled. This report is then used by the Business Logic Layer 410 to poll the individual devices. It should be understood that such polling, and the Polling Service 470 itself, are optional. For example, in alternate embodiments, the Polling Service 450 is replaced with an SQL job that runs at predetermined times to request data from all or certain Devices 100. Such a predetermined request is referred to as a regular data request.

Another functional component is the Notification Service 465, which accesses Non-Alert and Alert Notification Queues in the Middle Tier 400 and accesses the Notification Type Table and Notification Table in the PD 300, previously described, and generates notification alerts to users 25 whenever alarms are triggered by the system and to system administration wherever errors are detected. Notification alerts are sent to users 25 via Alert Devices. As described in greater detail below, various other Middle Tier 400 components may determine a notification needs to be sent, in which case such other components create an XML document specifying the required notification and places it in the appropriate Notify Queue.

The Notification Service 465 will forward a message to the CMC 40 whenever an alert is generated. This information will be used by a system administrator (e.g., Customer Relations Specialist) to respond to users 25 as appropriate to find additional information beyond the basic message generated by the automated notification system. Further, these messages may be sent directly to the call management software to provide automated handling and routing of incoming user queries, thereby improving customer experience and call handling speed.

As described in greater detail below, the Communication Service 460 determines when to resend messages to the Devices 100. In short, the Communication Service 460 monitors the Device Message and Device Message Type Tables for entries (i.e., messages) that, based on the retry interval, need to be resent. Furthermore, based on the retry count and maximum retry count fields, the Communication Service 460 determines when the maximum number of retries for each message has been reached, in which case the Communication Service 460 posts a message to the Non-Alert Notification Queue to indicate a device failure to a system administrator.

The Middle Tier 400 also includes a Data Processor Service 455 for handling device data. As discussed below, the Data Processor Service 455 monitors the Alert Queue and Non-Alert Queue (in which device data is posted by the Data Monitor Service 445). Based on the entries in the queues, the Data Processor Service 455 will update the PD 300 and generate entries in the Non-Alert and Alert Notify Queues, as appropriate, for action by the Notification Service 465.

The Middle Tier 400 also includes a Registration Test Service 470 for assisting in the registration of new users 25. This optional service generates a test communication to a newly registered user's Device 100.

Another optional service is the Log Service (not shown). The Log Service operates in conjunction with a Log Queue to track use of and debug the system. In general, each of the other services posts a record to the Log Queue, thereby creating a history of the system activity.

The last functional component is the Service Monitor 475, which sits in the background and continually sends test data to verify that the other services and components are working and collecting data. If a component fails to respond, the Service Monitor 475 is able to stop the component process and restart it in an attempt to fix the problem. In addition, the Service Monitor 475 can cause the Notification Service (described below) to notify personnel to intervene if the component does not restart properly.

The Middle Tier 400 also includes various queues, which are accessed by the various services and are preferably implemented using Microsoft Message Queuing or similar technology. As such, each entry in the queues is preferably and XML document containing the data or parameters to be utilized by the particular service accessing the queue. As will be appreciated based on the description herein, by posting the service parameters to the queues, allows the services can operate asynchronously.

Notably, the Middle Tier 400 includes an Alert Notification Queue and a NonAlert Notification Queue for use by the Notification Service 465 and the Communication Service 460. In the present embodiment, these Notification Queues contain XML documents that include the following data: business application ID (to identify the appropriate application and corresponding business layer), notification type ID (to indicate to the Notification Service how to format the message), alert device type description (to indicate the alert device type), alert device address (for specifying the Alert Device destination), notification content, and notification message.

Similarly, the Middle Tier 400 includes an Alert Queue and a Non-Alert Queue. As described below, the Data Monitor Service 445 posts records to these queues and the Data Processor Service 455 accesses and utilizes records in these queues. Each record in these queues preferably includes the IP address of the Device to which the record pertains and the device data received from the Device 100 identified by the IP address.

The ASP 200 also contains one or more servers that support the system's Website. The primary user interface for owners of Devices 100 and authorized users 25 will be the system Website. The forgoing discussion is directed at an embodiment of the invention with one system Website adapted for all applications of the system, for example, patient monitoring, child monitoring, and cargo monitoring. Alternate embodiments of the invention can include separate system Websites each tailored for different applications. In general, the system Website allows authorized users to update the configuration of the Device 100, including the data collection frequency, as well as monitor other parameters. In addition, the Website allows users to view historical information for the Devices 100 and get current location and sensor information. Ideally, nearly all operations that a user or owner may wish to perform can be done through the system Website. Such inputs are passed to the ASP 200, where the Middle Tier 400 process the inputs, updates the PD 300, and performs such other operations as necessary.

The Website preferably provides not only the current location of the Device 100, but also its historical locations. The Device Location History is displayed to the user through a time history graphical display. The display may include a map with individual data points that correspond to recent past data points (e.g., locations and sensor data) of the Device 100. Such data points are retrieved from the Device Log and Device Log Values Tables. When the cursor is moved over top of the individual data points, a pop up window presents the data point information. Future embodiments of this application can provide directions from the Device 100 to a point of interest based not only on where the Device 100 is located, but also on the direction it is traveling.

A display feature of the system Website allows multiple Devices 100 to be mapped on a single map display at the same time. This is particularly useful when there is a single owner who has multiple Devices 100 associated with a single account. The software generating the display assigns different display identifier (e.g., color, shape, text, etc.) to each Device ID associated with the Account ID and uses the identifier for each data point retrieved from the Device Log and Device Log Values Tables.

The system Website will enable users to generate customized reports on Device 100 history. For example, a user may generate a customized history report that details all alerts generated by a Device 100, as stored in the Service Log Table, and the location of those alerts as specified in the Device Log Values Table, for a past specified number of days. Use of this historical data should be considered, for example, as a means to provide feedback on the practicality of current alert thresholds.

As discussed herein, all customizable sensor threshold parameters input by a user go through an initial logic check at the system Website. If potentially suspect values have been entered by the user, the Website will verify the information and highlight potential problems with the selected threshold values, e.g., the parameter is possibly set too low and may generate a large number of alerts.

The Middle Tier 400 can function in response to a user query to generate an "on-demand request" for Device 100 information. For example, if a user is logged onto the website and is viewing the web page associated with their Device 100, they can click on a button that will request an update of the current Device 100 location and sensor information. The Middle Tier 400 will then generate a request for information and display the resulting information returned from the Device 100 or report an error if there is a failure or no response.

The Middle Tier 400 can also locate specific points of interest within close proximity of the Device 100 through a database query in response to a user request. For example, a query based on the current reported location of the Device 100 can locate the nearest small or large city. Other points of interest may be incorporated, such as hospitals, police stations, or restaurants. A number of commercial databases can be used to obtain this functionality because the query is utilizes latitude and longitude information as the point of contact.

As noted above, whether a single system Website is used or multiple sites, each vertical market website will pass an application ID to the Middle Tier 400 to identify which Business Logic Layer 410 to use and which table of the PD 300 to access. When a patient monitoring user enters their user name and ID on the Website, the Website will pass the ID back to the Middle Tier 400 to assist in the identification of the proper business rules, tables and the like.

MESSAGE PACKET PROTOCOL AND SEQUENCING

Having described the various components and general operation of the present embodiment, the operation of the data transfer protocol between the Device 100 and the ASP 200 will now be described in greater detail with reference to FIGS. 8(*a*) through 8(*e*) in the context of an embodiment of the invention where the Device 100 is equipped to transmit GPS position, temperature, and fall down data. FIG. 8(*a*) depicts a uniform data packet format. In general, the data packet is comprised of a top layer of an application protocol with three sub-protocol layers. The Standard Data Protocol 1 (STDP-1) is the top layer and is the parent communication application layer protocol between the CDPD Device 100 and the ASP 200. STDP-1 is comprised of Wake Up Byte Code followed by seven sequential segments: TOP, Control1, Data Length1, Data1, CRC, MessageID, and END. The Wake Up Byte Code is a single byte command from the ASP 200 to the Device 100 that starts up the Device 100 modem. The Data1 field within STDP-1 comprises the sub-protocol STDP-2 level, which contains at least one and up to n data packets, each comprised of three segments: Control2, Data Length2, and Data2. The Data2 segment is further divided into the sub-protocol STDP-3 level, which contains the actual data being transmitted between the Device 100 and the ASP 200.

The STDP-1 top-level protocol segments will now be described in greater detail with reference to FIG. 8(*b*). The TOP segment contains a constant header identifier such as a number or string of characters at the beginning of the packet that functions as a signal that a data packet is incoming. In the present embodiment of the invention, the constant in the TOP segment is hexadecimal (H) number AA55. The Control1 segment defines all the command sets for the STDP-1 transportation layer application program and contains the Control Byte that is associated with the type of data being transmitted. For example, with reference to FIG. 8(*b*), if the Device 100 user sends an emergency signal to the ASP 200, the Control Byte in the Control1 segment would be the hexadecimal number 02. Similarly, if the transmitted data were an ASP 200 acknowledgment of data received from the Device 100, the Control Byte in the Control1 segment would be the hexadecimal number 10, and so forth. The Data Length1 segment within the STDP-1 protocol contains the total number of bytes of the data being transmitted in the Data1 segment that follows it. In the present embodiment of the invention, the Data Length1 segment is defined as a two-byte hexadecimal number. The message preferably includes error detection and/or correction information. Thus, the message includes a CRC segment that detects any corruption in the Control1, Data Length1, or Data1 segments by performing an eXclusive OR (XOR) logical function on these three segments. The MessageID segment contains a hexadecimal identifier that preferably uniquely identifies the message. Responsive messages include the same message ID, thereby enabling the Middle Tier 400 to pair each message with its response, if any. The END segment is analogous to the TOP segment and contains a constant tail header identifier, such as a number or string of characters at the end of the packet, that functions as a signal that the data packet has ended.

The STDP-2 sub-protocol segments will now be described in greater detail with reference to FIG. 8(*c*). The STDP-2 corresponds to the Data1 segment of the STDP-1 protocol. The STDP-2 sub-protocol contains at least one and up to n number of discrete data packets that describe the type of data and the length of the data that is being transmitted. The Control2 segment within the STDP-2 sub-protocol defines the type of data that is being transmitted by associating control bytes consisting of hexadecimal numbers 00 through FF with a specific configuration or data request between the Device 100 and the ASP 200 or vice versa. In an embodiment of the invention, only control bytes 01 through 08 are defined while control bytes 09 through FF are reserved for future use. For example, with reference to FIG. 8(*c*), incoming GPS position data from the Device 100 to the ASP 200 would carry the hexadecimal 02 control byte in the Control2 segment. The Pre-set Commands listed in FIG. 8(*c*) are described in greater detail below. The Data Length2 segment contains the total number of bytes of the data being transmitted in the Data2 segment that follows it. The Data2 segment, described in greater detail below, contains the actual data of the data packet being transmitted.

The STDP-3 sub-protocol layer, which contains the Data2 segment of the STDP-2 sub-protocol, will now be described in greater detail with reference to FIG. 8(d). The STDP-3 sub-protocol defines the communication format for all application data types. Specifically, the present embodiment of the invention defines eight configuration or data type assigned ID numbers 1 through 8. GPS position data is transmitted in standard ASCII code for latitude, longitude, and time in the format shown in FIG. 8(d). The data includes a flag to indicate whether the GPS data received from the Device 100 is valid. In the present embodiment the GPS data is marked invalid (V) when the Device 100 is unable to receive new GPS data. In such an event, the Device 100 retrieves the last known location, as stored in the Device's memory and sends it back to ASP 200. Temperature data is transmitted in ASCII code as degrees Celsius and includes a hexadecimal number (DDD) that identifies the Watch Unit 202 from which the data is being transmitted. The Fall Down data is defined as a single byte two-state hexadecimal number where the 01 state represents a normal condition and a 00 state represents a fall down condition.

The Pre-set Center Call Configuration Command is the ASP's 200 initial request for information and is defined as a ten-byte ASCII code where the Device 100 ignores the last two digits. The Pre-set Time Call Configuration Command is sent by the ASP 200 to the Device 100 to specify the time interval that the Device is to send position and sensor data to the ASP. The Command is defined as a 12 byte ASCII code with the maximum interval of 255 minutes. The Pre-set Position Range Alarm Configuration Command, sent by the ASP 200 to the Device 100, defines the physical boundaries of the Device 100. If the Device 100 determines that its position is out of this boundary, the Device 100 transmits an alarm to the ASP 200 as described below. The Command format is a 21-byte code consisting of the latitude and longitude of the upper left and bottom right corners of the boundary. In alternate embodiments, the command passes the radius of the boundary. The micro processor of the Device uses the radius to determine whether or not the GPS position of the Device 100 is a further distance from the home location (i.e., center of the permissible location circle). Each coordinate is defined by four bytes where the first byte is degree, the second byte is minutes, and the third and fourth bytes are fractional parts of a minute. The last byte of the data is reserved to enable or disable the GPS receiver within the Device 100. The Pre-set Fall Down Alarm Command is defined as a single byte used by the ASP 200 to enable and disable the Fall Down sensor in the Device 100. The Pre-set Temperature Range Alarm Configuration Command is defined as a four byte ASCII code where the first two bytes represent the upper limit in degrees Celsius, up to a maximum 60° C. and the last two bytes represent the lower limit in degrees Celsius, down to a minimum 0° C. The temperature alert/sensor is disabled when the upper limit equals the lower limit.

Figure 8A:
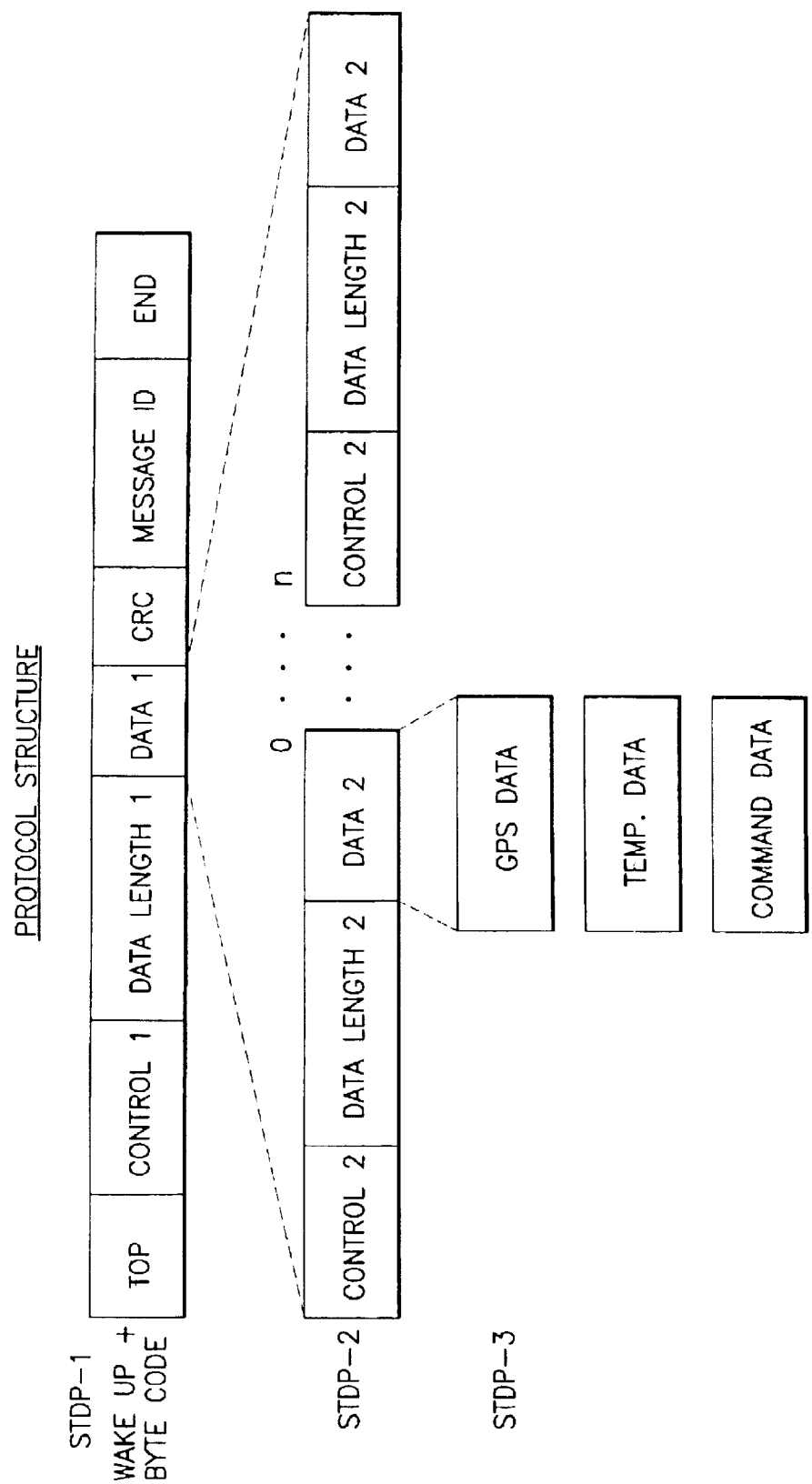

FIG. 8(e) summarizes the message packet configuration detailed in FIGS. 8(a) through 8(d) for the possible configuration and data types in the present embodiment of the invention. The first five rows (ID Nos. 1 through 5) represent the five initial configuration commands, described below, sent by the ASP 200 to the Device 100 upon startup. ID No. 6 corresponds to a response from the ASP 200 to the Device 100. ID No. 7 corresponds to a response from the Device 100 to the ASP 200. The last seven rows in FIG. 8(e) (ID Nos. 8 through 14) represent various alarms and commands sent by the Device 100 to the ASP 200.

The ASP 200 request for data and each of the four initial configuration commands will now be described in greater detail with reference to FIGS. 9a through 9n. In general, each of these figures represent a time line sequence of command and data exchange between the ASP 200 and the Device 100. The two vertical lines in these figures represent a time axis (with time progressing top to bottom) with the left line representing the ASP 200 and the right line representing the Device 100. The numbered horizontal arrows between the vertical lines represent a command or data exchange. The number designation that appears above each horizontal lines represents designates the type of command or data being transmitted and corresponds with the ID column of FIG. 8(e), described above. For example, the No. 9 transmission depicted in FIG. 9b represents a general data message from the Device 100 to the ASP 200.

As an initial matter, in certain embodiments the ASP 200 first sends a "wake-up" byte code to the Device 100 before any data is sent to wake up the modem with a 50 ms delay before sending the message although such a wake-up code is not be necessary.

Furthermore, the Device 100 initially transmits the Device Register Command (No. 14) to the ASP 200 when it is turned on to signal to the ASP 200 that it is on and needs to be configured, with no re-transmittal and no acknowledgment. In alternate embodiments the Device 100 retries for a predetermined number of times until the ASP 200 provides a responsive acknowledgement. If no acknowledgement is received, the Device 100 alerts the wearer locally.

Once the ASP 200 receives the Device Register Command, the ASP 200, and more particularly, the Data Processor Service, responds by sending the configuration commands to the Device 100, thereby configuring the Device's alert parameters values and rules. While in the present embodiment the Data Processor Service 455 transmits the Pre-set Position Range Alarm, Pre-set Fall Down Alarm and Pre-set Temperature Alarm Commands in succession (transmitting one after the Device 100 acknowledges receipt of the previous) to configure the Device, it should be understood that any of the configuration commands may be sent to the Device 100. Where a volatile RAM is used by the Device 100 to store the parameters, such configuration is required. In the present embodiment, each of the four configuration commands, or any subset thereof, are sent to the Device 100. The appropriate configuration command(s) are also sent to the Device 100 when a user 25 decides to change alert threshold values or rules, including when the user 25 changes the reference point for the range/position alarm, when the user 25 changes the radius for the range/position alarm, and the like.

Figure 9A:
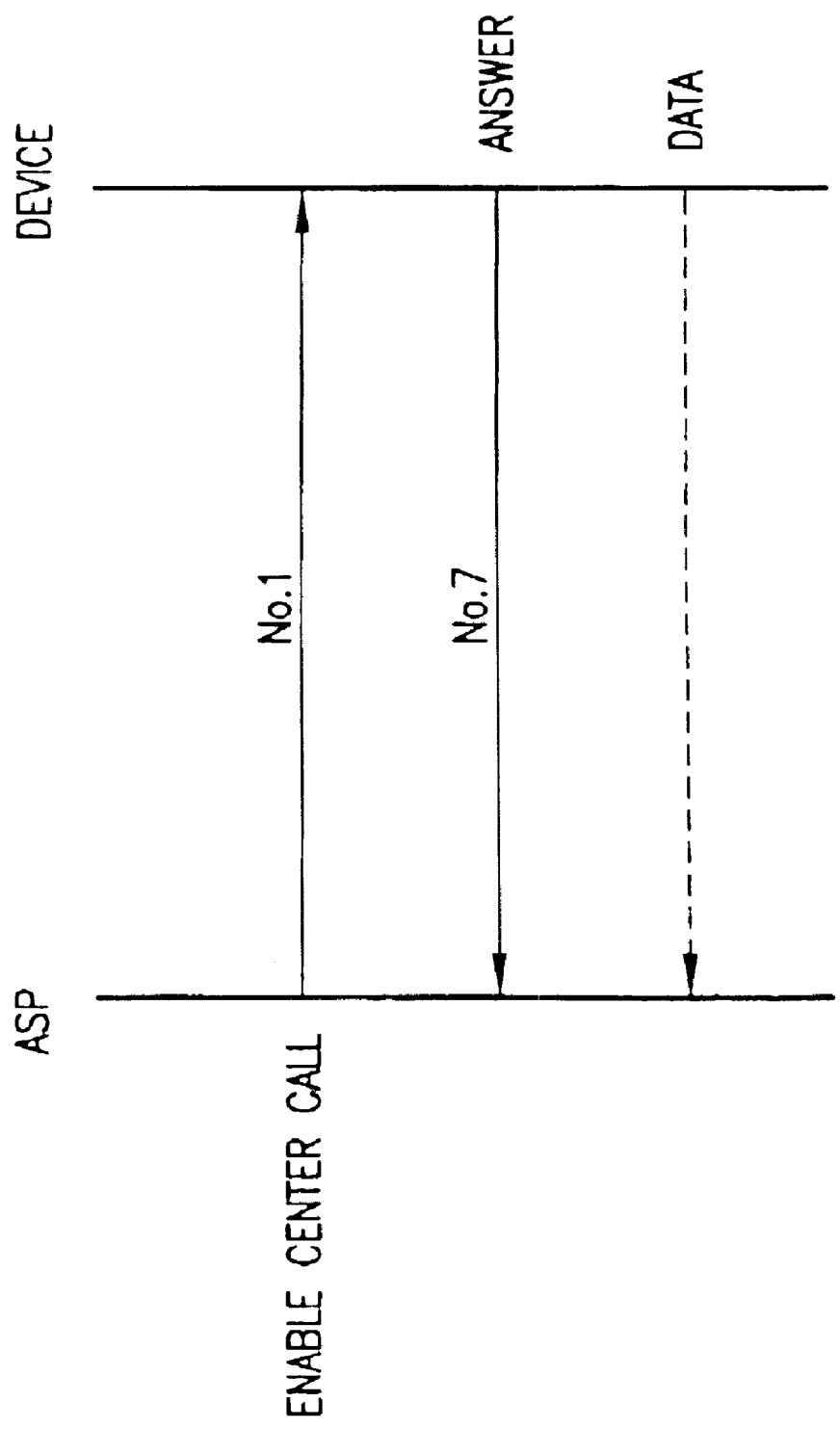
FIGS. 9a–n illustrate exemplary sequences of messages between the ASP and a Device according to one embodiment of the present invention.
Figure 9B:
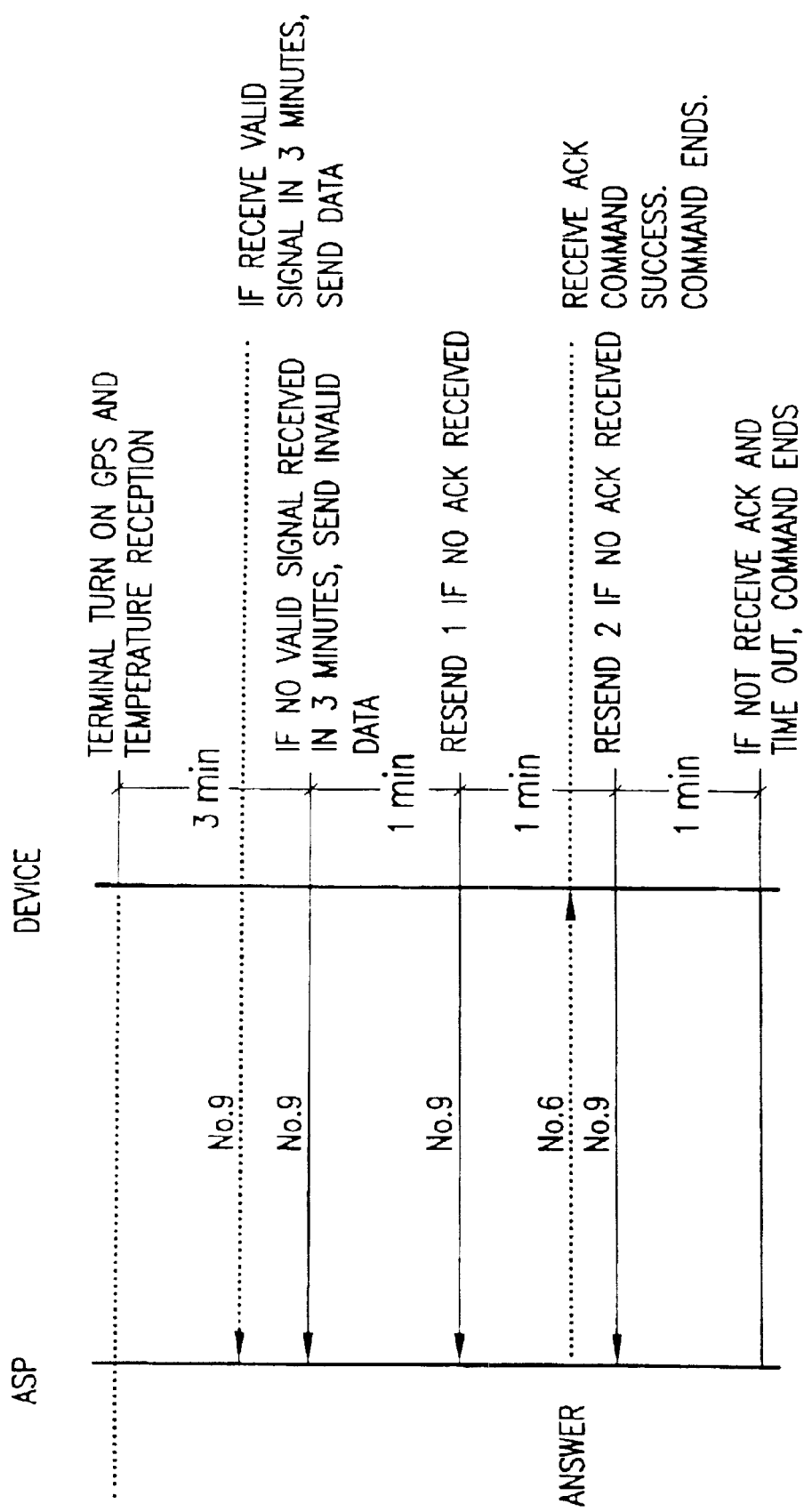

With reference to FIG. 9a, the first type of command transmitted by the ASP 200 to the Device 100 is a Center Call Command (No. 1), which is the ASP's 200 request for information from the Device 100 in response to a polled request, a regular data request or an on-demand user request. The Device 100 responds by Command No. 7 (i.e., ID No. 7 in FIG. 8(e)) and turns on the GPS and temperature reception. With reference to FIG. 9b, if the Device 100 receives valid GPS and sensor data within three minutes, the Device 100 transmits the data by Command No. 9 to the ASP 200 in the manner previously described. If the Device 100 does not receive a valid data signal at the end of three minutes, the Device 100 transmits an invalid data code by Command No. 9 to the ASP 200 with whatever information is stored in the Device's memory (e.g., buffer). Once the Device 100 transmits either valid data (A) or an invalid data code (V), the Device 100 waits one minute for the ASP 200 to transmit an Acknowledgment by Command No. 6. If the Device 100 does not receive the ASP's 200 Acknowledgment by Command No. 6 in one minute, the Device 100 re-sends the valid data or invalid data code by Command No. 9. After re-sending the valid data or invalid data code, the Device 100 waits another one minute for the ASP 200 to send an Acknowledgement by Command No. 6. If the Device 100 does not receive an Acknowledgement by Command No. 6 one minute after the last valid data or invalid data code was sent, the Device re-sends the valid data or invalid data code a second time and waits for an acknowledgement for one minute. If the Device 100 does not receive an Acknowledgement from the ASP 200 by Command No. 6, the Command times out and ends.

Figure 9C:
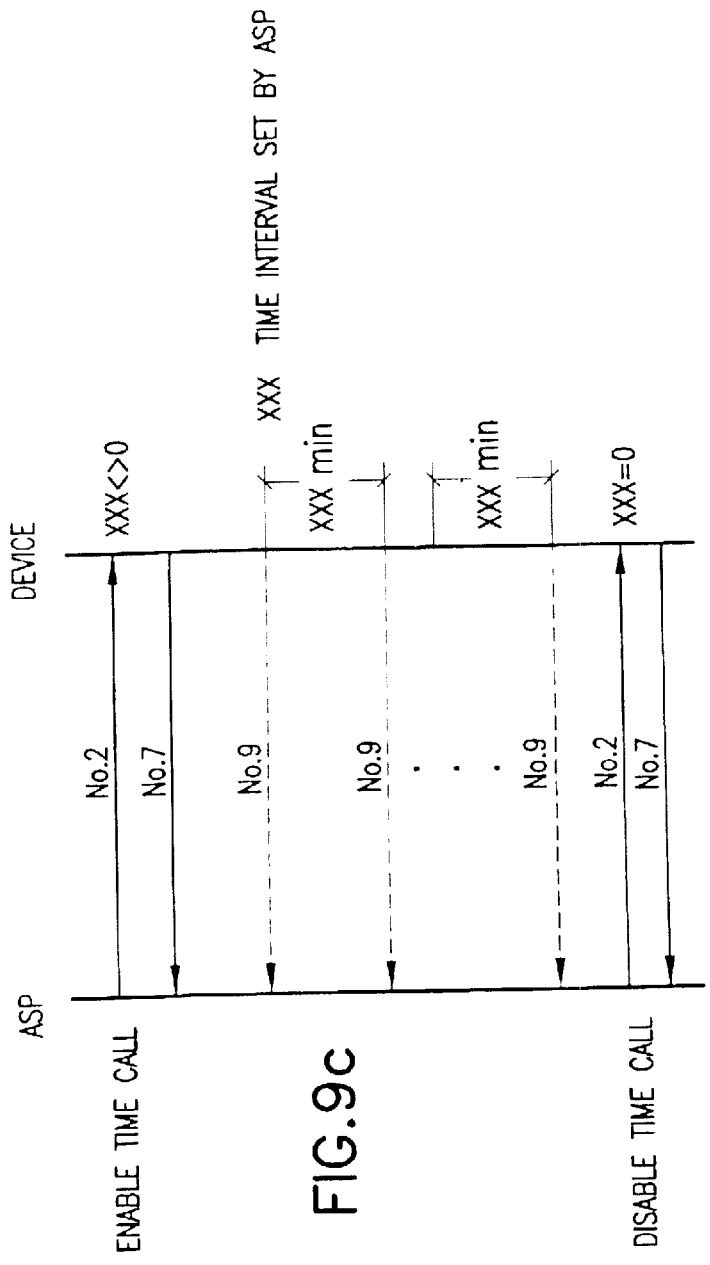

With reference to FIG. 9c, the first type of configuration command transmitted by the ASP 200 to the Device 100 is a Pre-set Time Call Command (No. 2), which specifies the time interval that the Device 100 is to automatically and continuously report data to the ASP 200. The specified time interval is denoted as xxx and is set by the ASP 200. An interval equal to zero is used to signify the disabling, or termination, of the periodic reporting. The Device 100 acknowledges the command by Command No. 7 and begins to transmit the data on Command No. 9 every xxx minutes. The Device 100 continues to transmit data by Command No. 9 every xxx minutes until the ASP 200 disables the Time Call Command by sending a message with xxx equal to zero.

Figure 9D:
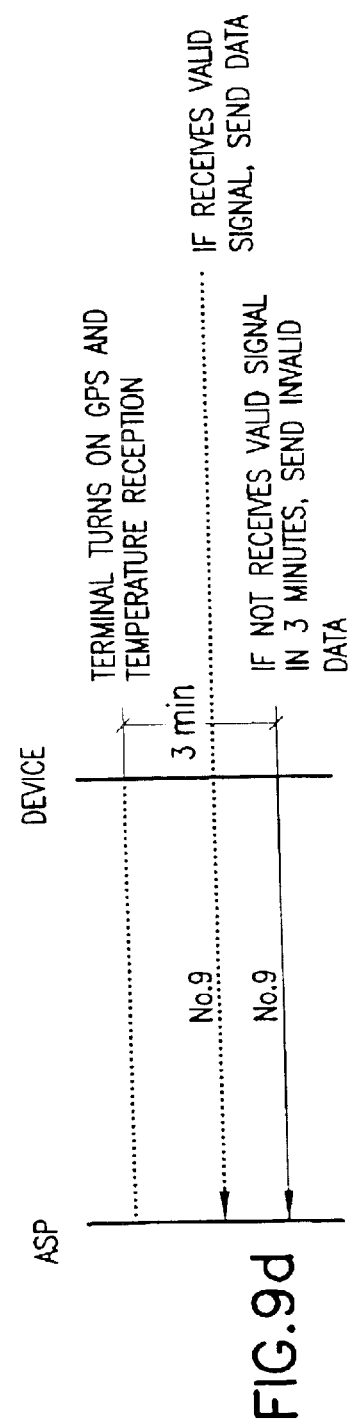

FIG. 9d illustrates the general operation of the Device 100 after it turns on and is configured. As an initial step, the Device 100 attempts to obtain valid GPS and temperature data. If the valid data is received, the Device 100 sends a device data message (No. 9). If no valid data is obtained, the Device 100 retries obtaining data for a predetermined period, e.g. 3 minutes. If valid data is not received, the Device 100 sends a message with the invalid data field set (No. 9).

Figure 9E:
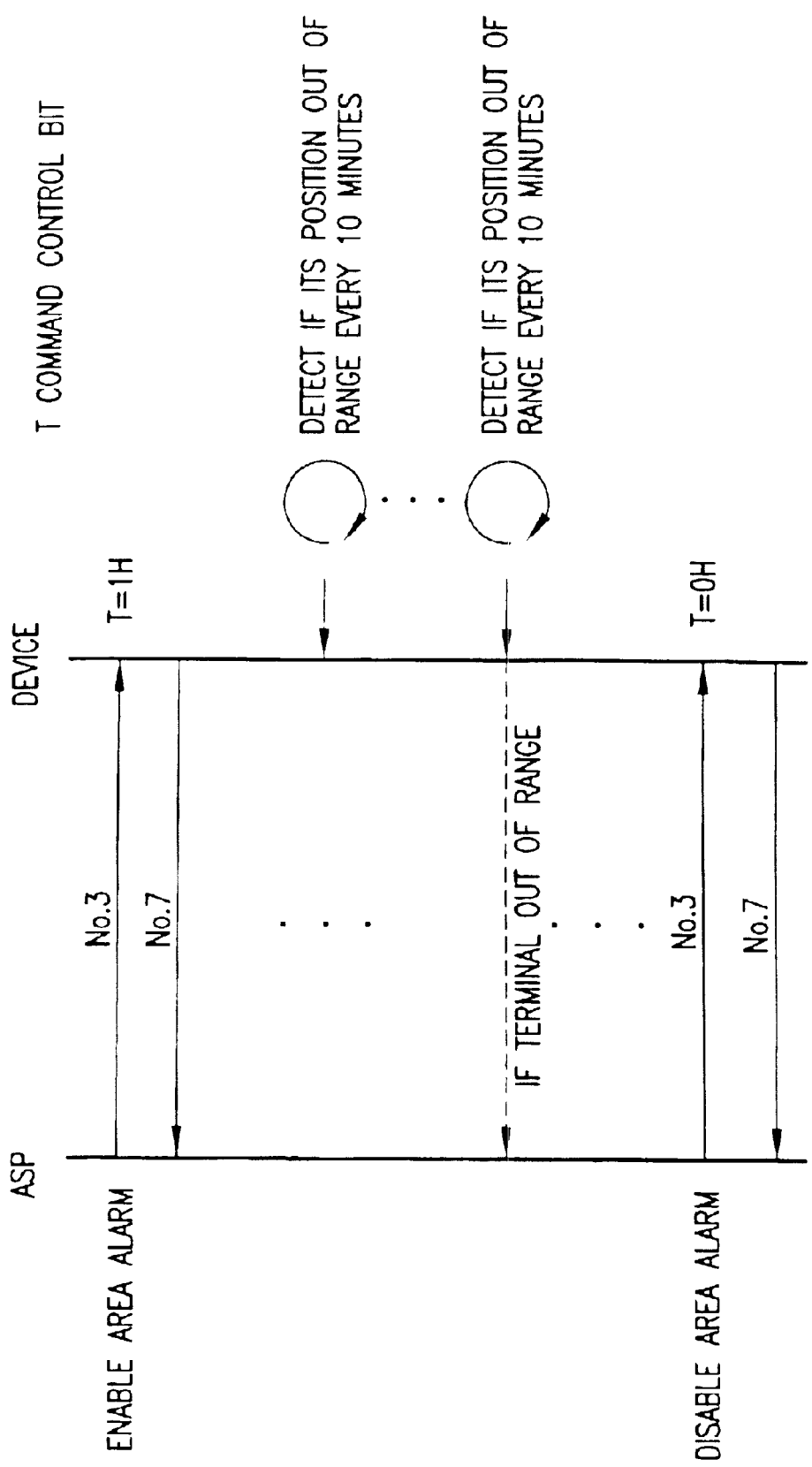
Figure 9F:
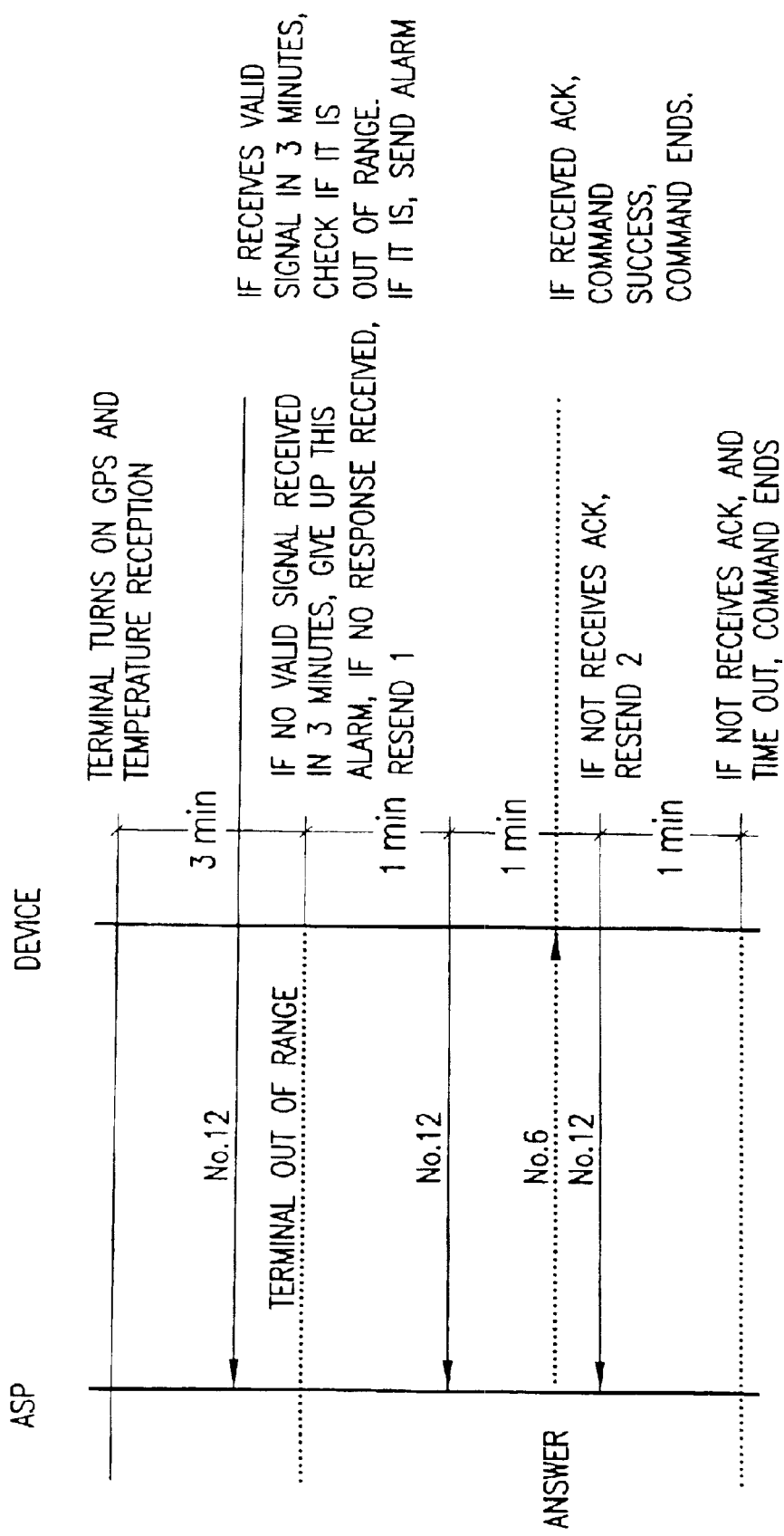

With reference to FIG. 9e, the second type of configuration command sent by the ASP 200 is the Pre-set Position Range Alarm Command (No. 3), which begins the Device's periodic position detection. When the Command Control Bit T is equal to 1, the position detection is enabled. When the Command Control Bit T is equal to 0, position detection is disabled. The Device 100 responds by Command No. 7 and begins detecting its position every ten minutes. If the position is in the alarm range, no alarm is transmitted. If the ASP 200 disables the position detection sensor by Command No. 3 (i.e., T=0), the Device 100 responds by Command No. 7 and ceases position alarm detection. With reference to FIG. 9f, if the position is out of alarm range and the Device 100 receives a valid signal within three minutes after the Device 100 turns on its GPS and temperature reception in response to the ASP's 200 Center Call Command, the Device 100 sends an alarm by Command No. 12 to notify the ASP 200 that the Device 100 is out of range. If the Device 100 receives an Acknowledgment from the ASP 200 by Command No. 6, the Command ends successfully. If the Device 100 does not receive an Acknowledgment from the ASP 200 by Command No. 6 within one minute after the Device 100 sent the alarm by Command No. 12, the Device 100 re-sends the alarm by Command No. 12. If the Device 100 again does not receive an Acknowledgment from the ASP 200 by Command No. 6 within one minute after it re-sent the alarm by Command 12, the Device 100 re-sends the alarm by Command No. 12 a second time. If the Device 100 again does not receive an Acknowledgment from the ASP 200 by Command No. 6 within one minute after the last alarm was sent, the Device resends the message after a predetermined interval, provided the alert condition still exists.

Figure 9G:
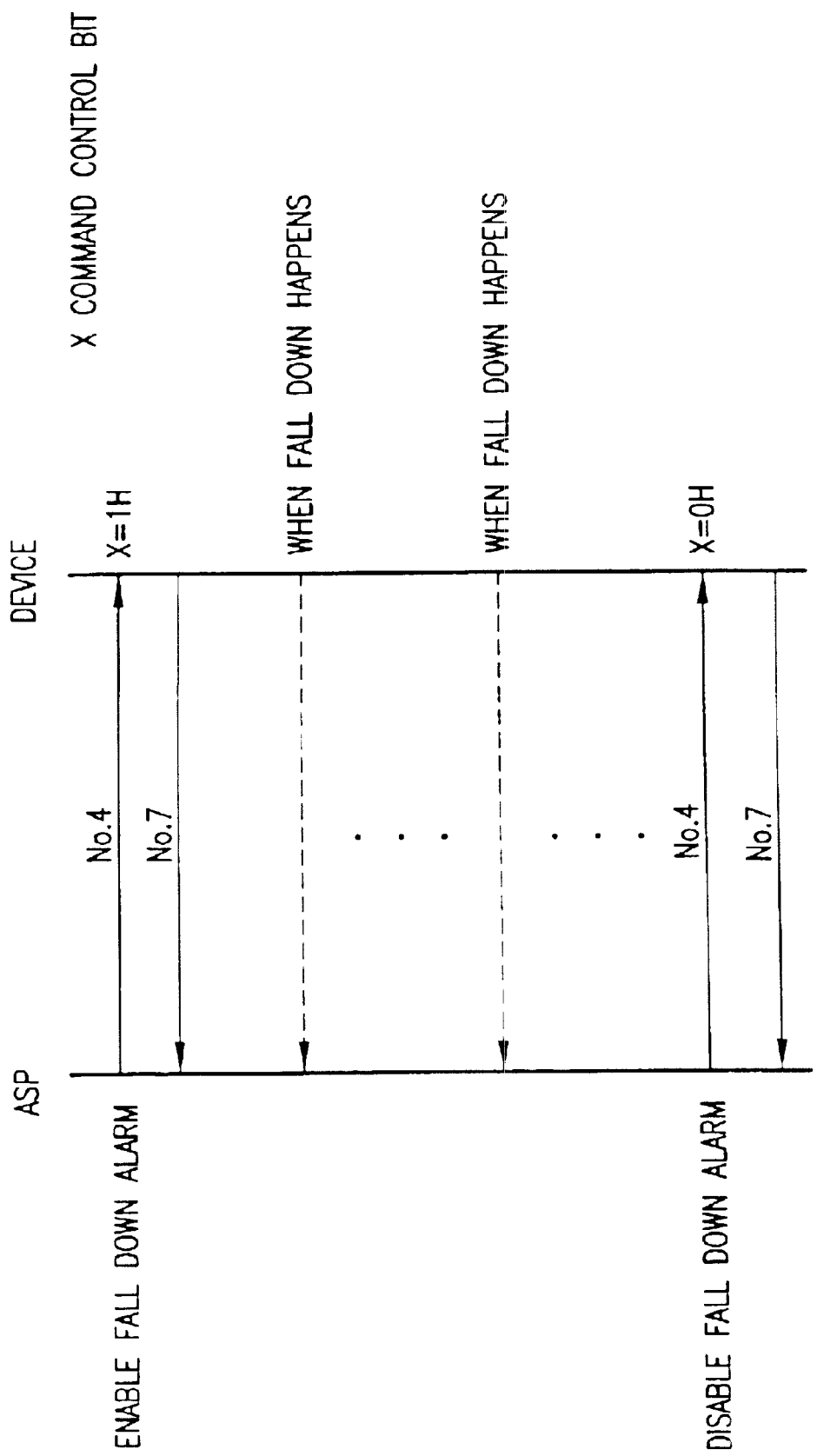
Figure 9H:
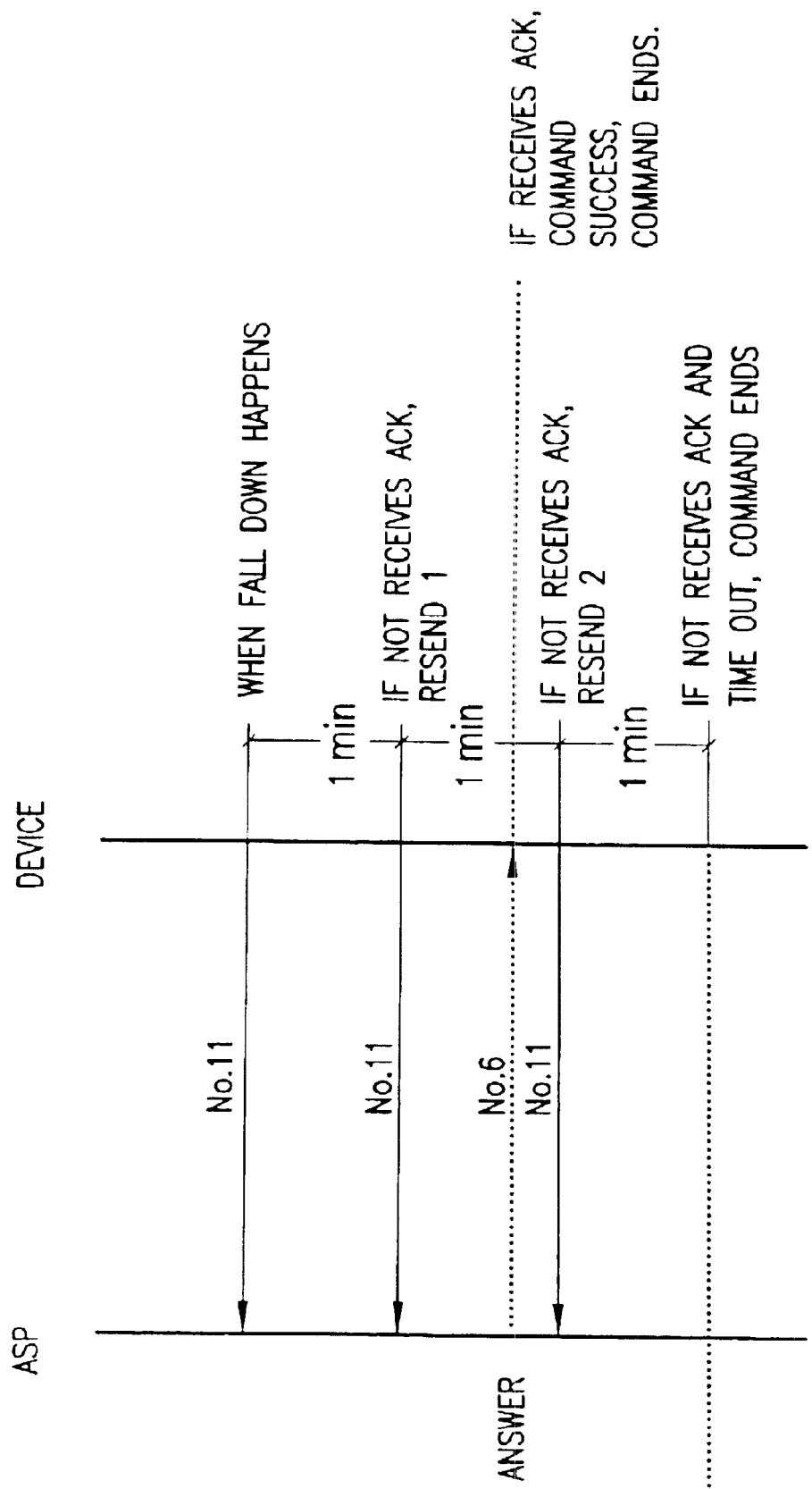

With reference to FIG. 9g, the fourth type of command sent by the ASP 200 to the Device 100 is the Pre-set Fall Down Alarm Command (No. 4), which requests fall down status. When the ASP 200 sends a Command Control Bit X equal to 1, the fall down alarm detection at the Device 100 is enabled and the Device 100 responds by Command No. 7. When the ASP 200 sends a Command Control Bit X equal to 0, the fall down detection at the Device 100 is disabled and the Device 100 responds by Command No. 7. If fall detection is enabled, begins detecting fall down data with a detection period of 50 ms. If the Device 100 detects a fall (i.e., a change from a normal state to a fall down state), the Device 100 transmits a fall down alarm by Command No. 11 to the ASP 200. If the Device 100 does not receive an Acknowledgment from the ASP 200 by Command No. 6 within one minute after the Device 100 sent the fall down alarm by Command No. 11, the Device 100 re-sends the alarm by Command No. 11. If the Device 100 again does not receive an Acknowledgment from the ASP 200 by Command No. 6 within one minute after the Device 100 re-sent the alarm by Command 11, the Device 100 re-sends the alarm by Command No. 11 a second time. If the Device 100 again does not receive an Acknowledgment from the ASP 200 by Command No. 6 within one minute after the last alarm was sent, the Command times out and ends.

Figure 9I:
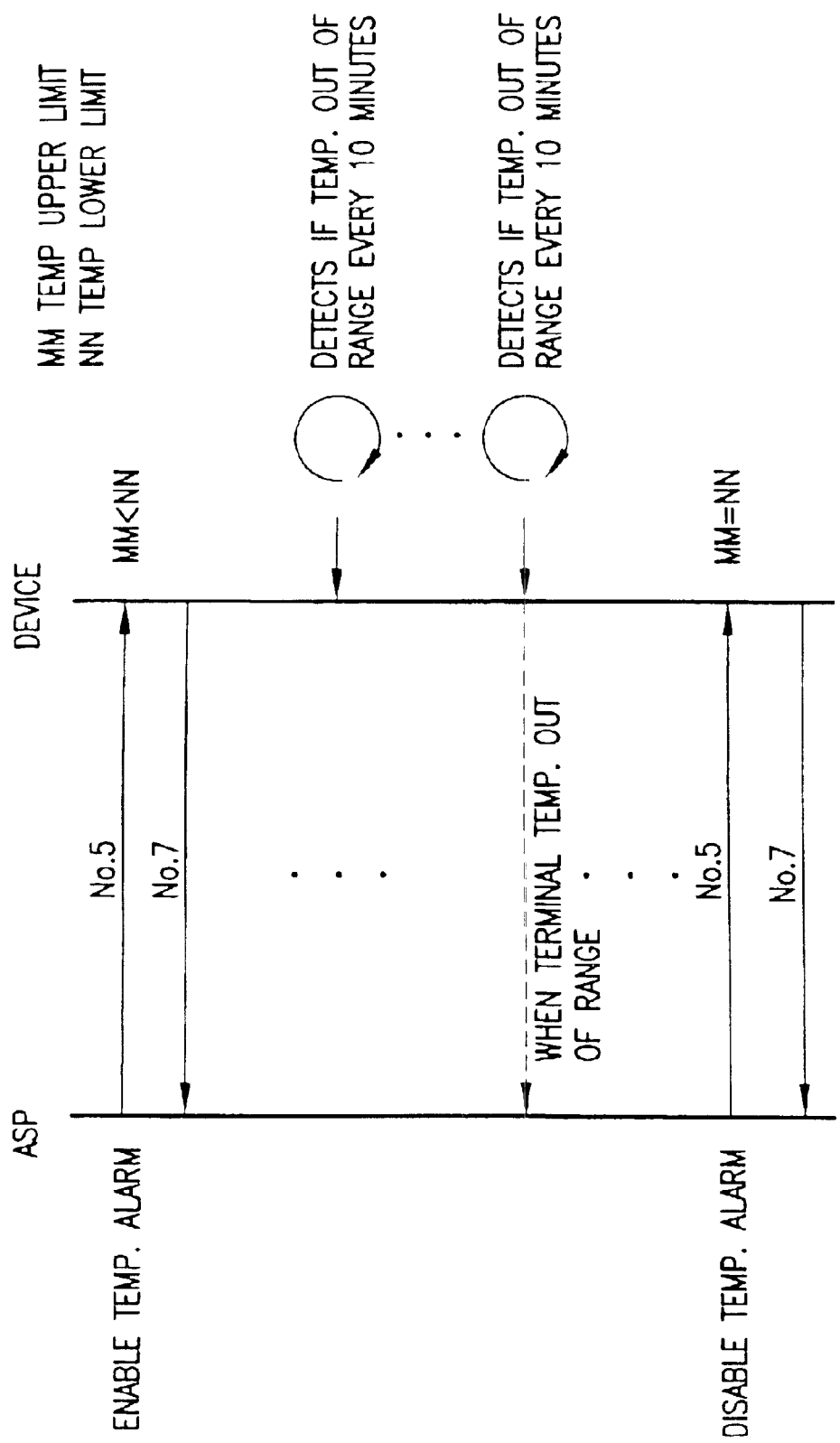
Figure 9J:
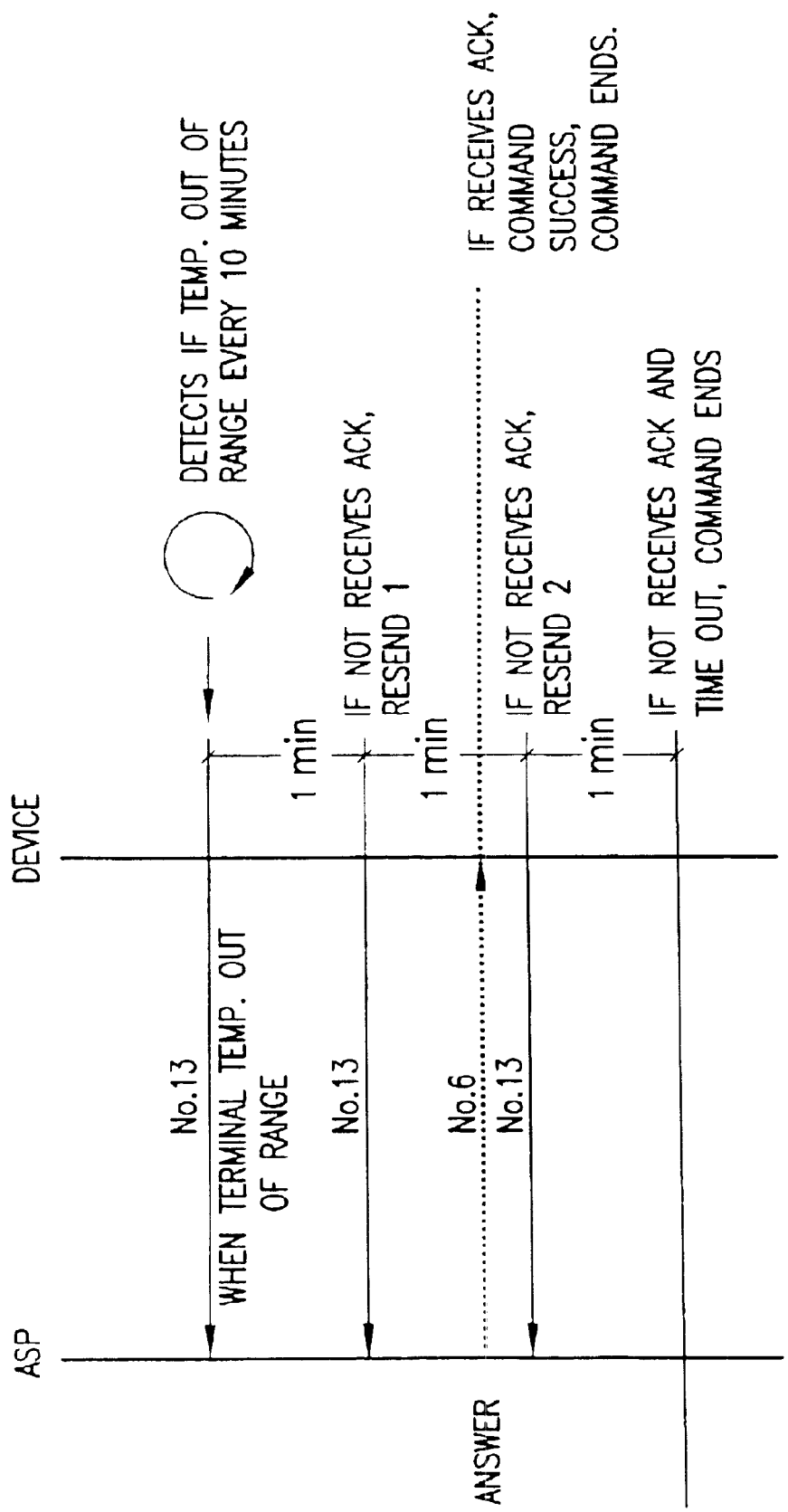
Figure 91:
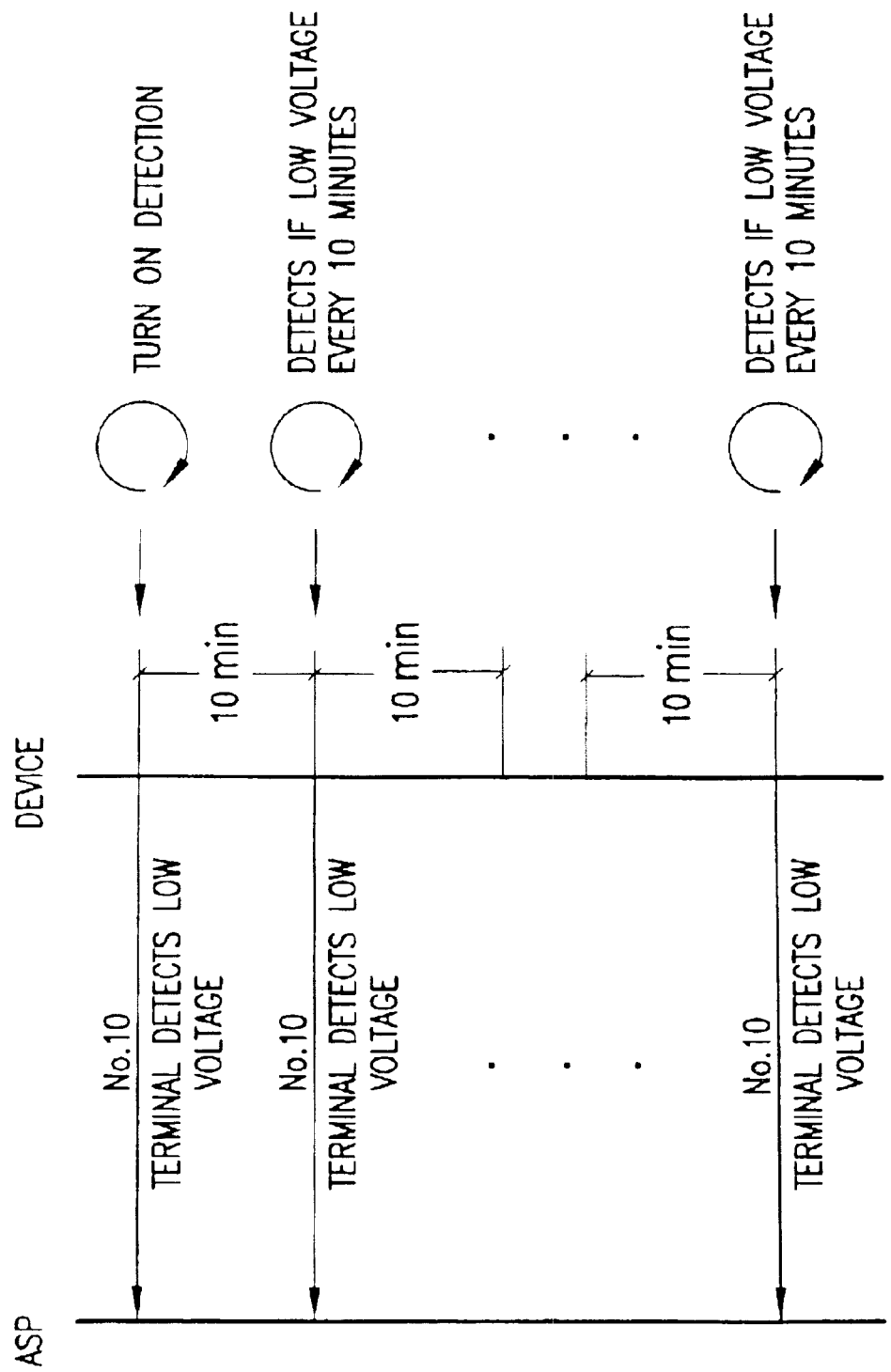

With reference to FIGS. 9i, the fifth type of command sent by the ASP 200 to the Device 100 is the Pre-set Temperature Range Alarm Command (No. 5), which enables the Device 100 temperature sensor. The Device 100 responds by Command No. 7 and begins detecting temperature every ten minutes until the sensor is disabled by the ASP 200. If the temperature is in the alarm range, no alarm is transmitted. If the temperature is out of alarm range, the Device 100 sends an alarm on Command No. 13 to the ASP 200. If the Device 100 does not receive an Acknowledgment from the ASP 200 by Command No. 6 within one minute after the Device 100 sent the temperature alarm by Command No. 13, the Device 100 re-sends the alarm by Command No. 13. If the Device 100 again does not receive an Acknowledgment from the ASP 200 by Command No. 6 within one minute after the Device 100 re-sent the alarm by Command No. 13, the Device 100 re-sends the alarm by Command No. 13 a second time. If the Device 100 again does not receive an Acknowledgment from the ASP 200 by Command No. 6 within one minute after the last alarm was sent, the Device resends the message after a predetermined interval, provided the alert condition still exists.

With reference to FIG. 9k, in a Terminal Emergency Call Command (No. 8), the Device 100 transmits a Terminal Emergency Call by Command No. 8 to the ASP 200. The Device 100 detects GPS position data and temperature data first. If the Device 100 receives a signal within three minutes, it sends an Emergency Call Command by No. 8 to the ASP 200. If the Device 100 does not receive a valid signal in three minutes, the Device 100 sends invalid data to the ASP 200. When the ASP 200 receives the data, it responds by Command No. 6. If the ASP 200 does not respond in one minute, the Device 100 re-sends the data by Command No. 8 three times. If no respond is received, the Command times out and terminates.

With reference to FIG. 9l, the Device 100 automatically detects system voltage when it is turned on. If low voltage is detected, the Device 100 transmits by Command No. 10 to the ASP 200. Once low voltage is detected, the Device 100 detects data every ten minutes without a response from the ASP 200. Other potential problems may be displayed to a user 25, such as the driver of monitored cargo (where the user is also the wearer), via status indicator on the Device 100. This information can also be reported back to the ASP

200 for monitoring and potential alert generation. The Device 100 can provide its status information on request. The Device 100 will also generate a message to warn the ASP 200 of low-battery and other conditions that may threaten the performance of the Device 100.

Figure 9M:
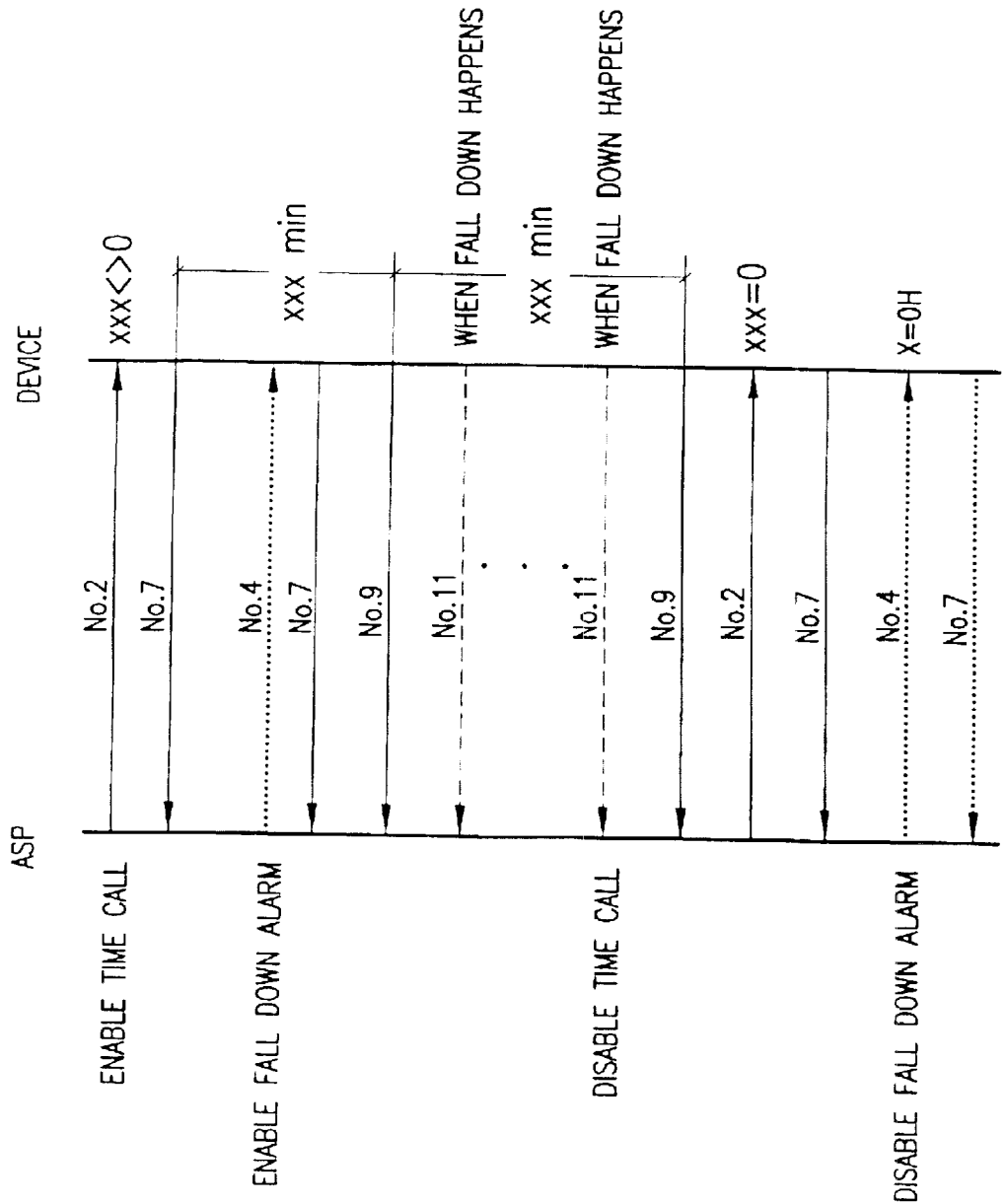

FIG. 9m illustrates the use of a Pre-set Time Call Command (No. 2) in conjunction with a Pre-set Fall Down Alarm Command (No. 4). As illustrated, once the Pre-set Fall Down Command is sent, the Device begins to respond (No. 7). Once the Pre-Set Fall Down Command (No. 4) is issued by the ASP 200, the Device's response becomes the General Data Message (No. 9).

In the event a Fall Down alert occurs, the Device 100 issues a Fall Down Alarm Message (No. 11). After the alarm message is received, the ASP 200 disables the Time Call Command by sending the command with xxx equal to zero (No. 2). The Device 100 acknowledges the command with a reply (No. 7). Having received the alarm, the ASP 200 proceeds to disable the Fall Down sensor/alarm with command No. 4 (with X=O).

Figure 9N:
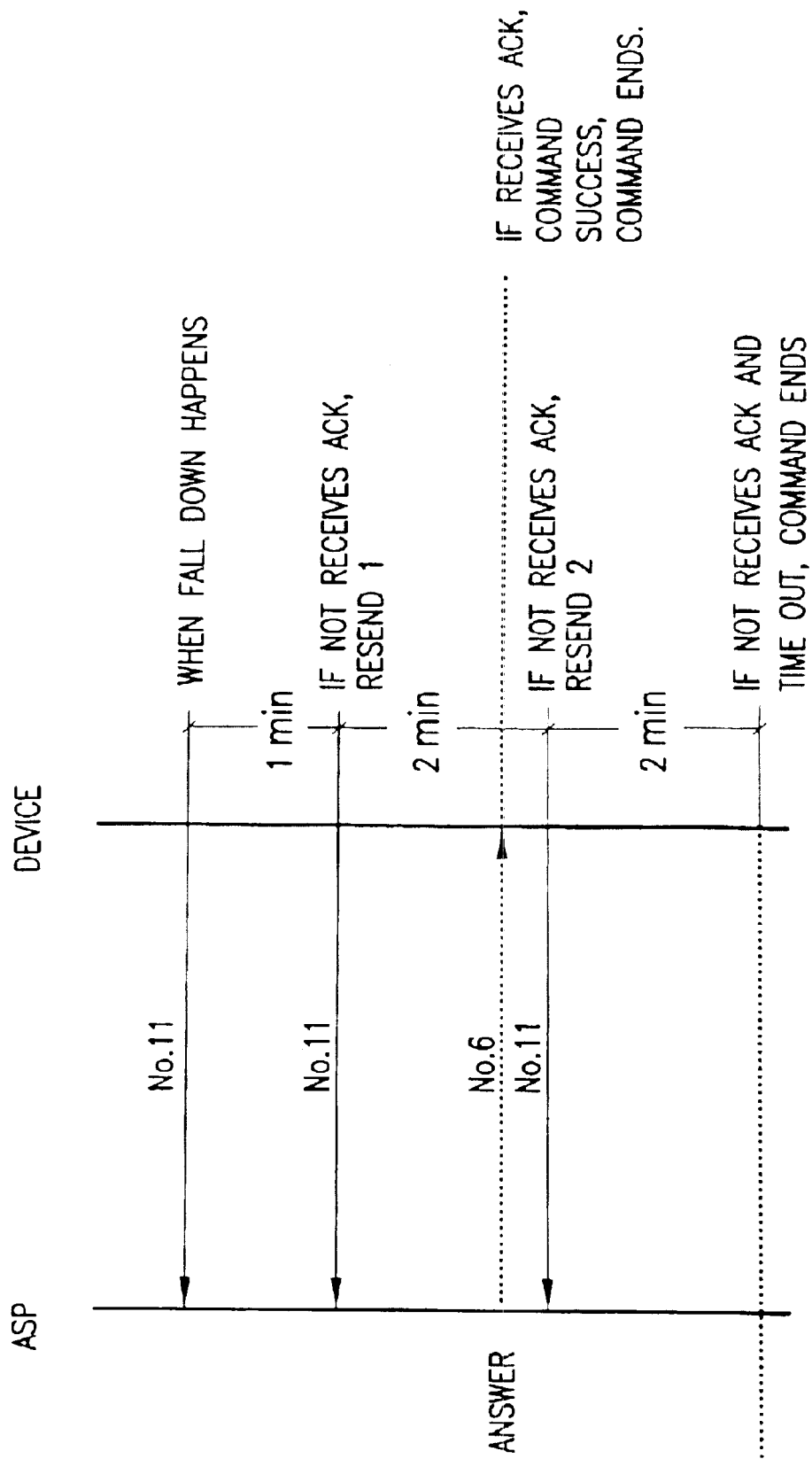

FIG. 9n illustrates a similar exemplary scenario in which the Device 100 transmits a Falling Down Alarm Message (No. 11), and resends the message until an acknowledgement message (No. 6) is received from the ASP 200. If no acknowledgement is received, the Device 100 continues to resend the alarm for a predetermined time period or number of times, at which point the alarm times out.

FLOW CHARTS

Figure 5A:
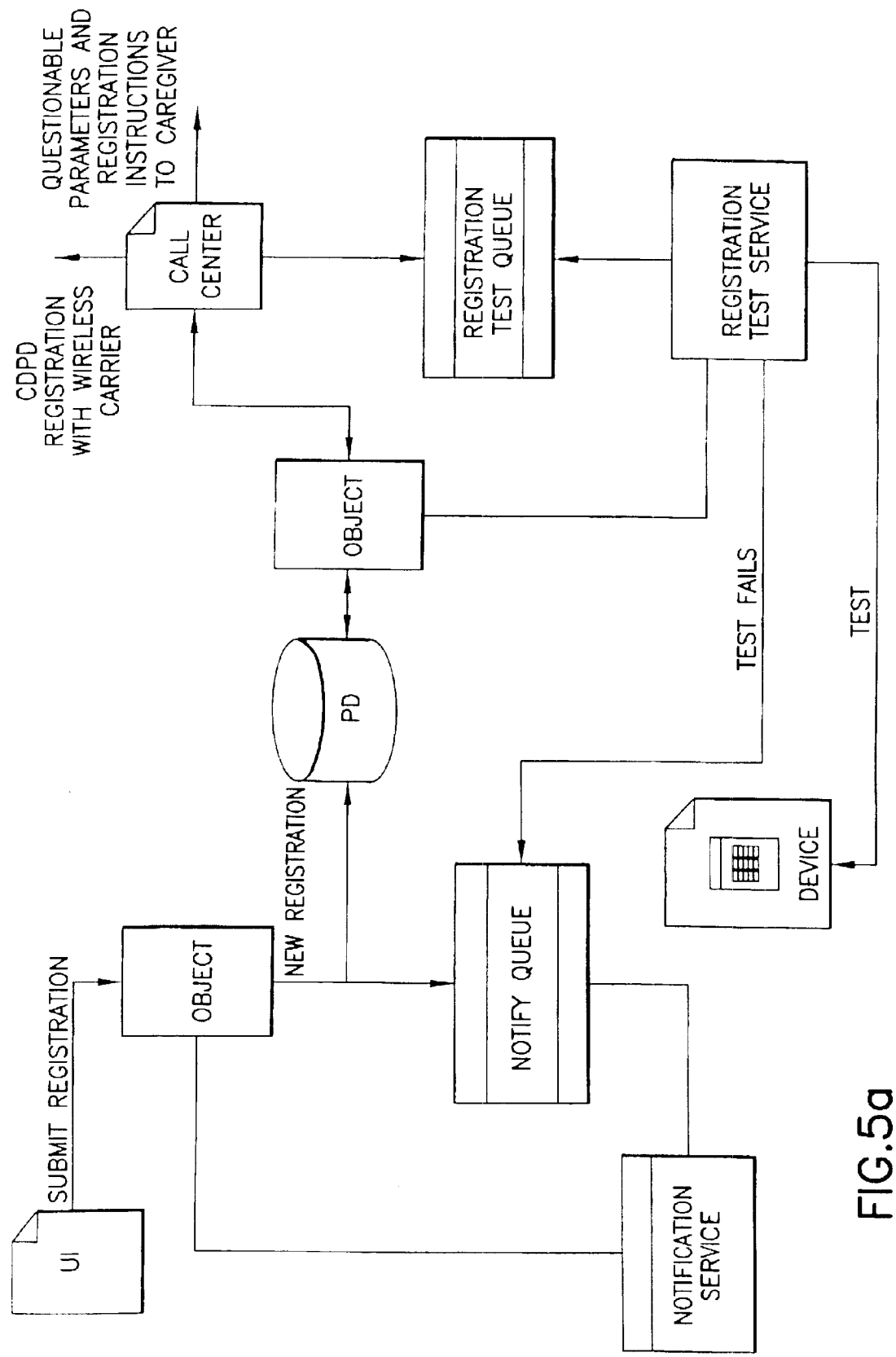
FIGS. 5a and 5b are an architectural schematic and a flow chart, respectively, illustrating the process of user registration according to one embodiment of the present invention.
Figure 5B:
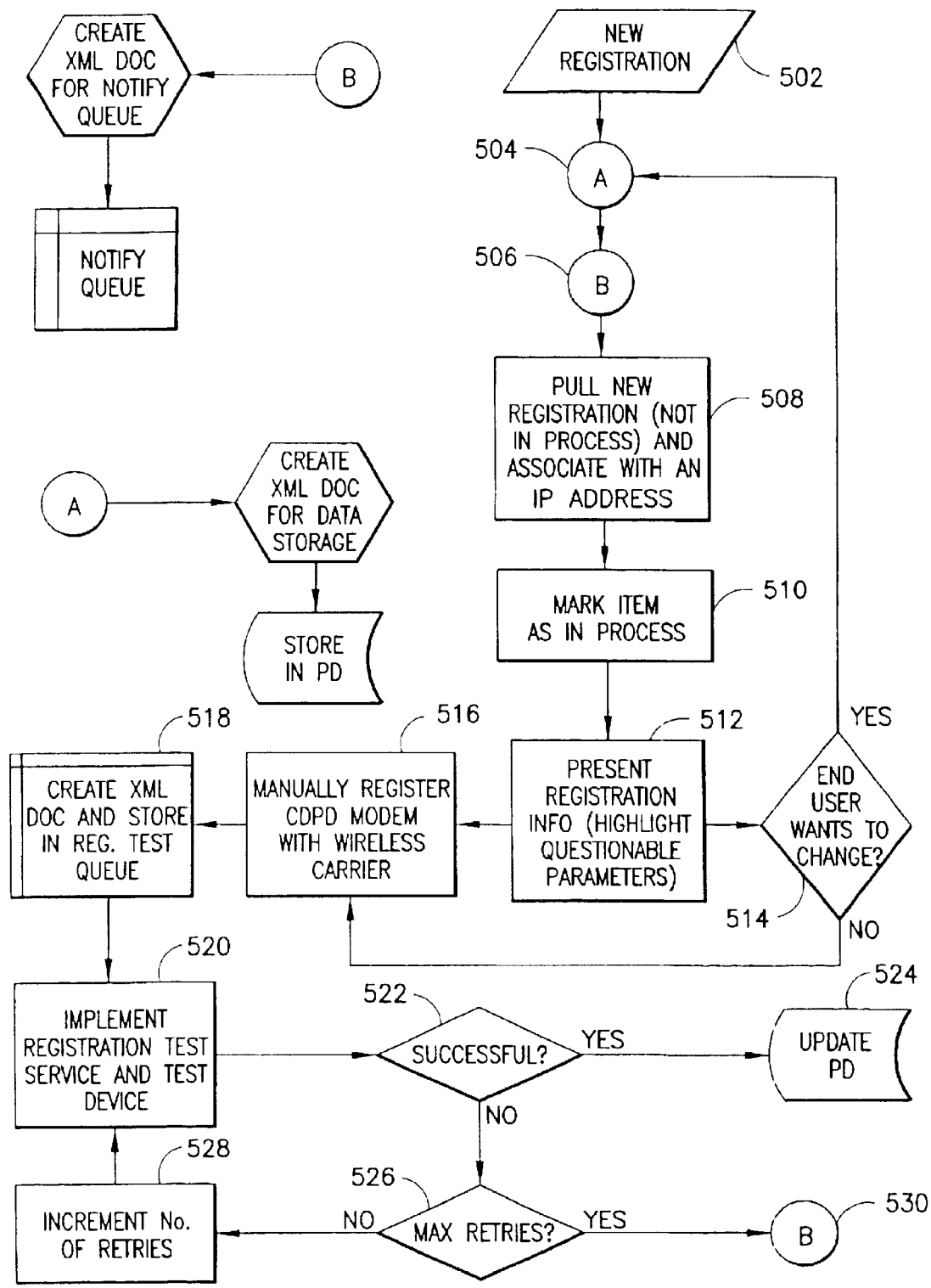

Having described the various components and general operation of the present environment, operation of the platform will now be described in greater detail with reference to various architectural schematics and flow charts. The initial process of user registration with the ASP 200 will now be described with reference to the architectural schematic of FIG. 5a and the flow chart of FIG. 5b. It is to be understood that many different processes may be used and the following is but one example. The End user may submit registration via any of the various user interface devices noted above. Step 502. For example, the registration may be a web page having a form for entering various user identifying information, alert device information, threshold values and other information rolled into the particular user's application. As represented by subprocess A (Step 504), such information is stored in the appropriate tables in the PD, including the user table (e.g., user identifying information), alert device table and device alert device table (e.g., alert device contact information, priority, association of alert with particular alert device), alert parameters threshold table (e.g., alert threshold), and any other appropriate table for the particular user's application.

Once the registration information is received, the Middle Tier 400 posts a record to the Non-Alert Notify Queue. The notification service, in turn, posts a message to be sent back to the end user confirming receipt of registration information. These steps are represented by Subprocess B. Step 506.

Once the registration information has been stored in the PD 300 and an XML document has been stored in the Non-Alert Notify Queue, the Middle Tier pulls the new registration information and associates it with an IP address based on the association between the IP address with the Device. Step 508. Once the registration information is pulled and the Middle Tier associates with it an IP address, the information is marked as being in-process. Step 510. In the present embodiment, marking the record as in-process involves setting a flag associated with the record.

The Middle Tier then causes the registration information to be presented to the end user. Step 512. In the present embodiment, the registration is presented to the end user in the form of a web page, email, or a personal conversation with a call center representative. Such presentation of the registration information is achieved by entering the XML document in the Non-Alert Notify Queue and having the notification servers generate and direct the message as appropriate. Furthermore, presentation of the registration information includes highlighting questionable parameters selected by the end user. More specifically, the Middle Tier compares the received alert parameters with the default parameters stored in the device parameters table to determine whether or not the end user's selections are within the range of permissible parameters defined in the table.

In response to being presented the registration information, the end user (e.g., the caregiver) is given the option of changing the registration information. Step 514. In the event the end user desires to change the registration information, the process continues with receiving new registration information (Step 502) storing the new data in the PD (Step 504) and generating a new XML document in the Non-Alert Notify Queue (Step 506).

In the event the end user does not want to change the registration information, the process continues as if no questionable alert parameters were originally entered by the end user. More specifically, the user must also be associated with the particular Device 100. To this end, the Middle Tier sends a message to the call center, for example, in the form of an email, instructing the call center to manually register the end user with a wireless carrier, thereby associating the CDPD modem of the user's device with the particular user. Step 516. Such manual registration entails contacting the wireless carrier and requesting that the carrier associate the particular end user with the particular IP address of the assigned Device.

Registration of an end user also involves the Registration Test Service. In short, the Registration Test Service tests communication with the remote device after the call center manually registers the user with the wireless carrier. In the event that the test fails, the Registration Test Service posts a message to the Non-Alert Notify Queue, thereby resulting in notification to both the end user and the system administrator.

Once the CDPD modem is registered, the Middle Tier proceeds to generate an XML document and place it the Registration Test Queue. Such XML document includes information necessary to generate a message to the device, including, for example, device IP address. Step 518. With the XML document in the Registration Test Queue, the Registration Test Service may proceed to access the queue and, based on the XML document, generate a test communication to the Device. Step 520.

Once the test message has been sent to the Device, the Middle Tier waits for an acknowledgement message, indicative of whether or not the registration was successful. Step 522. In the present embodiment, the test is deemed successful if the Device returns an acknowledgement message. If the test was successful, then the PD is updated and the process is deemed complete. Step 524. On the other hand, if the test was unsuccessful, then the process repeats with the registration test service issuing another test message. Each time the test is repeated, the Middle Tier determines whether or not a predetermined maximum number of retries has been attempted. Step 526. If not, the number of retries is updated (Step 528), and the process continues with retesting the registration (Step 520). However, if the maximum number of retries has been met, then an XML document is created and stored in the Non-Alert Notify Queue for use by the Notification Service in generating a communication to the end user and/or system administrator specifying that the registration attempt failed. Step 530.

It should be understood that registration may also entail assigning a user 25 to an account or group(s) in the account. For example, the user 25 may log into the system with a particular account specific name and password. Furthermore, assigning a user 25 to a group may be automatic, based on predetermined factors, such as name, position, etc., set by the account owner and implemented in the Business Logic Layer 410. Furthermore, part of the registration may include a user selection of service level including, for example, payment based on: number of alerts generated (as tracked in the Service Log Table); selection of one or more of a list of potentially active alert parameter (as maintained in the Alert Threshold Table; type of Alert Device and/or interface device; account display capability; whether historical data points are stored and, if so, for how long; and essentially any other condition the system has the ability to track or control.

Figure 6A:
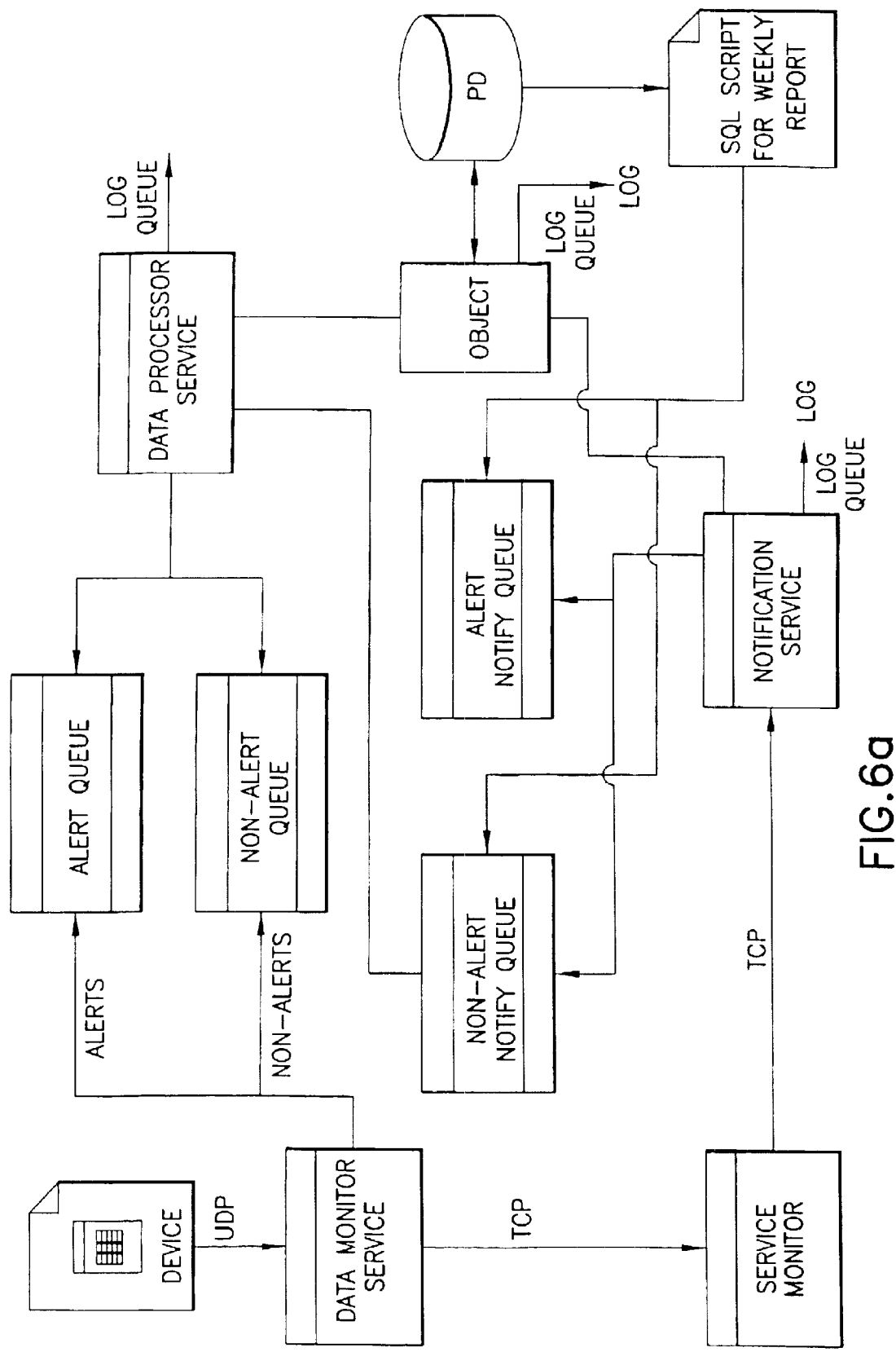
FIGS. 6a and 6b are an architectural schematic and flow chart, respectively, illustrating the process of receiving incoming data at the back end of a system according to one embodiment of the present invention.
Figures 2, 6B:
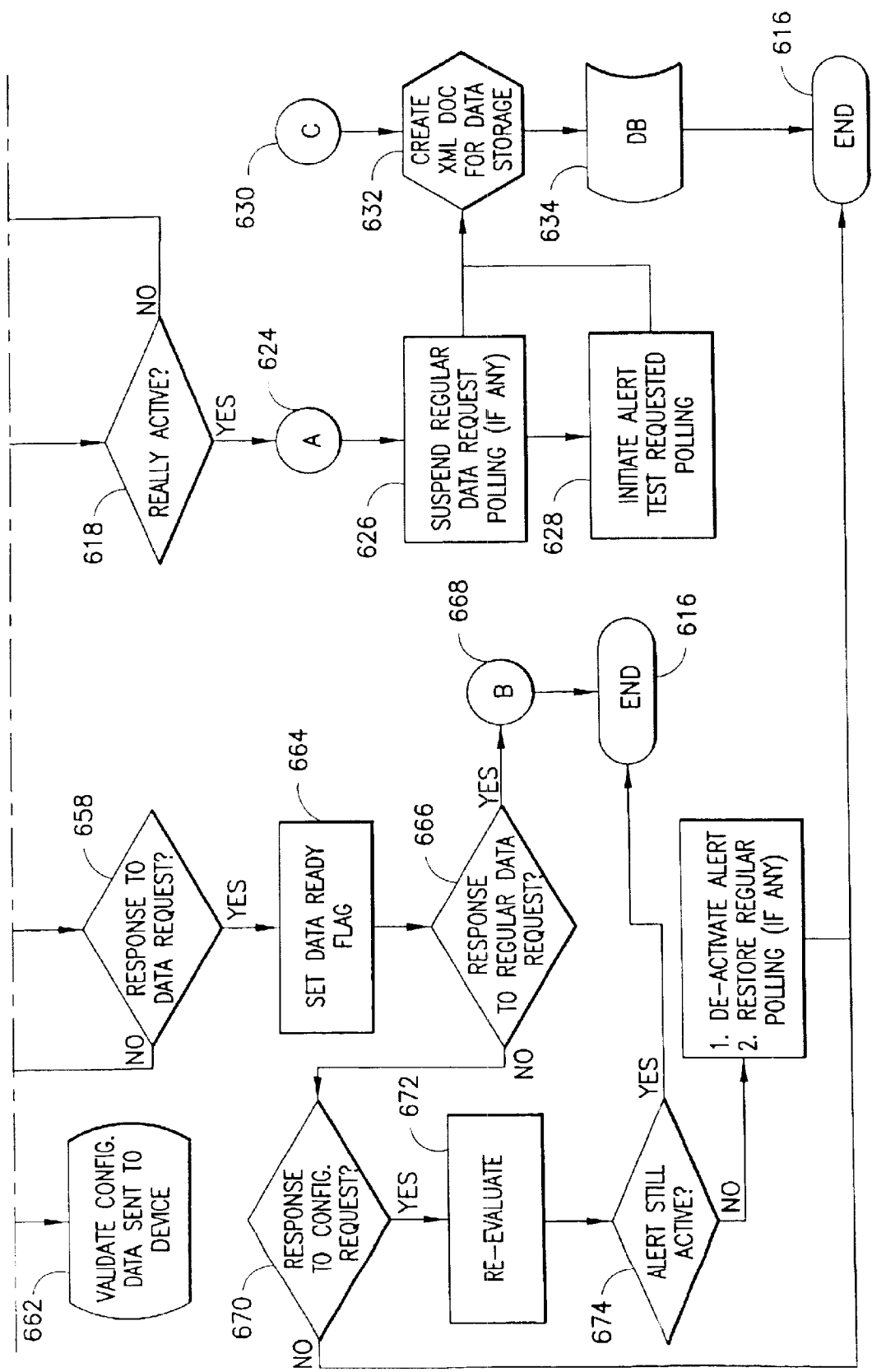

Turning to FIGS. 6a and 6b, the process of receiving and processing incoming data from the Device 100 will now be described. As shown in the architectural schematic of FIG. 6a, data is received by the ASP 200 from the Device. In the present embodiment, Devices 100 report device data: 1) when polled by the Polling Service 450; 2) in response to a regular data request; 3) in response to an on-demand user request; 4) when reporting an alert; or 5) when pushing data in response to the time call command.

The Data Monitor Service 445, performs a high level parsing of the received device data. Such parsing essentially entails taking a single received packet of data, determining whether or not the received data packet represents actual data sent by a Device 100, performing any error determinations and/or calculations, and setting priorities, where, according to the present embodiment, alerts are given higher priorities than non-alert messages.

Once the Data Monitor Service 445 performs the high level parsing of the received messages, the Data Monitor Service 445 creates an XML document and places it in either an alert queue or non-alert queue, as appropriate. As described in greater detail below with regard to FIG. 6b, the Data Processor Service 445 accesses the XML in the Alert and Non-Alert Queues and proceeds to create and store an XML document in either the Alert Notify Queue or Non-Alert Notify Queue. The Data Processor Service 455 stores the message in either the Non-Alert Notify Queue, if the received message does not relate to an alert (e.g., is received in response to a regular data request), or an alert notify queue, if the received message relates to an alert. It should be noted that were the ASP 200 receives a registration message from the Device 100, no entry is created in Non-Alert Notify Queue, as no notification is required. Similarly, were the device data is to be provided to user 25 via the website, no entry is created in the Non-Alert Notify Queue, as no notification message is required.

A common set of software objects of the Middle Tier 400 also interact with the Data Processor Service 455 to store the parsed data in the PD 300. Such storage includes, for example, storing the relevant data in the Device Log Table, Device Log Values Table, Service Log Table and any other relevant tables.

The Data Processor Service 455 also generates the ASP 200 acknowledgement messages in response to receiving messages (other than Device acknowledgement messages) from the Device 100. The Data Processor Service 455 also removes the record in the Device Message Table when a responsive message from the Device 100 has been received.

The Non-Alert Notify and Alert Notify Queues are accessed by the Notification Service 465 of the Middle Tier 400. In general, the Notification Service 465 generates and sends a notification message for each entry in the Non-Alert Notify and Alert Notify Queues based upon data in the queue XML documents. As noted above, the Notification Service 465 also creates a record in the notification table for each active alert notification on a per Device basis for tracking a response. Furthermore, because each notification is associated with a particular device (or Device, as identified by the device ID.), the appropriate alert device may be identified in the device alert device table. As noted above, the notification service also handles non-alert notification, for example, the collection of data from the Device 100 in response to a user request or based upon a predetermined polling of the Device 100. Such device data is sent to the user 25 via either an Alert Device or user interface device, as dictated by the Notification Service 465 and relevant tables.

Also illustrated in FIG. 6a is the optional SQL script, which generates weekly reports of service activity for each device, and the Service Monitor 475, which monitors the functioning of all services. In general, the Service Monitor 475 communicates with each of the services using the protocol (e.g., UDP or TCP) of that service to determine whether or not such service is operating correctly.

FIG. 6b is a flow chart of the process of receiving data from the Device 100 and, more specifically, of operation of the Data Processor Service 455 of the Middle Tier. The data processor service receives the parsed device data in the form of an XML document from the Alert and Non-Alert Queues. Step 602. Based on which queue the XML document is received from, the Data Processor Service 455 knows whether or not the data is an alert. Step 604. As illustrated, the particular steps taken by the Data Processor Service 455 depends upon this initial determination.

In the event the received data is an alert, the data processor service proceeds to determine whether or not the alert is a sensor alert. Step 610. If not, the data processor service continues with sub-processes A and B. More specifically, sub-process A includes creating an XML document containing the relevant device data and proceeding to store and log the relevant data in the PD. More specifically, where the device data contains non-alert sensor data, the data processor service creates records in the Device Log Values Table, and Device Log Table, storing the relevant data and assigning the timestamps. Process B generally includes creating the XML document and storing it in the appropriate Notify Queue for use by the Notification Service. Step 612. Step 614. Once the entry is created in the Notify Queue, the process for the received device data is completed and the Middle Tier awaits receipt of the next device data. Step 616.

If the alert is a sensor alert, the data processor service preferably proceeds to determine whether or not the particular sensor alert has already been received and thus deemed active. Step 618. Such determination involves accessing the notification table to determine whether or not a corresponding entry for the particular sensor exists. Alternatively, the Device Log Table is inspected for an active alert. If the sensor alert is already active, then the process is deemed complete. Step 616. However, if the sensor alert is not already active, then the data processor service proceeds to reevaluate the alert to determine whether or not the sensor alert should indeed be made active. Step 620, 622. Such reevaluation typically entails a reapplication of the particular alert threshold rules. In alternative embodiments, however, no reevaluation is performed.

In the event the alert should not be active, the process is deemed complete. Step 616. On the other hand, if the sensor alert should be made active, then the data processor service proceeds with sub-process A, thereby creating the appropriate records in the Device Log Values Table, Device Log Table, and Service Log Table. Step 624.

Having determined that the sensor alert should be made active, the service proceeds with suspending regular data request polling (if any) by setting the polling flag in the device table. Step 626. According to the present embodiment, the service also proceeds by initiating an alert test request polling of the device to ensure that the Device 100 is no longer in the alert state. Step 628. In general, such an alert test involves updating the request state field in the device table and sending a request message to the Device for a sensor reading.

The evaluation of sensor alert data continues with the data processor service writing the necessary flags to indicate the suspension of polling and alert test request and the creation of an XML document with the flags (Step 632), which is stored in the PD 300 (Step 634). Once the data is stored in the PD 300, the process is deemed completed. Step 616

Having described the operation of the data processor service with regard to alert data, the process with regard to non-alert data will now be described. Upon determining that the received data is non-alert data (Step 604), the service proceeds with determining whether or not the non-alert data was received in response to a request. Step 650. If the non-alert data is not received in response to a request, then the process continues with sub-process A, namely creating an XML document containing the data and storing and logging such data the PD, namely in the Device Log Values and Device Log Tables. Once the data has been stored, the process is completed. Step 616.

In the event the data processor service determines the non-alert data was received in response to a request, the service removes the corresponding message from the Device Message Table. Step 654. The service insures that a duplicate, unnecessary message is not sent to the Device 100 when a message already exists for that Device 100. The process proceeds with sub Process A, the creation the XML document and storage of the non-alert data in the PD. Step 656.

Once it is determined that the data is in response to a request, the service determines whether or not the non-alert data has been received in response to a data request. Step 658. If not, then the process continues to determine whether or not the data was received in response to a configuration request. Step 660. If not, the process continues with sub process A, namely storing the device data. If the data was received in response to a configuration request, then Device 100 may return the configuration data stored at the Device 100 for validating. Step 662. Determining whether the data was received in response to a configuration request entails accessing the PD 300 to determine whether or not the configuration flag associated with the particular Device had been set or checking the last message sent to the Device 100 by reference to the Device Message Table.

If the non-alert data was received in response with data request, then the data processor service sets a data ready flag associated with the particular device. Step 664. More specifically, the data ready flag indicates to the Middle Tier that data has been received from the device and may be processed.

More specifically, once the data ready flag is set, the service determines whether or not the non-alert data was received in response to a regular data request (or polling request or pushed from the Device 100 in response to a Time Call command). Step 666. As noted above, the Middle Tier of the present embodiment issues regular data requests at predetermined intervals to acquire location and sensor data from the devices. The service determines whether or not a regular data request had been made, and thus the data was received in response to such a request. In the event the data was received in response to a regular data request, the process continues with the service creating an XML document for the non-alert notify queue and posting the document (Step 668), at which time the process has been completed. Step 616. The result is a message to the user 25 with the non-alert device data.

If the non-alert data was not received in response to a regular data request (or polling request or pushed from the Device 100 in response to a Time Call command), then the service proceeds to determine whether or not it was in response to an alert test. Step 670. If not, the process is deemed completed. Step 616.

If the data was in response to an alert test request, then the data processor service proceeds to reevaluate the data to determine whether or not the alert threshold has been met or exceeded (Step 672), thereby determining whether or not in the alert condition is still active (Step 674). If the alert condition is still active, then the process is deemed complete. Step 616. With the alert still active, the Middle Tier will continue processing the alert data and notifying the user as described above.

On the other hand, if the service determines that the alert conditions are not met and that the alert is not still active, then the service proceeds to deactivate the alert, by changing the alert flag and removing the entry in the notification table, and restoring regular polling activity of the device (if any), by setting the poll flag in the device table. Having deactivated the alert and restored regular polling activity, the process is deemed completed.

It should be noted that the foregoing description of incoming data essentially also covers outgoing messages to the user 25 that contain device data. Such messages may be in response to regular requests, polling requests, or on-demand requests, or pushed by the Device 100 due to the Time Call Command or triggering of an alert. To summarize such a process, the ASP 200 receives the device message and the Data Monitor Service 445 creates an XML entry in the Non-Alert or Alert Queue, for non-alert data or alert data, respectively. The XML entry includes the device ID and other device data. The Data Processor Service 455 then creates an XML document in either the Non-Alert Notify Queue or Alert Notify Queue, respectively. Finally, the Notification Service 465 generates the corresponding messages to the end user 25. For each alert message, the Notification Service creates a record in the Notification Table, the existence of which indicates an active alert message for which a user acknowledgement is awaited. If no acknowledgement is received, the Notification Service 465 resends the alert message according to the Alert Device and Device Alert Device Tables (e.g., priority of Alert Devices).

Figure 7A:
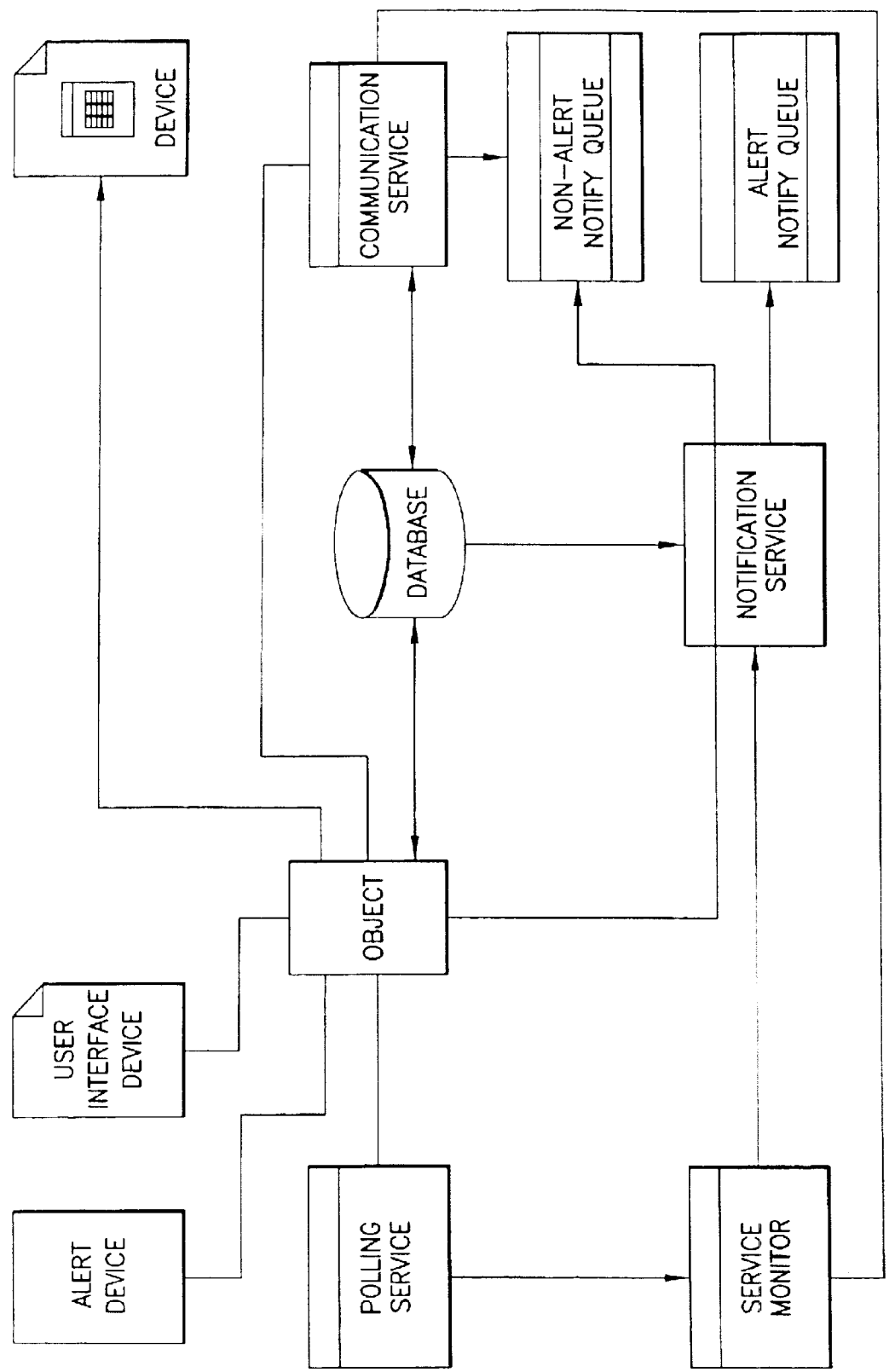
FIGS. 7a and 7b are an architectural and schematic and a flow chart, respectively, illustrating the process of sending outgoing data from the back end of a system according to one embodiment of the present invention.
Figure 7B:
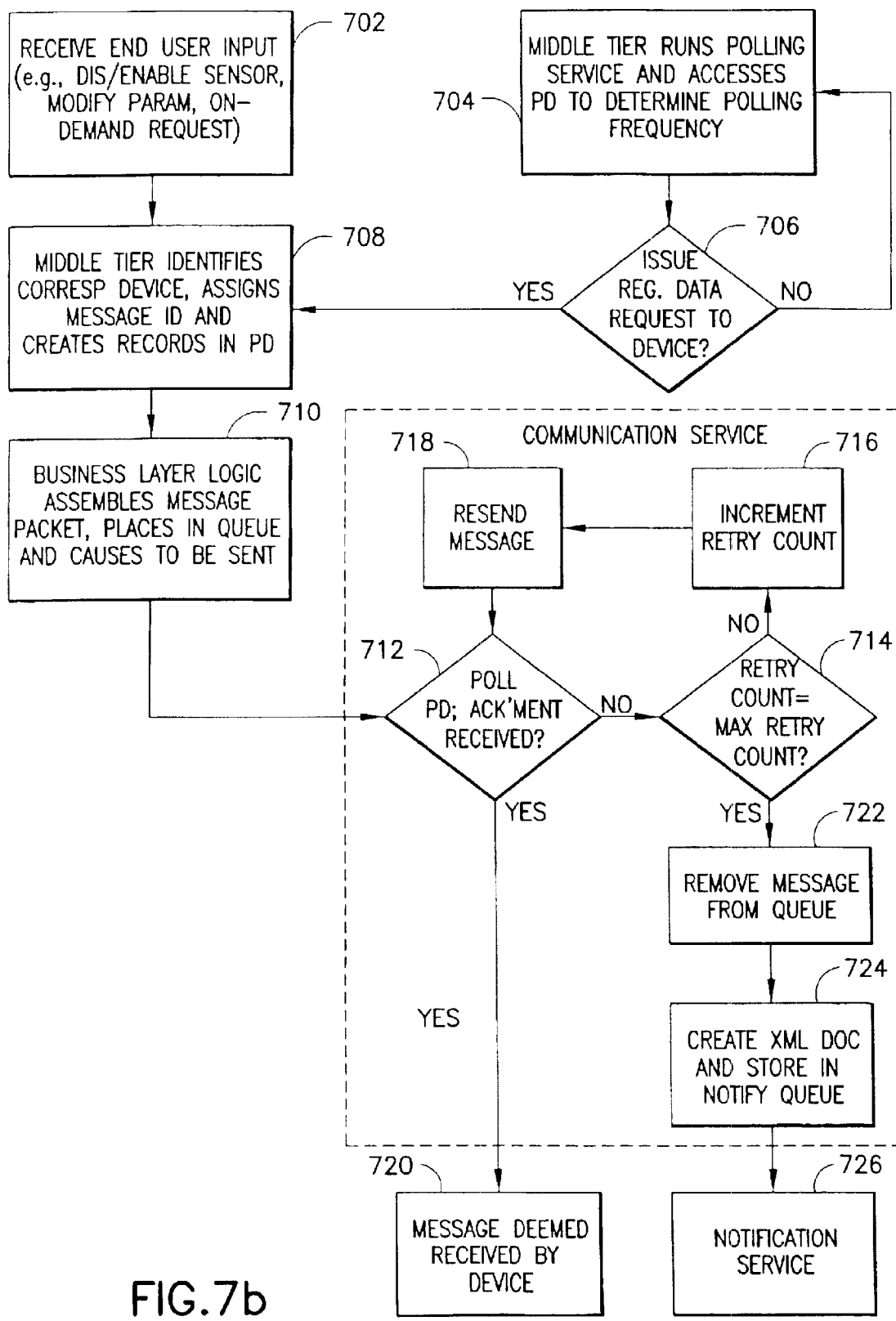

The process of transmitting outgoing data (i.e., data from the back end to the Device) will now be described with reference to the architectural schematic of FIG. 7A and the process flow chart of FIG. 7B. In general, the sending of a message from the back end to a Device maybe initiated in one of two ways: in response to receiving an end user input, such as a request to enable or disable a particular sensor, to modify a threshold parameter or to perform an on-demand request for device data (step 702), and by the polling service of the Middle Tier accessing the PD and determining that the polling frequency mandates the issuance of a regular data request to the Device (steps 704, 706).

In response to either an end user request or a regular data request, the Middle Tier identifies the Device corresponding to the end user or the regular data request, and it creates a record in the device message type table and the device message table, thereby assigning a device message ID. (Step 708). Furthermore, the Middle Tier identifies the particular type of message (device message type id) of the message to be sent. For example, the message type maybe: request to disable or enable one or more sensors, modify one or more threshold parameters, issue an on-demand request, issue a regular data request, and the like. Having created the records in the device message table and device message type table, the Middle Tier (the Business Logic Layer in the present embodiment) assembles the message packet, causes the message to be sent. (Step 710).

Once the message packet is sent to the Device 100, the Data Processor service of the Middle Tier essentially determines whether or not the device received the message. More specifically, the Data Processor service determines whether the device sent, and the back end received, an acknowledgement message. (Step 712). The Data Processor Service then removes the appropriate record in the Device Message Table. Because the incoming data process involves the removal of the record in the device message table pertaining to a particular message when an acknowledgement for that message is received, any existing record in the device message table corresponds to a message for which no acknowledgement has been received. For each record in the device message table the communication service will attempt to resend the message based on the device message date time stamp, which indicates when the message was originally sent, and the retry interval specified in the device message type table for the message.

Prior to resending the message, the communication service also determines whether the message has been resent a predetermined number of times without receiving an acknowledgement and, therefore, should result in an error notification. More specifically, the communication service compares the retry count to the maximum retry count stored in the tables. (Step 714). If the retry count does not equal the maximum retry count, then the communication service increments the retry count (Step 716) and attempts to resend the message (Step 718).

In the event an acknowledgement has been received, as evidenced by the lack of a record in the device message table, then the message is deemed to have been received by the Device. As noted above, removal of the record from the device message table and removal of the message packet from the queue is technically part of the incoming data flow process. (Step 720).

If the communication service determines that the retry count equals the maximum retry count (in Step 714), then the communication service removes the message packet from the queue so as to avoid further retries (Step 722) and creates an XML document and posts it to the non-alert notify queue (Step 724).

As noted above, the notification service runs, extracting entries from the non-alert and alert notify queues and generates communications based thereon. (Step 726).

More specifically, the communication service creates an XML document for placement in a notify queue based on the information in the device message table and device message type table. By specifying the details of the message, the notification service is able to generate a specific communication and direct it accordingly. For example, as noted above, the notification service may generate a communication indicating that the regular data request failed or the maximum retry count was met.

INDUSTRIAL APPLICABILITY

STUDENT MONITORING

This particular application is directed at locating, monitoring and/or tracking children. In particular, this application is directed at locating, monitoring and/or tracking children as they enter and exit a specially equipped school bus. The basic components of the system are depicted in FIG. 10.

Figure 10:
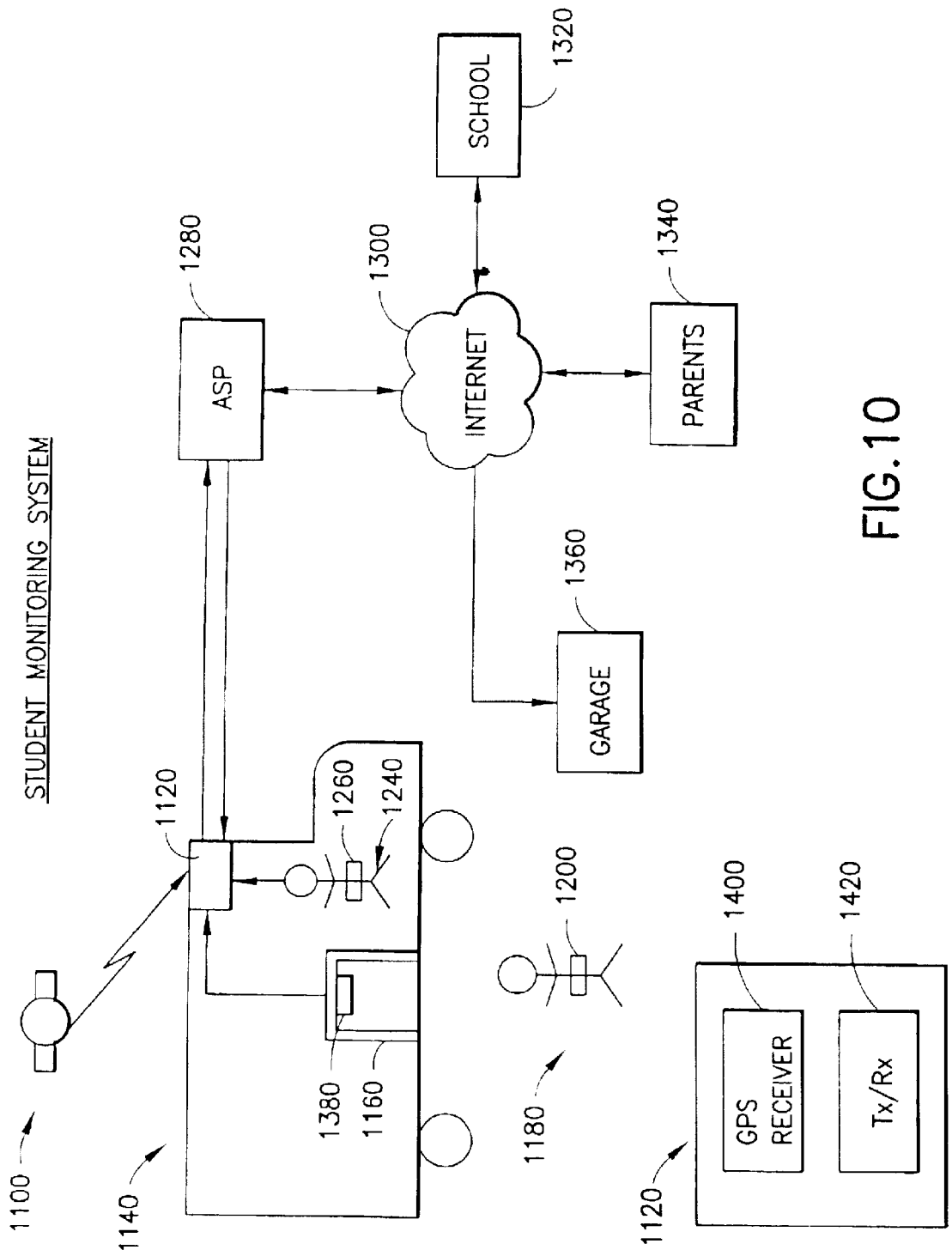
FIGS. 10–18 are general schematics illustrating individual business applications using systems and methods of various embodiments of the present invention.

With reference to FIG. 10, the system comprises a school bus 1140 having an entrance or door 1160 that is equipped with an RF receiver 1380. The bus also has a receiving/transmitting device 1120 mounted or otherwise installed thereon. Device 1120 comprises a wireless positioning receiver 1400, such as a GPS receiver, and a wireless transceiver 1420.

In this particular application, a student or child 1180 is equipped with or otherwise provided a RFID 1200. The RFID 1200 is programmed to uniquely identify the child 1180 in a manner known in the art. RFID's 1200 are well known in the art and are commercially available from a number of companies, such as Knogo Corp. or its successor Video Sentry Corporation. As the child 1180 enters bus 1140, RF receiver 1380 interrogates RFID 1200 in a manner known in the art, thus identifying that child 1180 has entered bus 1140. This information is then transmitted to or is otherwise available to Device 1120. The time that child 1180 enters the bus is also stored by or otherwise available to Device 1120. The time data can be gathered from the GPS receiver, can be determined by other on board clock systems, or in any other manner known in the art. The system determines that child 1180 has entered the bus 1140 and stores this information together with the time the child 1180 entered. The system also monitors whether or not the child exits bus 1140 and if so, logs the fact and the time that the child leaves bus 1140. This information is also stored by or otherwise accessible to device 1120. In a preferred embodiment, the driver 1240 of bus 1140 is also equipped or otherwise provided with an RFID 1260. Data from the RFID 1260 is transmitted to or otherwise accessible to device 1120 so that the system can track or determine who is driving bus 1140 at any time.

Device 1120 is in two-way wireless communication with Application Service Provider (ASP) 1280. The two-way communication between Device 1120 and ASP 1280 may occur, for example, via ground stations (not shown). ASP 1280 is in two-way communication with a computer network, such as the Internet 1300. Internet 1300 is in two-way communication with a number of individual networks, computers or other devices, such as school 1320, individual parents 1340, and a parking garage 1360. The communications between the various systems, i.e., ASP 1280, Internet 1300, school 1320, parents 1340 and garage 1360 can be wireless or direct connection as a matter of application specific design choice. In any event, the various systems can access and communicate with ASP 1280 and in turn, with device 1120 on bus 1140.

The basic operation of the system will now be described. As student 1180 enters bus 1140, RF receiver 1380 interrogates RFID 1200, thus identifying that student 1180 has entered bus 1140. The system logs in or otherwise stores the fact that student 1180 has entered the bus and also logs in or otherwise stores the time and, in a preferred embodiment, the particular location at which student 1180 entered bus 1140, which can be determined from the GPS signal. The system also identifies the driver 1240 of bus 1140. This information, e.g., when and where student 1180 entered the bus, and who is driving bus 1140, is stored or otherwise accessible to device 1120 and is capable of being transmitted wirelessly to ASP 1280 by transceiver 1420 of device 1120. In a preferred embodiment, RFID 1200 and/or student 1180 may also be provided a sensor, such as a temperature sensor, to confirm whether the RFID is physically on student 1180. This sensor information would also be transmitted to or otherwise accessible to Device 1120 and ASP 1280.

This information can be transmitted to ASP 1280 either for example, periodically, by request of an end-user, by request of driver 1240 or in the case of an emergency (e.g., triggered upon the deployment of air bags or other collision sensors on bus 1140). Other data is also available to ASP 1280, such as, for example, the location of bus 1140, its speed, and any other measured or determined condition within the bus such as temperature, humidity, etc.

It is desirable for parents and/or authorized school officials to be able to track or monitor when and where various students get on or off the bus. The system of the present invention provides such a means. For example, a parent 1340 of child 1180, who has been given an appropriate password or other security device, can log on to the ASP 1280 via a computer network, such as the Internet 1300. Parent 1340 can, in real time, determine whether their child 1180 has entered bus 1140 and where this occurred. Parent 1340 can also determine whether and where their child 1180 got off bus 1140. Parent 1340 can also confirm, via sensor data, whether child 1180 is still wearing or otherwise in possession of RFID 1200. Parent 1340 can also send requests to ASP 1280. That is, for example, if parent 1340 confirmed that child was on bus 1140 as described above, but wished to know where bus 1140 was at that particular moment, parent 1340 could request such information from ASP 1280. Such information could be derived from the GPS data received by device 1120 and transmitted to ASP 1280. Such capabilities would also be available to authorized school officials at school 1320. Of course, various security precautions would need to be incorporated in the system to ensure that only authorized individuals have access to such personal information. The system of the present invention will bring great peace of mind to parents and school officials as a convenient and inexpensive system for tracking and locating students in a real time fashion.

The system also provides for additional benefits for the school system. For example, when the bus 1140 returns to the parking garage 1360, the various data can be analyzed to confirm that every student that got on the bus also got off the bus. If a child happened to be lost, the school could check the records to confirm whether, where, and when the child got on and/or off the bus. The school could also monitor the driving pattern of the driver 1240 by checking or monitoring, for example, the speed of bus 1140 over the driver's route that day. By using the various data gathered and stored by the system described above, detailed reports could be automatically generated.

Various modifications, additions, or substitutions of the components described above could be made without departing from the spirit of the invention described above. For example, while the system has been described as a system for monitoring children on a school bus, the system would work equally well as a system for monitoring the entry and exit of any individual or object that enters and exits a confined area, such as, for example, tourists on a bus trip, prison inmates traveling between two locations, packages shipped between locations, etc.

FOOD QUALITY MONITORING SYSTEM

Figure 11:
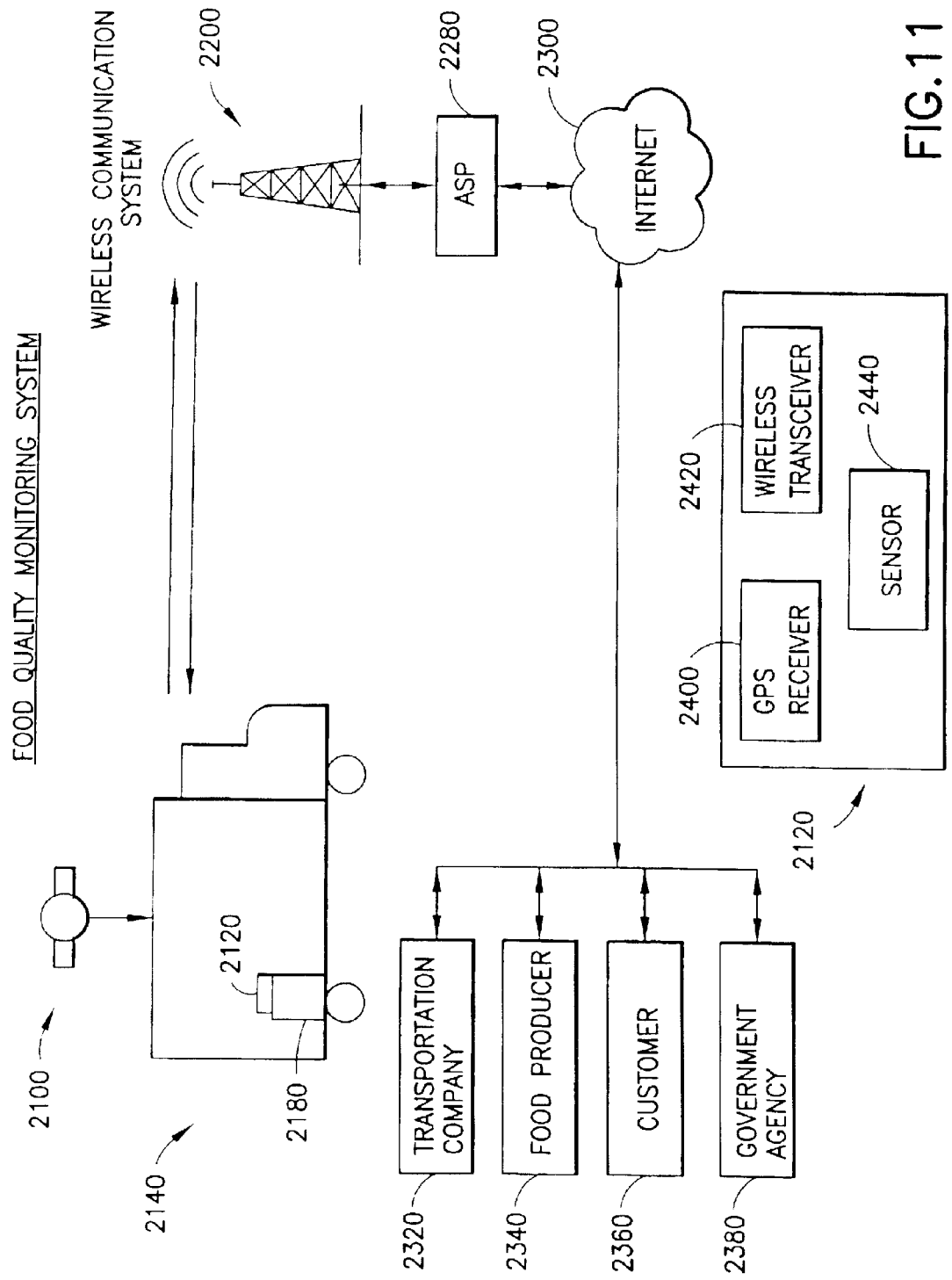

The particular application depicted in FIG. 11 is directed at locating, monitoring and/or tracking food. In particular, this application is directed at locating, monitoring and/or tracking food as it is in transit.

As seen in FIG. 11, the system comprises a truck or other food container 2140 having a food item 2180 therein. The truck is equipped with a receiving/transmitting Device 2120 mounted or otherwise installed thereon. In this particular application, Device 2120 comprises a wireless positioning receiver 2400, such as a GPS receiver, a wireless transceiver 2420 and a sensor 2440. Sensor 2440 may be any type of sensor applicable to measuring, tracking, or confirming a parameter related to the quality of food item 2180 such as, for example, a temperature sensor, humidity sensor, or gas sensor to name a few. Sensor 2440 is coupled to, transmits, or otherwise makes such data available to device 2120, and in particular, transceiver 2420 of Device 2120.

Device 2120 is in two-way communication with ASP 2280 via a wireless communication system 2200. ASP 2280 is in two-way communication with a computer network, such as the Internet 2300. Internet 2300 is in two-way communication with a number of individual networks, computers, or other devices, such as, for example, transportation company 2320, food producer 2340, customer 2360, or a government agency 2380, to name a few. The communications between the various systems, i.e., transportation company 2320, food producer 2340, customer 2360, or a government agency 2380 can be wireless or direct connection as a matter of application-specific design choice. In any event, the various systems can access and communicate with ASP 2280 and, in turn, with Device 2120 on truck 2140.

The basic operation of the system will now be described. As food item 2180 is placed on a truck 2140 or other shipping container. A Device 2120 is placed on or near food item 2180. The actual physical location of Device 2120 in relation to food item 2180 is immaterial, so long as sensor 2440 of Device 2120 can adequately monitor the desired parameter of food item 2180. Sensor 2440 gathers or otherwise determines sensor data relating to the parameter to be monitored. This sensor data is stored by, or is otherwise accessible to, Device 2120 and, in particular, transceiver 2420. GPS receiver 2400 receives data from GPS satellite 2100. The GPS data, as well as the sensor data, is available to transceiver 2420 for wireless transmission to ASP 2280, which in turn makes this information available to Internet 2300, upon which such information is available to authorized end-users.

The information can be transmitted to ASP 2280 either, for example, periodically, by request of an end-user, or by request of the driver or operator of truck 2140, to name a few. Other data is also available to ASP 2280, such as, for example, the location of truck 2140, its speed, distance traveled, time since departure, time to arrival, etc.

It is desirable for various end-users and/or authorized officials to be able to track or monitor the safety and/or quality conditions of food in transit. The system of the present invention provides such a means. For example, a customer 2360 of food item 2180, who has been given an appropriate password or other security device, can log on to ASP 2280 via a computer network, such as the Internet 2300. Customer 2360 can, in real time, determine where their food shipment is in transit, check or monitor the condition or quality of the food item in transit, monitor the distance traveled by the food item, and estimate, in real time, the time of arrival of the food item. The transportation company 2320 can similarly monitor the quality of the food item, track the amount of time the truck and/or driver have been in transit, monitor the speed the truck is or has been traveling, and estimate, in real time, when the truck should arrive at the customer's location. Similarly, the food producer 1340 can monitor the quality of the food in transit should a dispute arise with either the customer 2360 or the transportation company 2320 or others. In fact, the system will permit each party to document the quality of the food item at each stage in the delivery process. Such documentation may serve as a "Stamp of Approval" that the food item was maintained in a safe condition while in its possession. Finally, an appropriate government agency 2380 can also monitor, in real time, the quality of the nation's food supply, as well as monitoring the time the particular driver and/or vehicle have been in transit should any problems or accidents occur. In any event, each of the parties involved can monitor the quality of the food item, in real time, while it is in transit.

Various modifications, additions or substitutions of the components described above could be made without departing from the spirit of the invention described above. For example, while the system has been described as a system for monitoring food on a truck, the system would work equally well as a system for monitoring the quality of food on a train or plane. Similarly, the system could monitor various parameters that might be important to the shippers of various valuable items such as artwork, where the humidity and temperature within the container may be important factors.

SLEEP MONITORING SYSTEM

Figure 12:
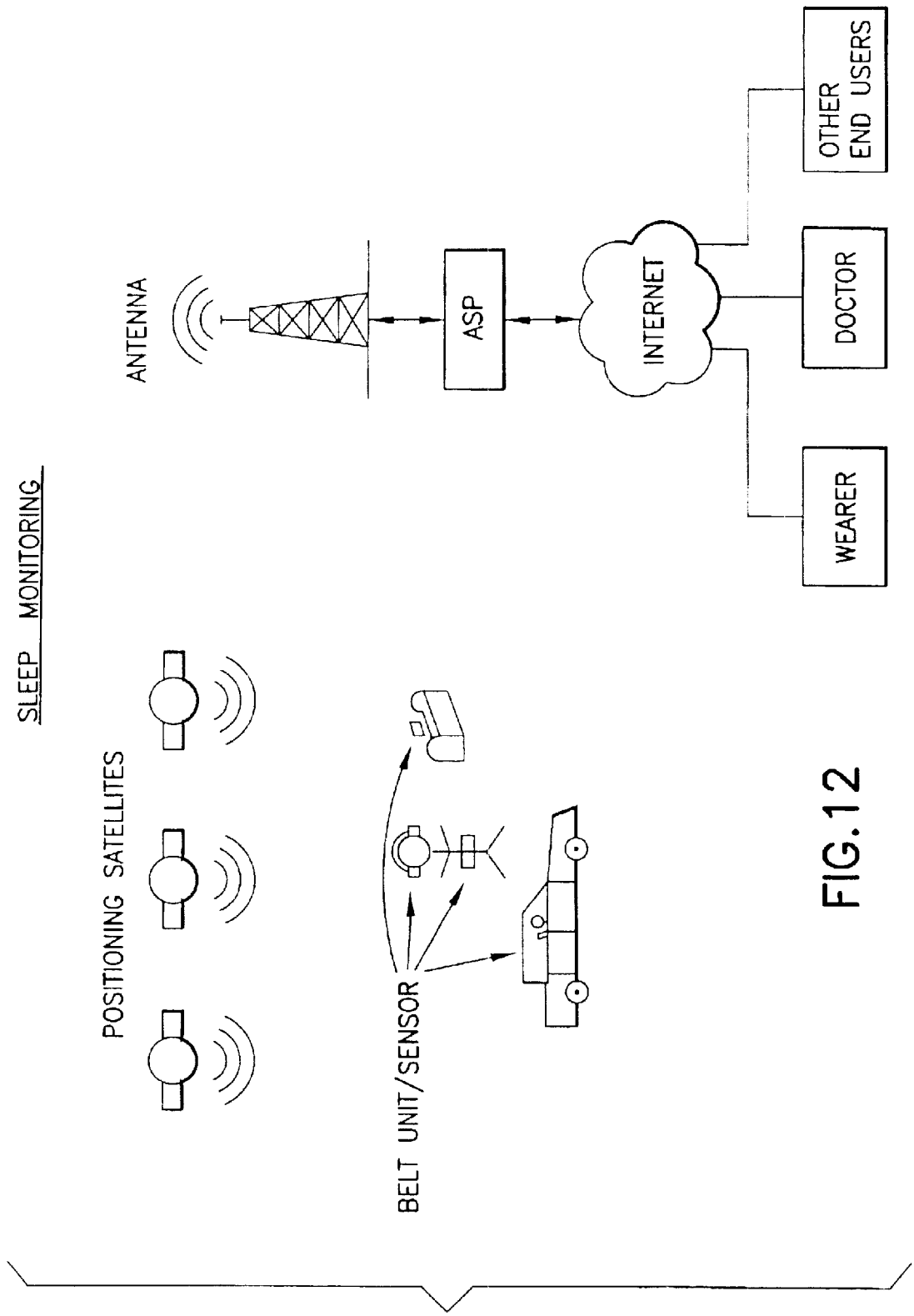

Yet another exemplary application of the systems described herein relates to monitoring the wake and sleep states of individuals. Such an application will now be described with reference to FIG. 12. As shown therein, individuals, such as operators of automobiles and machinery, infants, or individuals with sleeping disorders wear EEG sensors. The output from the EEG sensor is coupled to the belt unit by any of the number of means. The belt unit, in turn, transmits the output from the EEG sensor to an antenna and to ASP.

ASP is able to determine whether the individual wearing the sensor is in a wake state or sleep state based on analysis of the EEG sensor output. As described in Alberto, Claude, et al. "The Quantification of Sleep and Wakefulness in 2 Second Epochs of EEG", and Alberto, Claude et al., "Computerized Quantification of Sleep and Wakefulness in the EEG", available from the Sleep Disorders Center, Winthrop Hospital and SUNY Health Sciences Center at Stony Brook, Mineola, N.Y., both of which are incorporated by reference herein, a function of the value of the EEG sensor output corresponds to the state of the individual. As described in the Alberto references cited above, a positive output indicates the individual being in a wake state, and a negative value indicates the individual being in a sleep state. Thus, the ASP includes a programmed computer that calculates the relevant function of EEG signal and monitors the function of the EEG signal for the transition between positive and negative values, a transition that typically occurs over a few minutes.

Upon detecting the transition from the wake state to the sleep state, ASP provides feedback to the portable unit which, in the present embodiment, includes a waking device, such as an audible alarm, visual alarm, tactile alarm, such as a mild electronic shock, and the like.

In addition, the ASP makes the EEG signal available to end-users via a secure website on the Internet. The ASP also provides the analysis of the EEG signal on the website, including information on whether the individual is awake or asleep, historical data concerning the EEG signal, frequency information concerning the EEG signal, and the like.

The end-users may include any of a number of individuals and entities. For example, the wearer himself may choose to periodically access the ASP website to view information concerning his EEG signal patterns. The wearer's doctor or physician may also have access to the website for further analyzing the EEG signals. Such further analysis by a physician is particularly useful where the individual wearing the device has a sleeping disorder or where the individual is an infant at risk for sudden infant death syndrome.

In yet another embodiment of the present invention, the physician is given control over the type of feedback supplied to the wearer. For example, based on the individual's EEG pattern, the physician may select activation of the waking device at regular intervals or at particular times in the day.

It is to be understood that the analysis performed by the ASP may, in alternate embodiments, be performed or partly performed by the belt unit. For example, the belt unit may include a microprocessor programmed to detect the transition between the positive EEG signal and negative EEG signal and, based thereon, transmit a signal to the ASP. In yet another embodiment, the belt unit not only senses the transition between the wake state and sleep state, but also automatically provides waking stimulus via a waking device.

WASTE MONITORING SYSTEM

Yet another application of the system described herein involves monitoring hazardous waste, and will be described with reference to FIG. 13.

Figure 13:
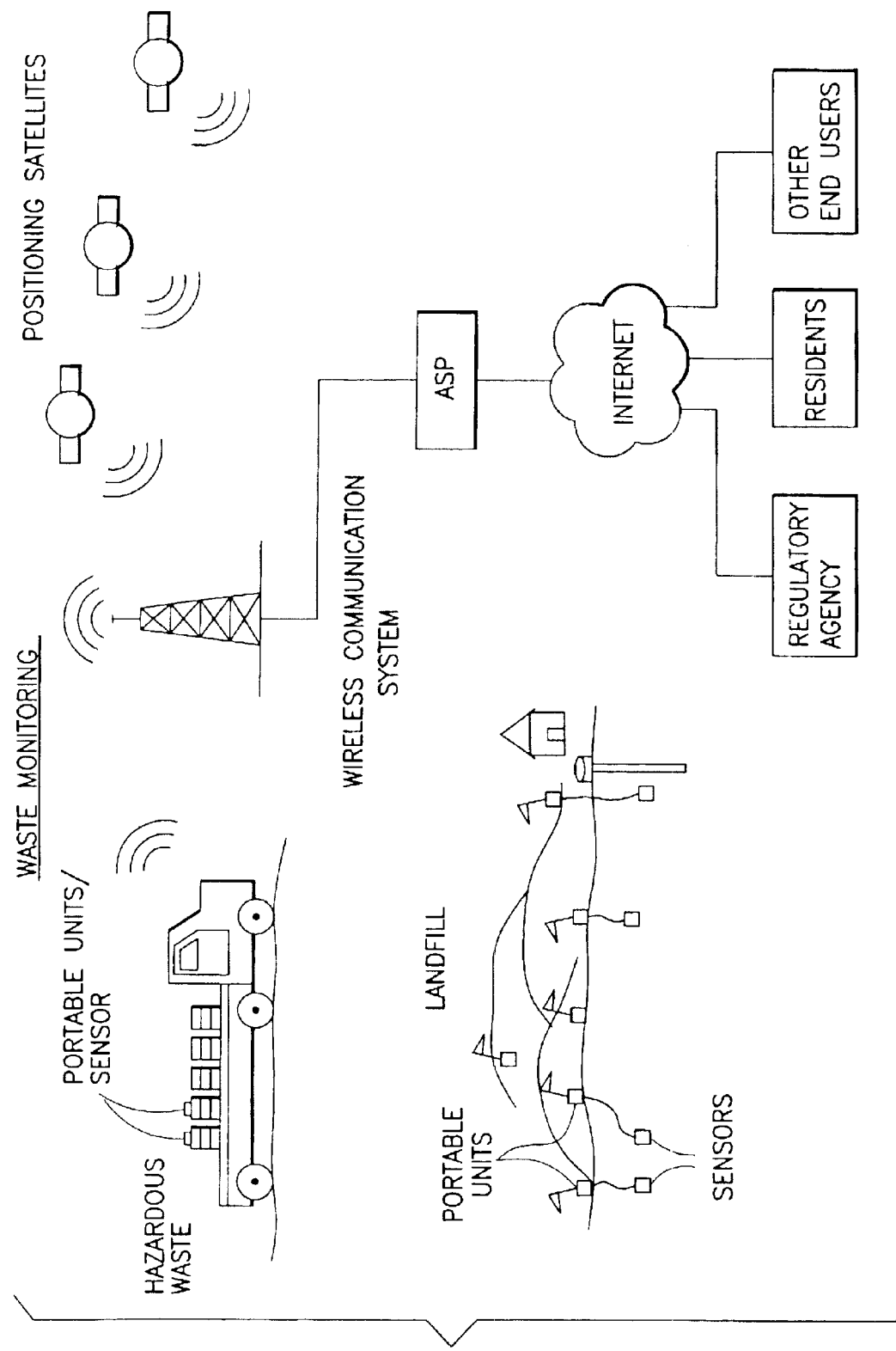

As shown in FIG. 13, the system may be applied to monitor the position of hazardous waste such as that contained within mobile or stationary containers or landfills and the like. More specifically, portable devices may be affixed to drums carrying waste, and may include sensors both external and internal to the drum. External sensors may detect seepage of the waste outside of the drum, and sensors located within the drum may detect seepage of ambient conditions into the drum; either condition identifying leakage. Furthermore, where the waste containers are mobile, the portable units include location-tracking components, such as GPS receivers described above. It is to be understood that the particular type of sensors used depends upon the waste being monitored, and they include sensors for detecting particular chemicals, gases, radioactivity, and the like.

The positioning information and the output from the sensors are transmitted to the ASP via a wireless communication system. The ASP, in turn, monitors the position and sensor outputs. In one embodiment, the ASP makes such position and sensor information available on a secure website via the Internet. Potential end-users having access to such website may include local and Federal regulatory agencies, residents, and other end-users.

The ASP may also perform various analyses on the location information and sensor information. For example, the ASP has stored in the PD tables certain thresholds, the occurrence of which causes the ASP to send an alarm to anyone of the end-users. With regard to location, the ASP may determine whether the waste is within or without of a certain jurisdiction. For example, a state government may hire the ASP to track waste to ensure that it does not leave the State without approval. Conversely, a particular State may hire the ASP to notify it in the event any waste enters the State. In short, the ASP can track any type of movement of the waste and notify any end-user of such movement. With regard to sensor output, the ASP may determine whether there is leakage from any container and whether such a leakage is above a limit set by, for example, a Federal Agency. In the event there is leakage above a particular threshold, the ASP could automatically contact and dispatch a containment and clean-up crew to a particular location.

Also as illustrated in the FIG. 13, Devices may be disbursed in and around a landfill or other stationary containment area. In such an embodiment, Devices would consist of sensors both above and below ground. Furthermore, the Devices may include identification means such as flags, lights, automobile sounds, and the like. In such an embodiment, the ASP may monitor the location of the Devices and sensor outputs to determine whether unauthorized waste has been deposited, whether unacceptable seepage of contaminants has occurred, and the like. In one embodiment, Devices can be installed adjacent a private residence, including in or near the residence water supply, and on behalf of such resident, monitor for any contaminants. As with the previously described application, the ASP may make monitor information available via the Internet or other device and may notify any predetermined individual or entity upon the detection of a given level of contaminant.

In any of the foregoing waste monitoring systems, the ASP may identify which Device detected the alarm condition, note the Device's location, which is provided to the end-user, and preferably activate an audible, visual, or other location beacon on the Device. Such activation is achieved by the ASP transmitting an interrogation signal having modulated in it the Device ID of the particular Device. The Device, in turn, receives the interrogation signal and, based on local logic, determines that the modulated ID matches the Device's stored ID and activates the beacon.

GUIDING/TRAINING SYSTEM

Figure 14:
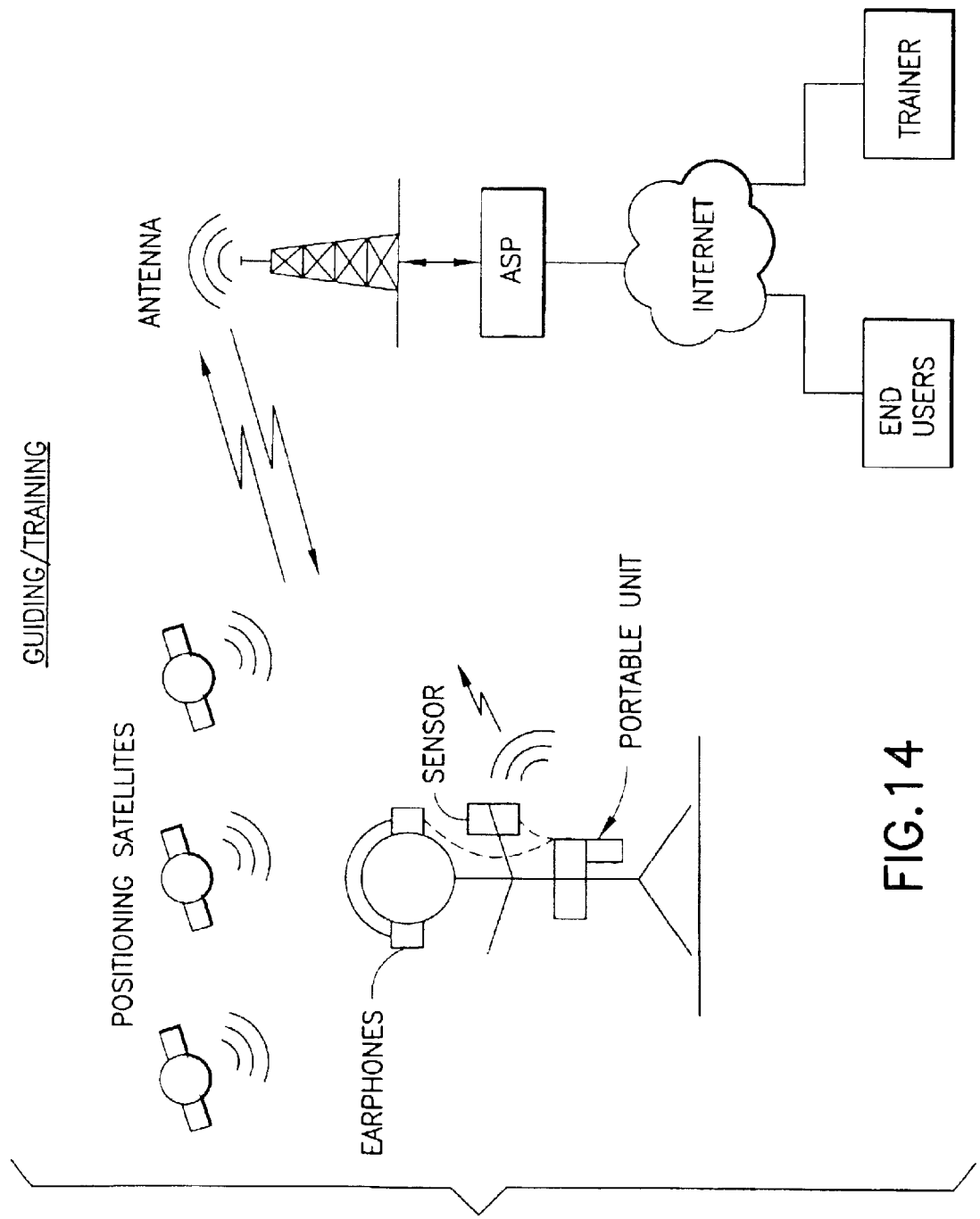

As illustrated in the schematic of FIG. 14, yet another embodiment the system described herein may be used to provide feedback to a user for the general purposes of guiding, training, and protecting the user. A tourist, jogger, or other traveling individual has a Device according to the present invention, including one or more sensors, such as know sensors for reading pulse rate, temperature, blood oxygen, and the like, and a feedback or output unit, such as a pair of headphones, digital display, and the like, both of which are coupled to the Device. As described above, the Device also includes GPS location tracking sensors.

In operation, the ASP continuously or periodically receives GPS location tracking information and sensor outputs, thereby tracking the user's location and various biological variables. Having received such information, the ASP preferably stores the information and makes it available to users via a secure system web site on the Internet. In an alternate embodiment, the ASP communicates with the end-users via any of a number of communication paths, including LAN, WAN, voice/cellular, and the like. More specifically, the ASP preferably provides both real-time location and sensor data, as well as historical information, such as average speed (based on change in location over time), average pulse, average blood oxygen content, and other data available from the sensors and location. Such averages may be taken over various time periods, such as months, days, hours, etc., or taken over discrete events, such as a runner's training interval, or over the time period the user is in a particular location.

The ASP may further perform certain analysis on the received location and sensor data and make such analysis available via the system web site. This analysis, preferably performed by software running on a general-purpose computer, may include a comparison of the location and sensor data to predefined thresholds. In one such embodiment, the ASP compares actual location and time data to predetermined location and time data, thereby determining whether the user is "behind" or "ahead of schedule." Such information may be particularly useful to delivery services and athletes training. Another analysis performed by the ASP includes determining whether the location and/or sensor data either exceeds a predetermined threshold or is within a certain range and the like. For example, the ASP may determine whether a runner training for a race maintains her heart rate or blood glucose level within a certain range.

As noted above, the system of the present embodiment further includes a feedback device. Accordingly, any of the information received by the ASP, derived by the ASP, or stored by the ASP may be transmitted back to the user via cellular or other communication means and received by the feedback device. In one embodiment, the user is a jogger and the feedback information relevant to training, such as actual speed, heart rate, blood sugar level as compared to optimum or predetermined levels, is provided via the feedback device, such as earphones. In another embodiment, the feedback comprises information pertinent to location and the user's surroundings. In such an embodiment, the ASP maintains a database of sites of interest, such as tourist attractions, restaurants, museums, and the like, and automatically provides the user with such information based on user preferences and/or user location. More specifically, the ASP's computer system is programmed to track user location, retrieve from memory indications of the user's preferences, retrieve stored information pertaining to all sites, filter the information according to the user's preferences, and provide the resulting information to the user. The information provided to the user may be in any of a number of forms, including voice via the earphones (such as "the nearest American food restaurant is two blocks west"), and via a digital display, including a map of the user's then current surroundings with points of interest highlighted. In short, any type of information may be stored by the ASP and provided to the user.

Other design-specific applications and devices are set forth in the accompanying materials, the details of which will be apparent to one of skill in the art upon reading and understanding the accompanying materials.

MICRO-IRRIGATION SYSTEM

Figure 15:
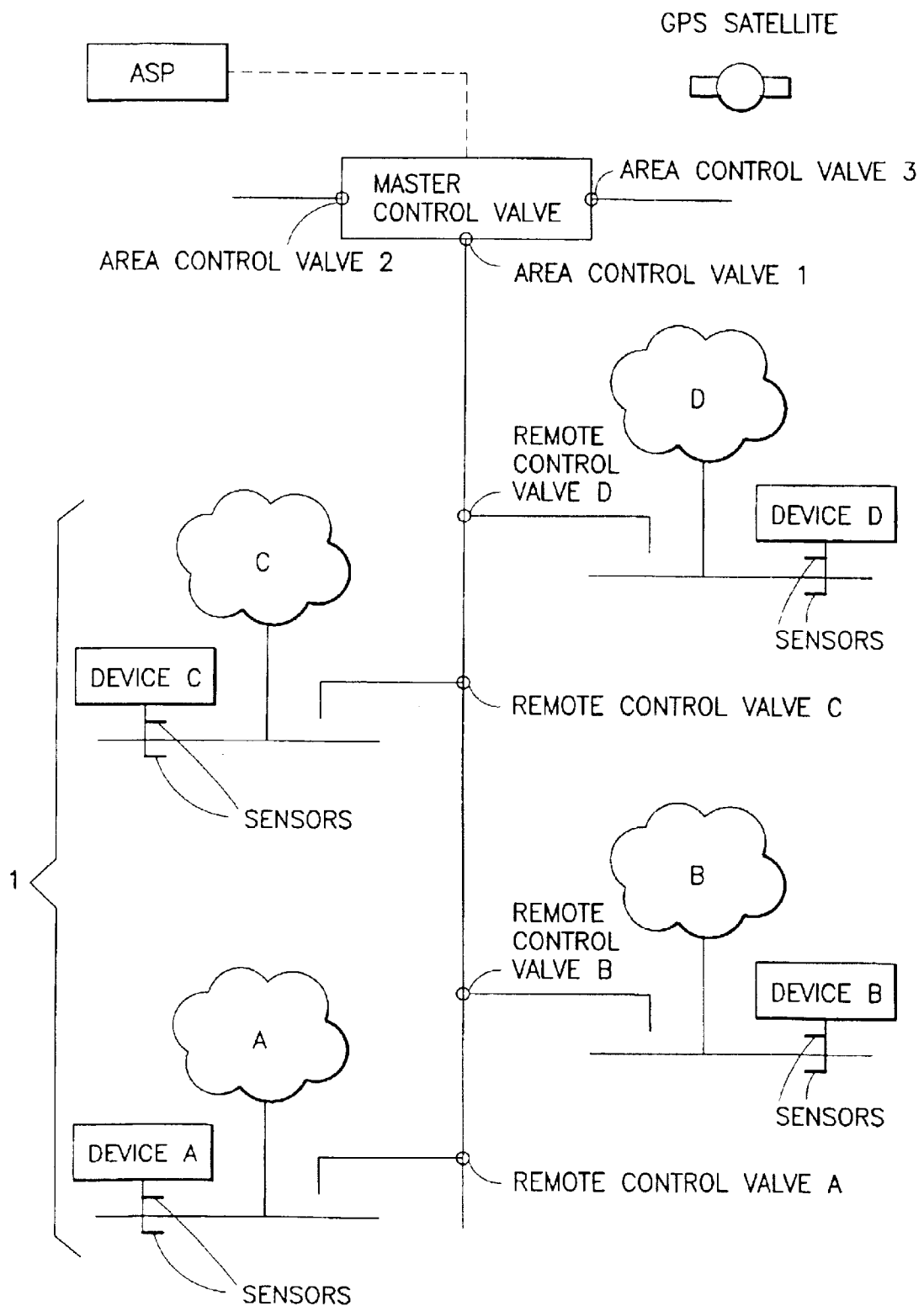

The embodiment of FIG. 15 provides a device for remotely monitoring an environmental parameter indicative or whether an object, such as an olive tree, needs irrigation or fertilization. By way of non-limiting examples, such environmental parameters may be the water content, humidity, temperature, or pH of the soil or the air proximate a tree. The Device is placed proximate the tree. The Device comprises a receiver for receiving position data from the GPS, a sensor(s) for measuring or otherwise determining the environmental parameter, and a transmitter for transmitting the position data and parameter data to an ASP and thereby made available to an end-user in the manner described above. A user can access this information to determine whether that particular tree needs watering or fertilizer. Further, the Device of the present invention may also be part of a system for providing automatic irrigation of the tree. That is, the Device can be incorporated into an overall irrigation system for providing automatic and precise micro-irrigation of isolated plants and/or areas. For example, the Device can be used to determine if a particular tree needs water. If so, the Device can transmit this information and the location of the tree to the ASP wirelessly or by direct wire-to-wire connection. The Device could also transmit the precise location of the tree via the GPS data received by the Device. Thus, by accessing the ASP, the user would know whether the tree needs to be irrigated, and would also know the precise location of the tree. The user could then irrigate that particular tree, and no others, thus saving valuable water resources. The system could also be programmed to automatically irrigate the tree on a predetermined schedule, without user input.

The Device may be incorporated into a system for monitoring the irrigation requirements for a plant, tree, or other object requiring periodic or aperiodic irrigation, for example, as set stored in a system database in the ASP. More specifically, a Device may be positioned proximate a tree, and may include sensor(s) for detecting a condition or series of conditions which indicate that irrigation (or fertilization) of the tree or a group of trees is required. It is to be understood that the particular type of sensor(s) used depends upon the particular condition being monitored, and includes, for example, sensors for detecting temperature, humidity, pH, and the like. The sensor(s) may be located above or below ground. The Device may also include location tracking components, such as a GPS receiver as described above or the Device may be pre-programmed with the location data or may be pre-programmed with an identifying characteristic to permit the ASP to determine its location without the need of or in combination with the GPS data.

The positioning information and the output from the sensors are transmitted to an ASP wirelessly via an antenna or in a direct wire-to-wire connection (not shown). The ASP, in turn, monitors or otherwise determines the position of the Device and monitors or otherwise determines the sensor outputs to monitor the desired environmental parameter.

A specific application of the system will now be described with reference to FIG. 15. Device A monitors the environmental parameter(s) proximate tree A, and this information is transmitted wirelessly to the ASP. The ASP can determine which particular tree is being monitored either by receiving the GPS data from Device A or by receiving an identification code or other pre-programmed data from Device A identifying Device A as being proximate tree A. The Devices may also include identification means such as flags, lights, automobile sounds, and the like. If the ASP determines that tree A is in need of irrigation, the ASP can automatically open remote control valve A to irrigate tree A. Of course, the system may also be operated manually whereby a technician is instructed or otherwise advised that tree A needs attention so the technician can manually open remote control valve A. The system can be adapted to irrigate tree A for a certain amount of time or to deliver a certain amount of water depending on the parameter data received from Device A either alone or in conjunction with other data received by or programmed into the ASP.

If the ASP determines that trees A and D, for example, need irrigation, then the ASP may open up both remote valves A and D. Similarly, if the ASP determines that all the trees in the entire area 1 need irrigation, the ASP can open up area control valve 1 to irrigate trees A, B, C and D. The ASP can similarly open area control valves 2 and 3 to irrigate areas 2 and 3 (not shown). Thus, the system of the present invention provides for micro-irrigation of the trees, thus saving valuable water resources. The system can also save valuable manual resources by providing for the automatic monitoring and irrigation of individual trees and/or areas.

DOMESTIC PETS AND LIVESTOCK

Figure 16:
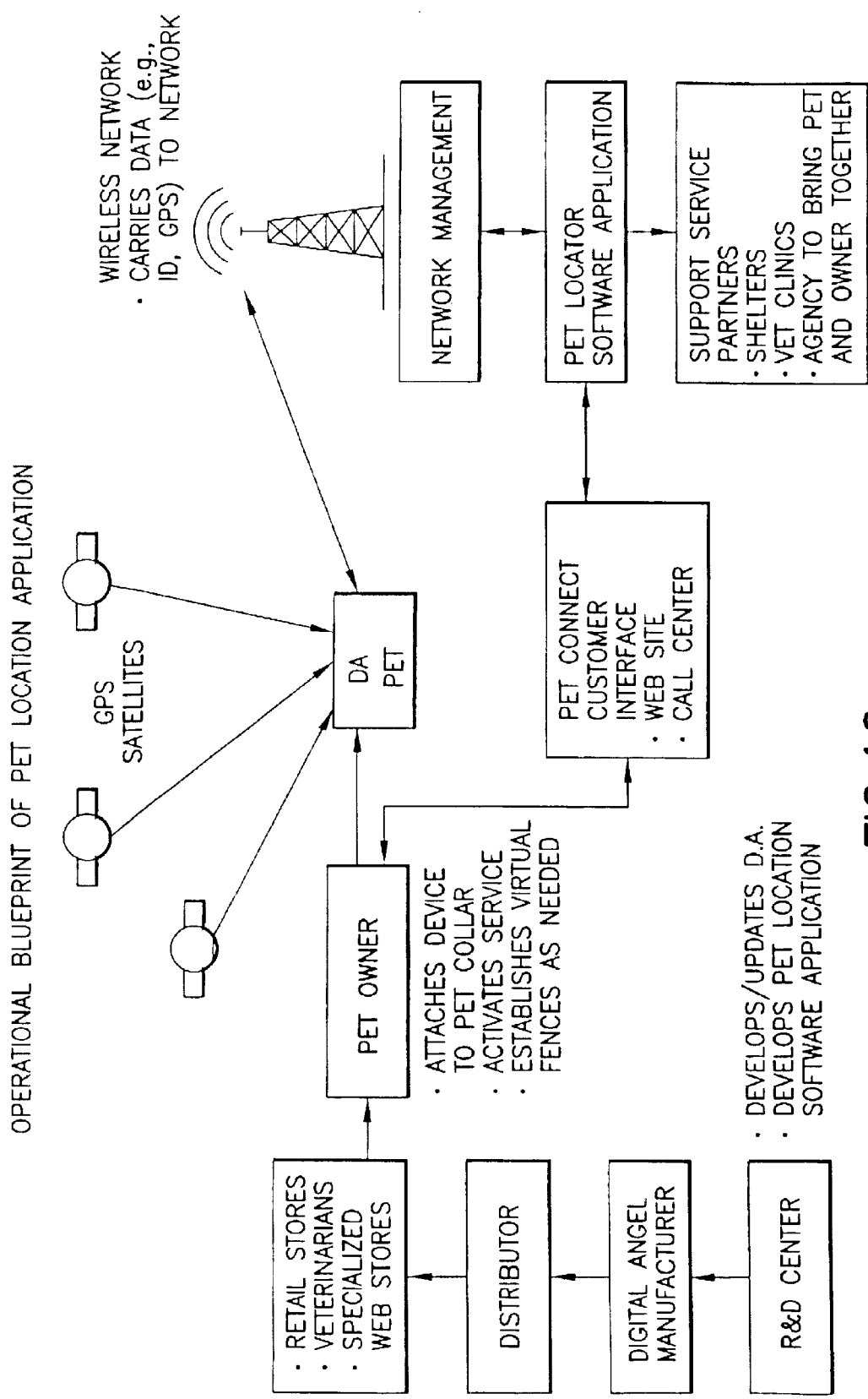

As illustrated in FIG. 16, an application of the system includes the monitoring and location of pets. Such a system consists of a wrist watch-size Device comprising a GPS receiver, transceiver, data storage, and a self-powered battery worn on or otherwise implanted in the pet. If the pet is lost, the pet owner may notify the ASP through the system web site or a CMC. The CMC agent will locate pet upon the owner's request and either inform the owner and/or notify an agency that will retrieve the pet and bring it to its owner. The Device could be also used to locate the pet upon the owner's request. The system can also be adapted for related services, such as notifying an agency to physically locate the pet and identifying pets if disputes arise. Potential customers include pet owners. An alternative embodiment of the aforementioned application of the invention is capable of creating a virtual fence to keep pets from wandering away. Such an embodiment would include a Device equipped with an output unit capable of producing some stimulus to the pet if the it were to wander outside a predetermined distance from a given location. Such stimulus could include a mild electric impulse or the like. The Device would report the location of the pet to the ASP and generate an alarm to the pet owner. With reference to FIG. 16, the ASP would consist of a Customer Interface, (a CMC and/or system web site) that would connect the pet owner to the system. The Customer Interface, in turn, interfaces with a pet locator software application in the ASP, which associates different end users, for example, a pet owner, an animal shelter, or a veterinarian with specific alert devices, as described above. The Device communicates with the ASP through a wireless communication network.

In a similar embodiment, a Device comprising a GPS receiver, transceiver, data storage, self-powered, and bio-sensors are attached to cattle and pigs to monitor and identify them as they pass through the breeding/production chain up to the production facility. The Device could be used to increase the reach of tracking and identification systems to farms and production facilities. The system can be adapted for related applications such as disease control, inventory management, tracking of cattle and pigs in production facility to specific farms. Potential customers would include farmers and producers.

LUGGAGE TRACKING

Figure 17:
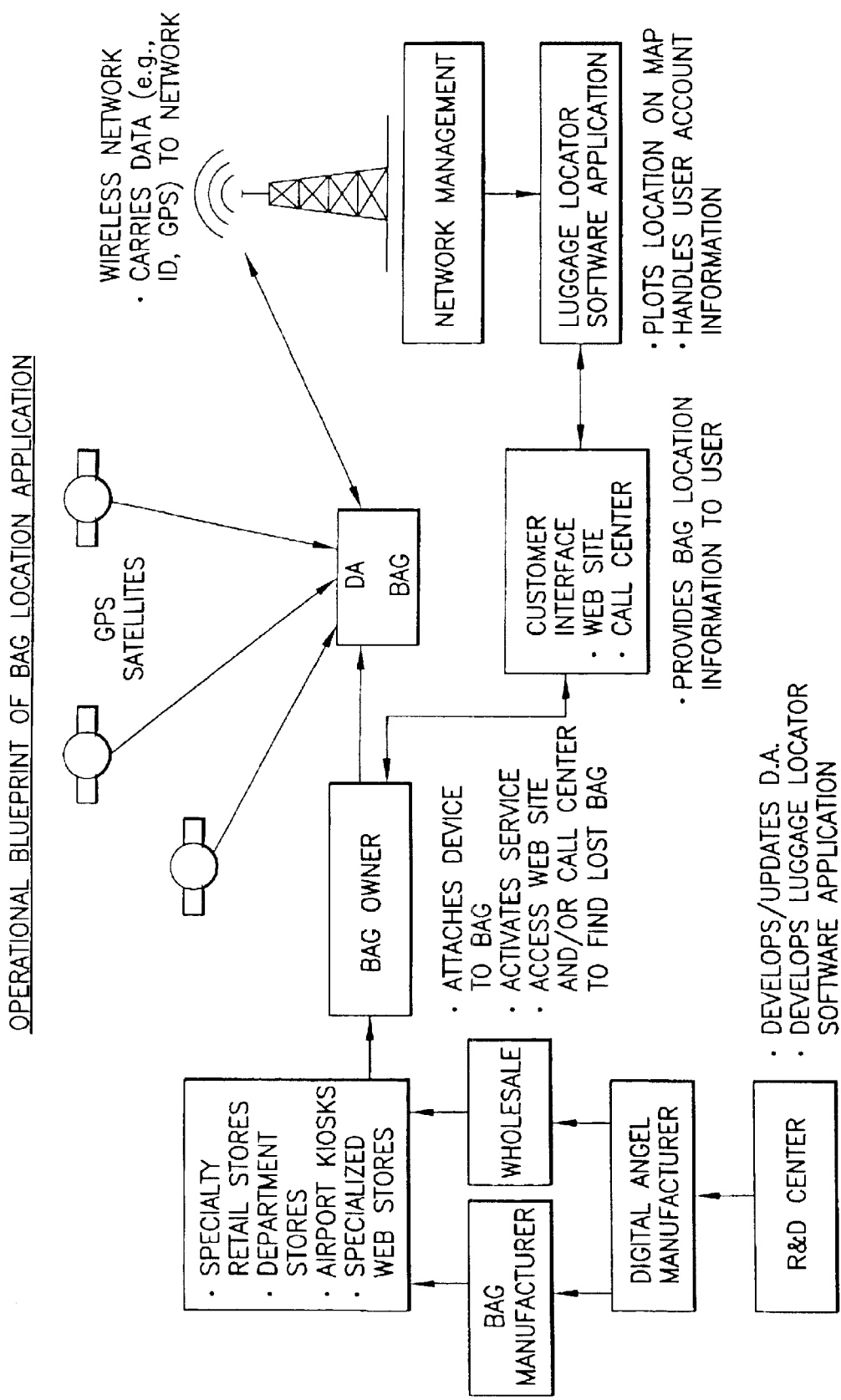

FIG. 17 illustrates an application of the system for tracking luggage. The system includes a wristwatch size device comprising a GPS receiver, transceiver, and data storage that could be attached to bags at the check-in counter and taken off after luggage claim. The Device may be used to locate lost luggage or adapted to detect if luggage has been opened. The Device could be used to substitute for airline's current luggage tracking and identification systems, i.e., bar code system. Potential customers would include airlines. Similarly, a wristwatch size Device comprising a GPS receiver, transceiver, data storage, and a battery could be attached to luggage to locate the bag upon the owner's request. With reference to FIG. 17, the ASP would consist of a Customer Interface, (a CMC and/or system web site) which provides bag location to the end-user. The Customer Interface, in turn, interfaces with a luggage location software application in the ASP, which associates different Devices with different end-users and can map the movement of a bag over time end users. Bag owners may request to locate their bag via the CMC or the web site. The CMC may also notify the airline with the location of bag. As in the previous applications, the Device communicates with the ASP through a wireless communication network. Potential customers would include passengers and luggage manufacturers.

HEART MONITORING SYSTEM

Figure 18:
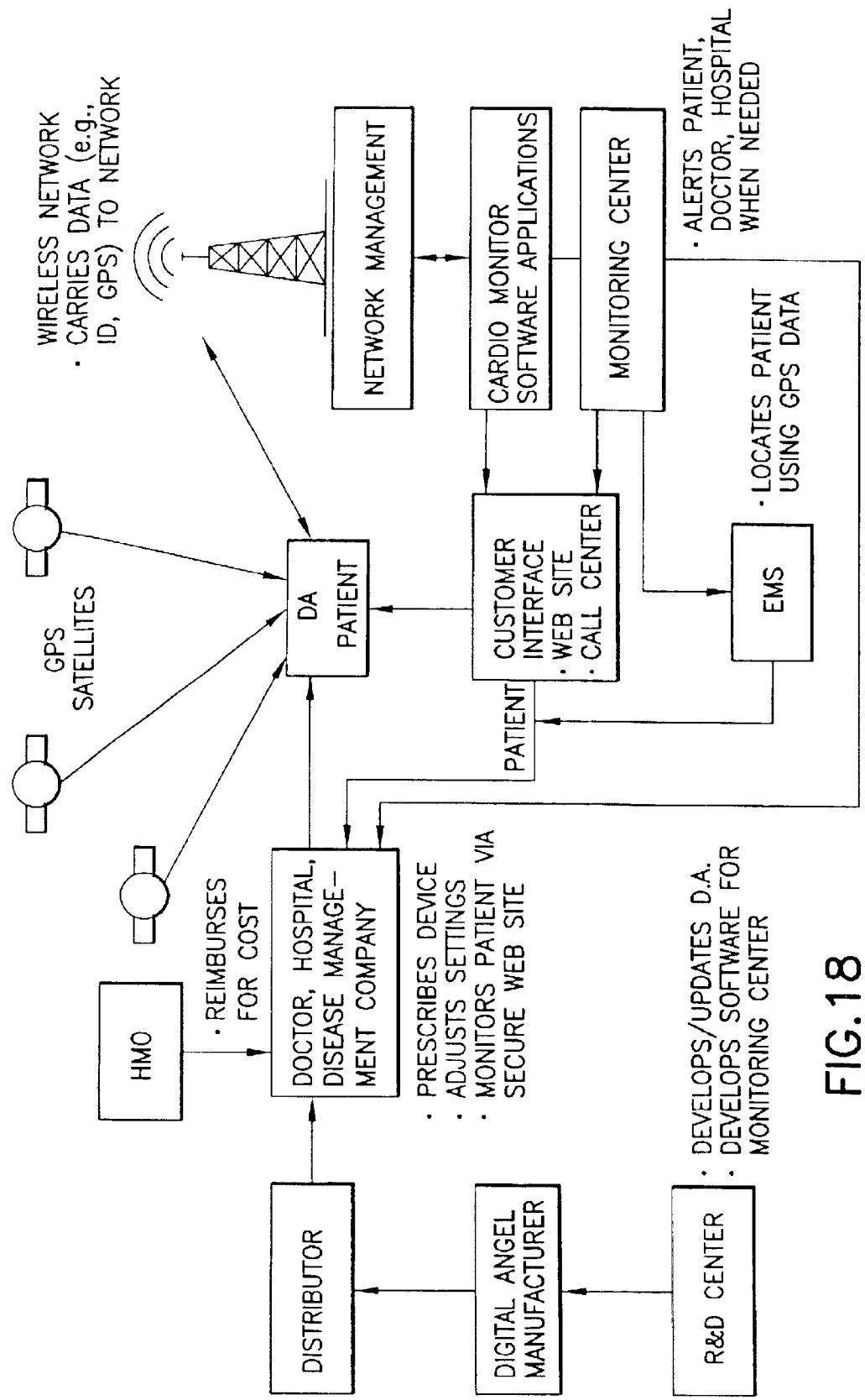

FIG. 18 illustrates an application of the system for heart patient monitoring. A wrist watch-like Device comprising a GPS receiver, wireless transceiver, biosensor, and ECG is worn by person with heart disease. The Device will transmit GPS signal location to the ASP when vital signs indicate the need for emergency care. An emergency signal can be sent to both a 911 station for emergency dispatch and also be provided to relatives. The ASP will record ECG results for future access by a physician through a system web site. The Device could be used to allow emergency care and post-event diagnosis. With reference to FIG. 18, the ASP would consist of a Customer Interface, (a CMC and/or system web site) which provides the interface to the ASP for the end-user, for example, a physician or a relative, and if so desired, the patient himself or herself. The Customer Interface, in turn, interfaces with cardio monitor software applications in the ASP and a monitoring center that would be linked to doctors, hospitals, and EMS as needed. In an alternate embodiment of the current application, the Device contains an output unit that can either on command from a physician or automatically when certain conditions are met, administer medication or other stimulus. As in the previous applications, the Device communicates with the ASP through a wireless communication network. Potential customers include heart disease patients.

MISCELLANEOUS APPLICATIONS

The following exemplary applications detail further aspects and applications for the various embodiments of the Devices and support systems described above. One of skill in the art, upon reading and understanding the invention described herein, will envision how the devices and support networks described herein can be applied, modified added to, subtracted from, or substituted to operate in connection with the specific applications described below.

TRANS-OCEANIC CARGO TRACKING

An alternate embodiment is directed at tracking shipping containers. This application utilizes a two-tiered Device, which will be described below. The first tier is a Tag comprised generally of a Radio Frequency Identifier (RFID). The second tier is a Base Unit comprised of a Radio Frequency (RF) reader, an antenna or coil, a transceiver and decoder, a GPS receiver, and a wireless transceiver. The Base Unit can be used to determine what containers are on board a ship, receive position information from the GPS satellites, and transmit the data collected wirelessly to an ASP, which in turn, can be accessed through a computer network, such as the Internet, by an end-user to access the information.

Another important aspect of this embodiment of the invention is the RFID Tag, which is placed on or in each shipping container being tracked and preferably has a unique ID code. These Tags also preferably contain information unique to each container. The information programmed in each Tag may differ. One embodiment of this application stores unique numbers identifying the container associated with each Tag and allows the shipping company to keep inventory on what is in each container. Another embodiment stores detail in the Tag on what is being shipped. It would be more efficient to use the prior method and reuse the containers or Tags, rather than to use them once or use more costly re-writeable Tags.

Although not essential, the Device could include a power source or have features to connect to a power source in order to power the components of the Base Unit. A strong electromagnetic field would be needed to reach all the containers on the ship. Since the power needed is proportional to the strength of the electromagnetic field being generated, an external source of power would be preferable.

The basic operation of this application will now be described. An RFID Tag programmed with unique information is placed in, on, or built into each shipping container. The Base Unit is somewhere on the ship, preferably on the deck since GPS signals are hindered by obstacles. The Base Unit's RF reader interrogates the Tag(s) on board the ship and collects data from each Tag. If the Base Unit has an internal power source, it could stand alone, but if not, it is connected to a power source. The GPS receiver in the Base Unit receives position data from the GPS satellites. The antenna or coil in the RF reader creates an electromagnetic field. The Tag detects the reader's activation signal. The reader decides the data encoded in the Tag. The transceiver in the Base Unit transmits the OPS position and Tag data collected ASP via a wireless communication system. The end-user can access information regarding the location of the shipment via the Internet.

An embodiment of this application can have the electromagnetic field constantly present, however, that would waste power. Alternatively, the field can be created upon demand, i.e. have it activated by a user at the ASP. An alternate embodiment can had the field created periodically, however, this creates the problem that the end-user may not know in real time where a shipment is, i.e., there would be lapses when the exact location is unobtainable. If the electromagnetic field is created when prompted, anyone can locate a shipment at any time.

In another embodiment of the present application, the Tag, without the receipt of the interrogation signal from the Base Unit, periodically sends information to the Base Unit. Information relating to the received information is sent by the Base Unit to the ASP. In yet another embodiment according to the present invention, the Base Unit sends information to the ASP in response to a particular circumstance monitored by the device.

The processing of data relating to, for example, the physical location and/or the parameters of the object being monitored may occur either in the Tag, the Base Unit, the ASP or some combination thereof. For example, the Base Unit may receive position data from the GPS satellites. The Base Unit itself may process the data before sending the calculated physical location to the ASP. Alternatively, the position data received by the Base Station may be sent to the ASP, which processes the information and calculates the physical location of the object. Furthermore, the present invention contemplates a distributed processing scheme in which part of the processing of the information received by the device is processed, in part, by a combination of the Tag, the Base Unit and/or the ASP. Finally, the Tag may be preprogrammed with the location data or may be preprogrammed with an identifying characteristic to permit the ASP to determine its location without the need of or in combination with the GPS data.

ACCESS CLEARANCE

In this application of the invention, a wrist watch-like Device comprising a wireless transceiver that activates when approaching a local receiver, transmits a stored ID to an ASP and stores information received from station for future access applications. The ASP grants access or releases items, and records ID time, and location for future data mining purposes. It could be located and deactivated remotely if lost. The Device would allow access only to authorized personnel to automate and secure item pick-ups and to allow traffic data mining—all with greater security than a card. Potential customers would include business, government, schools and universities, hospitals, hotels, banks, retailers, amusement parks, stadiums/arenas, sports teams, performance halls, movie theaters, ski resorts, casinos, airlines, etc.

USAGE CLEARANCE

In this application of the invention, a wrist watch-like Device comprises a wireless transceiver that activates when approaching receiver-enabled equipment and transmits stored-ID to the equipment. Equipment allows use. The Device could be located and deactivated remotely if lost. The Device could be used to allow equipment use only by authorized person by transmitting ID. Potential customers would include telecommunication companies, PC makers, office equipment manufacturers, automakers, firm arm manufacturers, and PDA manufacturers.

PAYMENTS

In this embodiment of the invention, a Wrist watch-like Device comprises a wireless transceiver that transmits account information to receiver-enabled Point-of-Sale (POS). If could be located and deactivated remotely if lost. Potential customers would include financial institutions and retailers.

VISUALLY IMPAIRED LOCATOR

In this embodiment of the invention, a wrist watch-like device comprising a GPS receiver and wireless transceiver is worn by the visually impaired to provide them with their location information. The Device will signal location to the ASP on demand from a user. An end-user can request information via a CMC or through a system web site. The Device could be used to let the blind know their location instantly. Potential customers would include visually impaired people

PAROLEE MONITOR AND LOCATOR

In this embodiment of the invention, a wrist watch-like Device comprising a GPS receiver, wireless transceiver, and biosensor is worn by a parolee. The Device will signal GPS location to the ASP on demand from a law enforcement agency. A law enforcement agent can request information via a system web site or a CMC. If parolee removes the Device, the lack of vital signs will trigger an alarm to the law enforcement agency. The Device could be used to locate parolees instantly without the risk of them removing the Device. Potential customers would include law enforcement agencies.

ALZHEIMER PATIENT LOCATOR

In this embodiment of the invention, a wrist watch-like Device comprising a GPS receiver and wireless transceiver is worn by an Alzheimer person that needs to be monitored. The Device will signal GPS location in the manner previously described to the ASP either periodically or on demand from the caregiver. The caregiver can request information via the system web site or the CMC. This application can be used to locate any missing person instantly. Potential customers would include Alzheimer patient relatives or caregivers.

CHILDREN LOCATOR AND MONITOR

In this embodiment of the invention, a wrist watch-like device comprising a GPS receiver, wireless transceiver, and biosensor is worn by children. The Device will signal location and vital signs to the ASP on demand from parents. Parents can request information via a system web site or CMC. The Device will send a warning signal to the ASP when no vital sign are recorded. The ASP will then initiate a call to parents automatically or through a CMC. The Device could be used to locate missing children instantly. Potential customers would include parents, grandparents, or other relatives or authorized guardians.

KIDNAPPING

In this application of the invention, a wrist watch-like Device comprising a GPS receiver, wireless transceiver, and biosensor can be worn by people at risk of being kidnapped. The Device will signal location to ground station on demand from relatives and/or user. Relatives can request information via a system web site or a CMC. The Device could be used to locate kidnapped people. Potential customers would include high net-worth families.

PROTECTION FORCES MONITOR AND LOCATOR

In this application of the invention, a wristwatch like Device comprising a GPS receiver, wireless transceiver, and biosensor is worn by agent that needs to be monitored and located. The Device will signal location to the ASP on demand from headquarters/camp. Headquarters can request information via a system web site or a CMC. The Device could be used to locate an agent in danger instantly and read his/her vital signs remotely. Potential customers would include federal, state, and local protection agencies, e.g., FBI, CIA, police, fire department, and the military, e.g., soldiers, marines, and pilots.

WOMEN SAFETY MONITOR AND LOCATOR

In this application of the invention, a wrist watch-like Device comprising a GPS receiver, wireless transceiver, and biosensor is worn by woman in potential danger. The Device will signal location to the ASP when vital signs show a pre-programmed danger-like pattern. The local police department can be advised to rescue the wearer immediately. The Device could also allow the user to send an "SOS" signal to the local police department when in danger and allow fast determination of location. Potential customers would include women and parents of young girls.

ELDER MONITOR AND LOCATOR

In this application of the invention, a wrist watch-like Device comprising a GPS receiver, wireless transceiver, and biosensor is worn by the elderly. The Device will signal GPS location to the ASP on demand from a caregiver or when vital signs indicate the need for emergency care. A Caregiver can request information via a system web site or a CMC. An emergency signal will be sent to a 911 station for ambulance dispatch. The Device could be used to allow emergency care and on-demand location. Potential customers would include relatives or caregivers of elderly people, e.g., those 70 years of age and older.

EXTREME SPORT PARTICIPANTS MONITOR AND LOCATOR

In this application of the invention, a wrist watch-like device comprising a GPS receiver, wireless transceiver, and biosensor is worn by extreme sport participants. The Device will signal location to the ASP on demand from a relative/team member or when vital signs indicate the need for emergency care. A relative/team member can request information via a system web site or a CMC. An emergency signal will be sent to a 911 station for emergency dispatch. The Device could be used to locate missing participants instantly and read vital signs remotely. Potential customers would include whitewater rafting, kayaking, mountain biking, rock/mountain climbing, skydiving, and hang gliding participants.

JOGGER MONITOR

In this application of the invention, a wrist watch-like Device comprising a wireless transceiver and biosensor is worn by jogger that wants to monitor his/her vital signs while exercising. The Device will signal readings to the ASP. The ASP station will record the information in the PD database for later retrieval on-demand from jogger, doctor, or trainer via a system web site or a CMC. The Device could be used to monitor vital signs while exercising to serve and replace routine effort tests and assist trainers. Potential customers include joggers and/or distance runners, sports teams and/or trainers.

RESPIRATORY DISEASE PATIENT MONITOR AND LOCATOR

In this application of the invention, a wrist watch-like Device comprising a GPS receiver, wireless transceiver, and biosensor is wore by a person with respiratory disease. The Device will signal GPS location data to the ASP when vital signs indicate the need for emergency care. An emergency signal will be sent to a 911 station for emergency dispatch and a signal will also be provided to a relative. The Device could be used to allow opportune emergency care. Potential customers include respiratory disease patients.

GLUCOSE MONITOR

In this application of the invention, a wrist watch-like Device comprising a wireless transceiver, glucose reader, and LC display that will read glucose levels, show reading in display is worn by a person needing glucose monitoring. The Device sends the data to the ASP and/or activates an output unit to inject insulin into the wearer. The Device could be used to increase frequency and reduce invasiveness of home glucose testing. Potential customers include diabetes patients.

ENDANGERED SPECIES

In this application of the invention, a Device comprising a GPS receiver, transceiver, data storage, self-powered, biosensors is attached to mammals and other large animals for various research projects and to protect endangered species. The Device could be used to track migration routes for research purposes, track routes to prevent hunting, and other research applications. Potential customers include Government, wildlife federations, and universities.

CAR THEFT RECOVERY

In this application of the invention, an after market installed anti-theft/location type Device comprising GPS receiver, transceiver, and battery for car theft recovery is installed in vehicles. A vehicle owner would notify the ASP through a system web site or a CMC that their vehicle was stolen. The CMC agent will locate the car upon the owner's request and inform the police, or the police may have direct access to the application. The Device could be used to locate a car upon owner's request and inform the police. This application of the invention could potentially sell at a lower price than a LoJack system (currently selling at about $650 per device). Additional vehicle-related services could be offered, i.e. medical alert, collision notification, remote open/close doors, and disabling the engine. Potential customers would include car owners, car rental agencies, or other fleet managers.

VALUABLES TRACKING

In this application of the invention, a Device comprising a GPS receiver, transceiver, and battery is located on valuable art pieces or place on merchandise mailings. The Device could provide location services through a system web site or CMC. The Device could be used to locate art pieces and merchandise upon owner's request or through request of a shipper. Potential customers would include shipping companies, art owners, museums, galleries, private security shippers, or armored car transportation companies.

WIRELESS TELEPHONE HEADSETS

In this application of the invention, a GPS receiver and transceiver device could be integrated into a handset. The location of a person calling or receiving calls may be displayed through caller ID; the handset may send location automatically when dialing 911 and other emergency services; the person may be located through interfaces, i.e., a system web site or a CMC, etc. This application would be especially useful to fleet managers, sales representatives, real estate brokers, etc. The Device could be used to enhance handset features to differentiate a manufacturer's product offerings. Manufacturers may offer "location ID" service for free or optional for an additional charge. Potential customers would include wireless manufacturers.

TRUCK AND FLEET TRACKING

In this application of the invention, an after market installation of a tracking Device in trucks comprising a GPS receiver and a transceiver. The technology may be scalable "horizontally" and also integrated to possible vertical applications. The Device could be used to locate trucks at all times. This application could assist fleet owners and manufacturers to improve logistics management. Many "vertical" applications can be employed, i.e., improving real-time routing decisions, just-in-time production applications, and delivery scheduling. Potential customers would include fleet owners, manufacturers, distribution companies, utilities, other businesses, and the government.

In the foregoing descriptions, the method and the system of the present invention have been described with reference to specific embodiments. It is to be understood and expected that variations in the principles of the method and the system herein disclosed may be made by one of ordinary skill in the art and it is intended that such modifications, changes, and substitutions are to be included within the scope of the present invention as set forth in the appended claims. The specification and the drawings are accordingly to be regarded in an illustrative, rather than in a restrictive sense.

UTILITY/METHODS OF OPERATION

Further methods of operating the device are described below with respect to certain design specific applications for certain devices of the present invention. The applications for such a device are widespread and limitless. A number of representative examples of systems embodying the device of the present invention are detailed below. Although the devices of the present invention are generally applicable to systems and methods for remote monitoring, locating and/or responding, the following embodiments according to the present invention contemplate specific applications which should not be interpreted to limit in any way the scope of the device of the present invention.

STUDENT MONITORING SYSTEM

This particular application is directed at locating, monitoring and/or tracking children. In particular, this application is directed at locating, monitoring and/or tracking children as they enter and exit a specially equipped school bus. The basic components of the system are depicted in FIG. 10.

As seen in FIG. 10, the system comprises a school bus 1140 having an entrance or door 1160 that is equipped with an RF receiver 1380. The bus also has a receiving/transmitting device 1120 mounted or otherwise installed thereon. Device 1120 comprises a wireless positioning receiver 400, such as a GPS receiver, and a wireless transceiver 1420.

In this particular application, a student or child 1180 is equipped with or otherwise provided a RFID 1200. RFID 1200 is programmed to uniquely identify the child 1180 in a manner known in the art. RFID's are well known in the art and are commercially available from a number of companies, such as Knogo Corp. or its successor Video Sentry Corporation. As the child 1180 enters bus 1140, RF receiver 1380 interrogates RFID 1200 in a manner known in the art, thus identifying that child 1180 has entered bus 1140. This information is then transmitted to or is otherwise available to device 1120. The time that child 1180 enters the bus is also stored by or otherwise available to device 1120. The time data can be gathered from the GPS receiver, can be determined by other on board clock systems, or in any other manner known in the art. In any event, the system determines that child 1180 has entered the bus 1140 and stores this information together with the time the child 1180 entered. The system also monitors whether or not the child exits bus 1140 and, if so, logs the fact and the time that the child leaves bus 1140. This information is also stored by or otherwise accessible to device 1120. In a preferred embodiment, the driver 1240 of bus 1140 is also equipped or otherwise provided with an RFID 1260. Data from RFID 1260 is transmitted to or otherwise accessible to device 1120 so that the system can track or determine who is driving bus 1140 at any time.

Device 1120 is in two-way wireless communication with Application Service Provider (ASP) 280. The two-way communication between device 1120 and ASP 1280 may occur, for example, via ground stations (not shown). ASP 1280 is in two-way communication with a computer network, such as the Internet 1300. Internet 1300 is in two-way communication with a number of individual networks, computers or other devices, such as school 320, individual parents 1340, and a parking garage 1360. The communications between the various systems, i.e., ASP 280, Internet 1300, school 1320, parents 1340 and garage 1360 can be wireless or direct connection as a matter of application specific design choice. In any event, the various systems can access and communicate with ASP 1280 and, in turn, with device 1120 on bus 1140.

The basic operation of the system will now be described. As student 1180 enters bus 1140, RF receiver 1380 interrogates RFID 1200, thus identifying that student 1180 has entered bus 1140. The system logs in or otherwise stores the fact that student 1180 has entered the bus and also logs in or otherwise stores the time and, in a preferred embodiment, the particular location at which student 1180 entered bus 1140, which can be determined from the GPS signal. The system also identifies the driver 1240 of bus 1140. This information, e.g., when and where student 1180 entered the bus, and who is driving bus 1140, is stored or otherwise accessible to device 1120 and is capable of being transmitted wirelessly to ASP 280 by transceiver 420 of device 1120. In a preferred embodiment, RFID 1200 and/or student 1180 may also be provided a sensor, such as a temperature sensor, to confirm whether the RFID is physically on student 1180. This sensor information would also be transmitted to or otherwise accessible to device 1120 and ASP 1280.

This information can be transmitted to ASP 1280 either for example, periodically, by request of an end user, by request of driver 1240 or in the case of an emergency (e.g., triggered upon the deployment of air bags or other collision sensors on bus 1140). Other data is also available to ASP 1280, such as, for example, the location of bus 1140, its speed, and any other measured or determined condition within the bus such as temperature, humidity, etc.

It is desirable for parents and/or authorized school officials to be able to track or monitor when and where various students go on or off the bus. The system of the present invention provides such a means. For example, a parent 1340 of child 1180, who has been given an appropriate password or other security device, can log on to the ASP 280 via a computer network, such as the Internet 1300. Parent 1340 can, in real time, determine whether their child 1180 has entered bus 1140 and where this occurred. Parent 340 can also determine whether and where their child 1180 got off bus 1140. Parent 340 can also confirm, via sensor data, whether child 1180 is still wearing or otherwise in possession of RFID 200. Parent 340 can also send requests to ASP 1280. That is, for example, if parent 1340 confirmed that child was on bus 1140 as described above, but wished to know where bus 1140 was at that particular moment, parent 340 could request such information via ASP 1280. Such information could be derived from the GPS data received by device 1120 and transmitted to ASP 280. Such capabilities would also be available to authorized school officials at school 1320. Of course, various security precautions would need to be incorporated in the system to ensure that only authorized individuals have access to such personal information. In any event, the system of the present invention will bring great peace of mind to parents and school officials as a convenient and inexpensive system for tracking and locating students in a real time fashion.

The system also provides for additional benefits for the school system. For example, when the bus 1140 returns to the parking garage 1360, the various data can be analyzed to confirm that every student that got on the bus also got off the bus. If a child happened to be lost, the school could check the records to confirm whether, where and when the child got on and/or off the bus. The school could also monitor the driving pattern of the driver 1240 by checking or monitoring, for example, the speed of bus 1140 over the driver's route that day. Detailed reports could be automatically generated by using the various data gathered and stored by the system described above.

Various modifications, additions or substitutions of the components described above could be made without departing from the spirit of the invention described above. For example, while the system has been described as a system for monitoring children on a school bus, the system would work equally well as a system for monitoring the entry and exit of any individual or other object that enters and exits a confined area, such as, for example, tourists on a bus trip, inmates traveling between two locations, packages shipped between two locations, etc.

FOOD QUALITY MONITORING SYSTEM

This particular application is directed at locating, monitoring and/or tracking food. In particular, this application is directed at locating, monitoring and/or tracking food as it is in transit. The basic components of the system are depicted in FIG. 11.

As seen in FIG. 11, the system comprises a truck or other food container 2140 having a food item 2180 therein. The truck is equipped with a receiving/transmitting device 2120 mounted or otherwise installed thereon. In this particular application, device 2120 comprises a wireless positioning receiver 2400, such as a GPS receiver, a wireless transceiver 2420 and a sensor 2440. Sensor 2440 may be any type of sensor applicable to measuring, tracking or confirming a parameter related to the quality of food item 2180 such as, for example, a temperature sensor, humidity sensor or gas sensor to name a few. Sensor 2440 is coupled to, transmits or otherwise makes such data available to device 2120, and in particular, transceiver 2420 of device 2120.

Device 2120 is in two-way wireless communication with a base or ground station 2200, which is in turn in two-way communication with an Application Service Provider (ASP) 2280. ASP 2280 is in two-way communication with a computer network, such as the Internet 2300. Internet 2300 is in two-way communication with a number of individual networks, computers or other devices, such as, for example, transportation company 1320, food producer 1340, customer 1360 or a government agency 2380, to name a few. The communications between the various systems, i.e., transportation company 1320, food producer 1340, customer 1360 or a government agency 2380 can be wireless or direct connection as a matter of application specific design choice. In any event, the various systems can access and communicate with ASP 2280 and, in turn, with device 2120 on truck 2140.

The basic operation of the system will now be described. As food item 2180 is placed on a truck 2140 or other shipping container. A device 2120 is placed on or near food item 2180. The actual physical location of device 2120 in relation to food item 2180 is immaterial, so long as sensor 2440 of device 2120 can adequately monitor the desired parameter of food item 2180. Sensor 2440 gathers or otherwise determines sensor data relating to the parameter to be monitored. This sensor data is stored by, or is otherwise accessible to, device 2120 and, in particular, transceiver 2420. GPS receiver 2400 receives data from GPS satellite 2100. The GPS data, as well as the sensor data, is available to transceiver 2420 for wireless transmission to ground station 2200. Ground station 2200 in turn makes this information available to ASP 2280 and to Internet 2300, upon which such information is available to authorized end users.

The information can be transmitted to ASP 2280 either, for example, periodically, by request of an end user, or by request of the driver or operator of truck 2140, to name a few Other data is also available to ASP 2280, such as, for example, the location of truck 2140, its speed, distance traveled, time since departure, time to arrival, etc.

It is desirable for various end users and/or authorized officials to be able to track or monitor the safety and/or quality conditions of food in transit. The system of the present invention provides such a means. For example, a customer 2360 of food item 2180, who has been given an appropriate password or other security device, can log on to the ASP 2280 via a computer network, such as the Internet 2300. Customer 2360 can, in real time, determine where their food shipment is in transit, can check or monitor the condition or quality of the food item in transit, can monitor the distance traveled by the food item, and can estimate, in real time, the time of arrival of the food item. The transportation company 2320 can similarly monitor the quality of the food item, track the amount of time the truck and/or driver have been in transit, monitor the speed the truck is or has been traveling at, and estimate, in real time, when the truck should arrive at the customers location. Similarly, the food producer 1340 can monitor the quality of the food in transit should a dispute arise with either the customer 2360 or the transportation company 2320 or others. In fact, the system will permit each party to document the quality of the food item at each stage in the delivery process. Such documentation may serve as a "Stamp of Approval" that the food item was maintained in a safe condition while in its possession. Finally, an appropriate government agency 2380 can also monitor, in real time, the quality of the nation's food supply, as well as monitoring the time the particular driver and/or vehicle have been in transit should any problems or accidents occur. In any event, each of the parties involved can monitor the quality of the food item, in real time, while it is in transit.

Various modifications, additions or substitutions of the components described above could be made without departing from the spirit of the invention described above. For example, while the system has been described as a system for monitoring food on a truck, the system would work equally well as a system for monitoring the quality of food on a train or plane. Similarly, the system could monitor various parameters that might be important to the shippers of various valuable items such as artwork, where the humidity and temperature within the container may be important factors.

SLEEP MONITORING SYSTEM

Yet another exemplary application of the systems described herein relates to monitoring the wake and sleep states of individuals. Such an application will now be described with reference to FIG. 12. As shown therein, individuals, such as operators of automobiles and machinery, infants, or individuals with sleeping disorders wear EEG sensors. The output from the EEG sensor is coupled to the portable unit by any of the number of means. The portable unit, in turn, transmits the output from the EEG Sensor to an antenna and to the ASP computer system.

The ASP is able to determine whether the individual wearing the sensor is in a wake state or sleep state based on analysis of the EEG sensor output. As described in Alberto, Claude, et al. "The Quantification of Sleep and Wakefulness in 2 Second Epochs of EEG", and Alberto, Claude et al., "Computerized Quantification of Sleep and Wakefulness in the EEG", available from the Sleep Disorders Center, Winthrop Hospital and SUNY Health Sciences Center at Stony Brook, Mineola, N.Y., both of which are incorporated by reference herein, a function of the value of the EEG sensor output corresponds to the state of the individual. As described in the Alberto references cited above, a positive output indicates the individual being in a wake state, and a negative value indicates the individual being in a sleep state. Thus, the ASP includes a programmed computer that calculates the relevant function of EEG signal and monitors the function of the EEG signal for the transition between positive and negative values, a transition which typically occurs over a few minutes.

Upon detecting the transition from the wake state to the sleep state, the ASP provides feedback to the portable unit which, in the present embodiment, includes a waking device, such as an audible alarm, visual alarm, tactile alarm, such as an electronic shock, and the like.

In addition, the ASP makes the EEG signal available to end users via a secure website on the Internet. The ASP also provides the analysis of the EEG signal on the website, including information on whether the individual is awake or asleep, historical data concerning the EEG signal, frequency information concerning the EEG signal and the like.

The end-users may include any of a number of individuals and entities. For example, the wearer himself may choose to periodically access the ASP website to view information concerning his EEG signal patterns. The wearer's doctor or physician may also have access to the website for further analyzing the EEG signals. Such further analysis by a physician is particularly useful where the individual wearing the device has a sleeping disorder or where the individual is an infant at risk for sudden infant death syndrome.

And yet another embodiment, other present invention, the physician is given control over the type of feedback supplied to the wearer. For example, based on the individual's EEG pattern, the physician may select activation of the waking device at regular intervals or at particular times in the day.

It is to be understood that the analysis performed by the ASP may, in alternate embodiments, be performed or partly performed by the portable unit. For example, the portable unit may include a microprocessor programmed to detect the transition between the positive EEG signal and negative EEG signal and, based thereon, transmit a signal to the ASP. In yet another embodiment, the portable unit not only senses the transition between the wake state and sleep state, but also automatically provides waking stimulus via a waking device.

WASTE MONITORING SYSTEM

Yet another application of the system described herein involves monitoring hazardous waste, and will be described with reference FIG. 13.

As shown in FIG. 13, the system may be applied to monitor the position of hazardous waste such as that contained within mobile or stationary containers or landfills and the like. More specifically, portable devices may be affixed to drums carrying waste, and may include sensors both external to and internal to the drum. External sensors may detect seepage of the waste outside of the drum, and sensors located within the drum may detect seepage of ambient conditions into the drum; either condition identifying leakage. Furthermore, where the waste containers are mobile, the portable units include location tracking components, such as GPS receivers described above. It is to be understood that the particular type of sensors used depends upon the waste being monitored, and they include sensors for detecting particular chemicals, gases, radioactivity and the like.

The positioning information and the output from the sensors are transmitted to the ASP via an antenna. The ASP, in turn, monitors the position and sensor outputs. In one embodiment, the ASP makes such position and sensor information available on a secure website via the Internet. Potential end-users having access to such website may include Local and Federal Regulatory Agencies, residents and other end-users.

The ASP may also perform various analysis on the location information and sensor information. For example, the ASP may have stored in memory certain thresholds, the occurrence of which causes the ASP to send an alarm to anyone of the end-users. With regard to location, the ASP may determine whether the waste is within or without of a certain jurisdiction. For example, a state government may hire the ASP to track waste to ensure that it does not leave the State without approval; conversely, a particular State may hire the ASP to notify it in the event any waste enters the State. In short, the ASP can track any type of movement of the waste and notify any end-user of such movement. With regard to sensor output, the ASP may determine whether there is leakage from any container and whether such a leakage is above a limit set by, for example, a Federal Agency. In the event there is a leakage above a particular threshold, the ASP could automatically contact and dispatch to a particular location a containment and clean-up crew.

Also as illustrated in the figure, portable units may be disbursed in and around a landfill or other stationary containment area. In such an embodiment, the portable units would include sensors both above and below ground. Furthermore, the portable units may include identification means such as flags, lights, automobile sounds, and the like. In such an embodiment, the ASP may monitor the location of the portable units and sensor outputs to determine whether unauthorized waste has been deposited, whether unacceptable seepage of contaminants has occurred, and the like. In one embodiment, the ASP installs portable units and sensors adjacent a private residence, including in or near the residence water supply, and on behalf of such resident monitors for any contaminants. As with the previously described device, the ASP may make monitors information available via the Internet or other device and may notify any predetermined individual or entity upon the detection of a given level of contaminant.

In any of the foregoing waste monitoring systems, the ASP may identify which device and sensor(s) detects the alarm condition, note the device's location (which is provided to the end user), and preferably activates an audible, visual or other location beacon on the device. Such activation is achieved by the ASP transmitting an interrogation signal having modulated in it the ID of the particular device. The device, in turn, receives the interrogation signal and, based on-local logic, determines that the modulated ID matches the device's stored ID and activates the beacon.

GUIDE/TRAINING SYSTEM

In yet another embodiment the system described herein may be used to provide feedback to a user for the general purposes of guiding, training and protecting the user. As illustrated in the schematic of FIG. 14, a tourist, jogger or other traveling individual has a portable unit according to the present invention, including one or more sensors, such as know sensors for reading pulse rate, temperature, blood oxygen, and the like, and a feedback device, such as a pair of headphones, digital display, and the like, both of which are coupled to the portable unit. As described above, the portable unit also includes location tracking circuitry.

In operation, the ASP continuously or periodically receives location tracking information and sensor outputs, thereby tracking the user's location and various biological variables. Having received such information, the ASP preferably stores the information and makes it available to users via a secure web site on the Internet. In an alternate embodiments, the ASP communicates with the end users via any of a number of communication paths, including LAN, WAN, voice/cellular, and the like. More specifically, the ASP preferably provides both real-time location and sensor data, as well as historical information, such as average speed (based on change in location over time), average pulse, average blood oxygen content, and other data available from the sensors and location. Such averages may be taken over various time periods, such as months, days, hours, etc., or taken over discrete events, such as a runner's training interval, or over the time period the user is in a particular location.

The ASP may further perform certain analysis on the received location and sensor data and make such analysis available via the web site. This analysis, preferably performed by software running on a general purpose computer, may include comparing the location and sensor data to predefined thresholds. In one such embodiment, the ASP compares actual location and time data to predetermined location and time data, thereby determining whether the user is "behind" or "ahead of schedule". Such information may be particularly useful to delivery services and athletes training. Another analysis performed by the ASP includes determining whether the location and/or sensor data exceeds a predetermined threshold, is within a certain range, and the like. For example, the ASP may determine whether a runner training for a race maintains her heart rate within a certain range or maintains her blood glucose level within a certain range.

As noted above, the system of the present embodiment further includes a feedback device. Accordingly, any of the information received by the ASP, derived by the ASP, or stored by the ASP may be transmitted back to the user via cellular or other communication means and received by the feedback device. In one embodiment the user is a jogger and the feedback is information relevant to training, such as actual speed, heart rate, blood sugar level as compared to optimum or predetermined levels is provided via the earphones. In another embodiment, the feedback comprises information pertinent to location and the user's surroundings. In such an embodiment, the ASP maintains a database of sites of interest, such as tourist attractions, restaurants, museums, and the like, and automatically provides the user with such information based on user preferences and/or user location. More specifically, the ASP's computer system is programmed to track user location, retrieve from memory indications of the user's preferences, retrieve stored information pertaining to all sites, filter the information according to the user's preferences and provide the resulting information to the user. The information provided to the user may be in any of a number of forms, including voice via the earphones (such as "the nearest American food restaurant is two blocks west"), and via the digital display, including a map of the user's then current surroundings with points of interest highlighted. In short, any type of information may be stored by the ASP and provided to the user.

Other design specific applications and devices are set forth in the accompanying materials, the details of which will be apparent to one of skill in the art upon reading and understanding the accompanying materials.

TRANS-OCEANIC CARGO TRACKING

An alternate embodiment is directed at tracking shipping containers. The device can be used to a) determine what containers are on board a ship b) receive position information from the GPS satellites c) transmit the data collected wirelessly to an ASP which is connected to a computer network, such as the Internet, from which the end user can access the information.

The device generally comprises: a Radio Frequency Identifier (RFID) reader which includes an antenna or coil, a transceiver and decoder; a GPS receiver, and a wireless transceiver. Another important aspect of the invention is the RFID tag, which is placed on or in each shipping container being tracked and has a preferably unique ID code. These tags also preferably contain information unique to each container. The information programmed in the tag may differ. One option is to store unique numbers identifying the container and have the shipping company keep inventory on what is in which container. Another is to store detail on what is being shipped. It would be more efficient to use the prior method and reuse the containers or tags, rather than using them once or using re-writeable tags that would be more costly.

Although not essential, the device could include a power source or have features to connect to a power source in order to power the components of the device. A strong electromagnetic field would be needed to reach all the containers on the ship. Since the power needed is proportional to the strength of the electromagnetic field being generated, an external source of power would probably be preferred.

The basic operation of the device will now be described. A tag programmed with unique information is placed in, on or built into shipping containers. The device is somewhere on the ship, preferably on the deck, since GPS signals are hindered by obstacles. If the device has an internal power source, it could stand alone, but if not, it must be connected to a power source. The GPS receiver receives position data from the GPS satellites. The antenna or coil in the reader creates an electromagnetic field. The tag detects the reader's activation signal. Reader decides the data encoded in the tag. Transceiver transmits the data collected (position data and data from tag) to the cellular satellite. Cellular satellite transmits the data to ASP. End user can access information regarding the location of the shipment via Internet.

The electromagnetic field can be constantly present, but that would be a waste of power. It can be created upon demand, i.e. have it activated by someone at ASP. Another option is for it to be created periodically. The problem with making it periodic is the fact that the end user will not know in real time where his shipment is. There would be lapses when the exact location is unobtainable. If the electromagnetic field is created when prompted, anyone can locate his shipment at any time.

Other applications, as well as a more detailed description of the various components of the system, are provided below.

The device can be placed near or on the surface of the object (either above or below ground), or can be placed within or beneath the surface of the object. In a preferred embodiment of the present invention, the device is adapted to be placed proximate the object. However, other configurations and placements are envisioned as a matter of design specific applications.

Various wireless transceivers are commercially available, for example, Axiom's FMS-21000 analog system. While in a preferred embodiment the device of the subject application receives and transmits data wirelessly, as a matter of application specific design parameters, such data transfer may be accomplished via a direct wire-to-wire connection.

The term sensor as used herein includes any number of commercially available sensors on the market, including for example, biosensors, magnetic sensors, temperature sensors, humidity sensors, pH sensors, air quality sensors, radioactive sensors, and mechanical sensors, to name a few.

The device of the present invention may also include a power source, such as a solar powered self-charging battery, a multi-channel A/D converter, and a microprocessor. The battery can be used to power the various components of the device such as the GPS receiver and the microprocessor. The A/D converter can be used to convert the sensor data for transmission by the transceiver, and can also be used to convert data receiver from the transceiver to the sensor. The microprocessor may be, for example, a MEM or ASIC based DSP, for storing the sensor data and/or the position data for transmitting by the transceiver.

It is to be understood that the foregoing embodiments may utilize any number of different antennae. It is preferable that the antennae used in the foregoing embodiments efficiently and effectively receive the location signals, such as GPS signals, and receive and transmit the wireless communication signals, such as cellular telephony signals, without interfering with one another. Furthermore, it has been found that effective antenna designs are those capable of receiving a wide frequency band, providing for a high level of magnetic flux concentration, and providing for a low capacitance to enable easy tuning.

A preferred basic operation of the device will now be described. The receiver on the device is in one-way communication with the GPS satellite system and receives position data from the GPS satellites. The sensor receives data regarding a particular parameter of the object wished to be monitored. The position data and the sensor data are sent or are otherwise available to the transceiver for transmission to a computer or base station. While in a preferred embodiment the device of the subject application receives and transmits data wirelessly, as a matter of application specific design parameters, such data transfer may be accomplished via a direct wire-to-wire connection.

The base station wirelessly transmits an interrogation signal to the device, with which the base station is in two-way wireless communication. In response to the interrogation signal, the device wirelessly transmits information relating to the physical location (position data) and/or the parameter of the object being monitored (sensor data). Further information can be sent that is stored in the device such as, for example, identifying object information. The base station sends information relating to information received from the device to a central unit. The information received by the central unit can ultimately be stored, displayed, printed, processed or sent to other central units in a network or the Internet, for example.

The central unit, which may be located in a monitoring center, for example, may make the request for information periodically or aperiodically, for example, by a manual intervention or a command triggered by a particular circumstance. Furthermore, the central unit may be in wire-to-wire or wireless communication with the base station. While a preferred embodiment of the subject invention envisions transfer of data from the device to a base station and then to a central unit, such transfer may be directly to a computer, control room or other central unit type of device as a matter of application specific design choice.

In light of the information received by the control center, an automatic, semi-automatic or manual response may be needed. For example, upon reviewing the information received by the control center, a technician may authorize the irrigation of a tree (or group of trees) or other plant or object being monitored. Alternatively, after analyzing the information received by the control center, a program being run by the control center may ascertain a particular condition and authorize irrigation to that location automatically. The control center may also perform various analysis on the location information and sensor information. For example, the control center may have stored in memory certain thresholds, the occurrence of which causes the control center to send an alarm to anyone of the end-users or to automatically irrigate the object.

In another embodiment according to the present invention, the device, without the receipt of the interrogation signal from the base station, periodically sends information to the base station. Information relating to the received information is sent by the base station to the central unit. In yet another embodiment according to the present invention, the device sends information to the base station in response to a particular circumstance monitored by the device.

The processing of data relating to, for example, the physical location and/or the parameters of the object being monitored may occur either in the device, the base station, the central unit or some combination thereof. For example, the device may receive position data from the GPS. The data may be processed by the device itself before sending the calculated physical location to the base station. Alternatively, the position data received by the device may be sent to the base station, which processes the information and calculates the physical location of the object, the calculated physical location of the object being sent to the central unit. In yet another alternative, the position data is sent to the device which sends the information to the base station which, in turn, sends the information to the central unit. In this embodiment, the central unit processes the position data and calculates the physical location of the object. Furthermore, the present invention contemplates a distributed processing scheme in which part of the processing of the information received by the device is processed, in part, by a combination of the device, the base station and/or the central unit. Finally, the device may be preprogrammed with the location data or may be preprogrammed with an identifying characteristic to permit the central computer to determine its location without the need of or in combination with the GPS data.

MICRO-IRRIGATION SYSTEM

The embodiment of FIG. 15 provides a device for remotely monitoring an environmental parameter indicative or whether an object, such as an olive tree, needs irrigation or fertilization. By way of non-limiting examples, such an environmental parameters may be the water content, humidity, temperature or pH of the soil or air proximate a tree. The device is placed proximate the tree. The device comprises a) a receiver for receiving position data from the GPS, b) a sensor(s) for measuring or otherwise determining the environmental parameter, and c) a transmitter for transmitting the position data and parameter data to a central unit, such as a computer, a control station, a base station or a ground station. A user can access this information to determine whether that particular tree needs watering or fertilizer. Further, the device of the present invention may also be part of a system for providing automatic irrigation of the tree. That is, the device can be incorporated into an overall irrigation system for providing automatic and precise micro-irrigation of isolated plants and/or areas. For example, the device can be used to determine if a particular tree needs water. If so, the device can transmit this information to a central location wirelessly (or by direct wire-to-wire connection). The device could also transmit the precise location of the tree via the GPS data received by the device. Thus, at the central location or control station, the user would know whether the tree needs to be irrigated, and would also know the precise location of the tree. The user could then irrigate that particular tree, and no others, thus saving valuable water resources. The system could also be programmed to automatically irrigate the tree without user input.

The device may be incorporated into a system for monitoring the irrigation requirements for a plant, tree or other object requiring periodic or aperiodic irrigation, for example, as set forth in the system database. More specifically, a device may be positioned proximate a tree, and may include sensor(s) for detecting a condition or series of conditions which indicate that irrigation (or fertilization) or the tree or a group of trees is required. It is to be understood that the particular type of sensor(s) used depends upon the particular condition being monitored, and includes, for example, sensors for detecting temperature, humidity, pH and the like. The sensor(s) may be located above or below ground. The device may also include location tracking components, such as GPS receiver as described above or the device may be preprogrammed with the location data or may be preprogrammed with an identifying characteristic to permit the central computer to determine its location without the need of or in combination with the GPS data.

The positioning information and the output from the sensors are transmitted to a control center wirelessly via an antenna or in a direct wire-to-wire connection (not shown). The control center, in turn, monitors or otherwise determines the position of the device and monitors or otherwise determines the sensor outputs to monitor the desired environmental parameter.

A specific application of the system will now be described. Device A monitors the environmental parameter (s) proximate tree A, and this information is transmitted wirelessly to the control center. The control center can determine which particular tree is being monitored either by receiving the GPS data from device A or by receiving an identification code or other preprogrammed data from device A identifying device A as being proximate tree A. The devices may also include identification means such as flags, lights, automobile sounds, and the like. If the control center determines that tree A is in need of irrigation, then the control center can automatically open remote control valve A to irrigate tree A. Of course the system may also be operated manually whereby a technician is instructed or otherwise advised that tree A needs attention whereby the technician manually opens remote control valve A. The system can be adapted to irrigate tree A for a certain amount of time or to deliver a certain amount of water depending on the parameter data received from device A either alone or in conjunction with other data received by or programmed into the control center.

If control center determines that trees A and D, for example, need irrigation, then the control center may open up both remote valves A and D. Similarly, if the control center determines that all the trees in the entire area 11 need irrigation, then the control center can open up area control valve 11 to irrigate trees A, B, C and D. The control center can similarly open area control valves 12 and 13 to irrigate areas 12 and 3 (not shown). Thus, the system of the present invention provides for micro-irrigation of the trees, thus saving valuable water resources. The system can also save valuable manual resources by providing for the automatic monitoring and irrigation of individual trees and/or areas.

The following exemplary applications detail further aspects and applications for the various embodiments of the devices and support systems described above. One of skill in the art, upon reading and understanding the invention described herein, will envision how the devices and support networks described herein can be applied, modified added to, subtracted from or substituted to operate in connection with the specific applications described below.

ACCESS CLEARANCE

A wrist watch-like device comprising a wireless transceiver that activates when approaching a local receiver, transmits a stored ID to a ground station and stores information received from station for future access applications. Ground station grants access or releases items, and records ID time, and location for future data mining purposes. It could be located and deactivated remotely if lost. The device would allow access only to authorized people, to automate and secure item pick ups, and to allow traffic data mining. All with greater security than a card. Potential customers would include business, government, schools and universities, hospitals, hotels, banks, retailers, amusement parks, stadiums/arenas, sports teams, performance halls, movie theaters, ski resorts, casinos, airlines.

USAGE CLEARANCE

A wrist watch-like device comprising a wireless transceiver that activates when approaching receiver-enabled equipment and transmits stored-ID to equipment. Equipment allows use. The device could be located and deactivated remotely if lost. The device could be used to allow equipment use only by authorized person by transmitting ID. Potential customers would include telecommunication companies, PC makers, office equipment manufacturers, auto makers, firm arm manufacturers, and PDA manufacturers.

PAYMENTS

A Wrist watch-like device comprising a wireless transceiver that transmits account information to receiver-enabled POS. If could be located and deactivated remotely if lost. Potential customer would include financial institutions.

ALZHEIMER PATIENT LOCATOR

A wrist watch-like device comprising a GPS receiver and wireless transceiver worn by person that needs to be located. Device will signal location to ground station on demand from care taker. Caregiver will request information via web site or call center. The device could be used to locate a missing person instantly. Potential customers would include Alzheimer patient relatives or caregivers.

VISUALLY IMPAIRED LOCATOR

A wrist watch-like device comprising a GPS receiver and wireless transceiver worn by the visually impaired to provide them with their location information. Device will signal location to ground station on demand from user. User will request information via call center. The device could be used to let the blind know their location instantly. Potential customers would include visually impaired people

PAROLEE MONITOR AND LOCATOR

A wrist watch-like device comprising a GPS receiver, wireless transceiver, and bio sensor worn by parolee. Device will signal location to ground station on demand from law enforcement agency. Law enforcement agent will request information via web site or call center. If parolee removes device, the lack of vital signs will trigger a warning signal to the law enforcement agency. The device could be used to locate parolees instantly without the risk of them removing the device. Potential customers would include law enforcement agencies.

CHILDREN LOCATOR AND MONITOR

A wrist watch-like device comprising a GPS receiver, wireless transceiver, and bio sensor worn by children. Device will signal location and vital signs to ground station on demand from parents. Parents will request information via web site or call center. Device will send warning signal to station when no vital sign are recorded. Station will place call to parents. The device could be used to locate missing children instantly. Potential customers would include parents and grandparents or other relatives or authorized caregivers.

KIDNAPPING

A wrist watch-like device comprising a GPS receiver, wireless transceiver, and bio sensor wore by people at risk of being kidnapped. Device will signal location to ground station on demand from relatives and/or user. Relatives will request information via web site or call center. The device could be used to locate kidnapped people. Potential customers would include high net-worth families.

PROTECTION FORCES MONITOR AND LOCATOR

A wrist-watch like device comprising a GPS receiver, wireless transceiver, and bio sensor worn by agent that needs to be monitored and located. Device will signal location to ground station on demand from headquarters/camp. Headquarters will request information via web site or call center. The device could be used to locate agent in danger instantly and read his/her vital signs remotely. Potential customers would include protection agencies (FBI, CIA, police, fire department), and military (for soldiers, marines, pilots)

WOMEN SAFETY MONITOR AND LOCATOR

Wrist watch-like device comprising a GPS receiver, wireless transceiver, and bio sensor worn by woman in potential danger. Device will signal location to ground station when vital signs show a pre-programmed danger-like pattern. Local police department will be advised to rescue her immediately. The device could be used to send SOS signal to police department when in danger and allow fast determination of location. Potential customers would include women age 20–60 and parents of 10–20 year old girls.

ELDER MONITOR AND LOCATOR

A wrist watch-like device comprising a GPS receiver, wireless transceiver, and bio sensor worn by elderly. Device will signal location to ground station on demand from care giver or when vital signs indicate the need for emergency care. Care giver will request information via web site or call center. Emergency signal will be sent to 911 station for ambulance dispatch. The device could be used to allow emergency care and on-demand location. Potential customers would include relatives or care givers of elderly people (assuming 70 years of age and older).

EXTREME SPORT PARTICIPANTS MONITOR AND LOCATOR

A wrist watch-like device comprising a GPS receiver, wireless transceiver and bio sensor worn by extreme sport participants. Device will signal location to ground station on demand from relative/team member or when vital signs indicate the need for emergency care. Relative/team member will request information via web site or call center. Emergency signal will be sent to 911 station for emergency dispatch. The device could be used to locate missing participants instantly and read vital signs remotely. Potential customers would include whitewater rafting, kayaking, mountain biking, rock/mountain climbing, skydiving, and hand gliding participants.

JOGGER MONITOR

A wrist watch-like device comprising a wireless transceiver and bio sensor worn by jogger that wants to monitor his/her vital signs while exercising. Device will signal reading to ground station. Ground station will record information in database for later retrieval on-demand from jogger, doctor or trainer via web site or call center. The device could be used to monitor vital signs while exercising to serve and replace routine effort tests and assist trainers. Potential customers include joggers and/or distance runners, sports teams and/or trainers.

HEART DISEASE PATIENT MONITOR AND LOCATOR

A wrist watch-like device comprising a GPS receiver, wireless transceiver, bio sensor, and ECG worn by person with heart disease. Device will signal location to ground station when vital signs indicate the need for emergency care. Emergency signal will be sent to 911 station for emergency dispatch and be provided to relative. Ground station will record ECG results for future access by physician. Physician will access results via web site. The device could be used to allow emergency care and post event diagnosis. Potential customers include heart disease patients.

RESPIRATORY DISEASE PATIENT MONITOR AND LOCATOR

A wrist watch-like device comprising a GPS receiver, wireless transceiver and bio sensor wore by person with respiratory disease. Device will signal location to ground station when vital signs indicate the need for emergency care. Emergency signal will be sent to 911 station for emergency dispatch and to provided relative. The device could be used to allow opportune emergency care. Potential customers include respiratory disease patients.

GLUCOSE MONITOR

A wrist watch-like device comprising a wireless transceiver, glucose reader, and LC display that will read glucose levels, show reading in display, send it to ground station, and/or to insulin pump. The device could be used to increase frequency and reduce invasiveness of home glucose testing. Potential customers include diabetes patients.

DOMESTIC PETS AND LIVESTOCK

As illustrated in FIG. 16, A wrist watch-size device comprising a GPS receiver, transceiver, data storage, self-powered battery attached to pet's neck. Pet owner may notify DA of lost pet via a call center or web page. The call center agent will locate pet upon owner's request and inform the owner or may notify an agency that will bring the pet to the owner. The device could be used to locate pet upon owner's request. The call center agent will locate pet and inform the owner. DA may offer other related services, such as notifying an agency to physically locate the pet and identifying pets if disputes arise. Potential customers include pet owners.

Similarly, a device comprising a GPS receiver, transceiver, data storage, self-powered, and bio-sensors attached to monitor and identify cattle and pigs through the breeding/production chain up to the production facility. The device could be used to increase reach of tracking and identification systems to farms and production facilities. Provide additional opportunities for applications such as disease control, inventory management, track cattle and pigs in production facility to specific farms. Potential customers would include farmers and producers.

ENDANGERED SPECIES

A device comprising a GPS receiver, transceiver, data storage, self-powered, bio-sensors attached to mammals and other large animals for various research projects and to protect endangered species. The device could be used to track migration routes for research purposes, track routes to prevent hunting, other research applications. Potential customers include Government, wildlife federations, and universities.

CAR THEFT RECOVERY

An after market installed anti-theft/location type device comprising GPS receiver, transceiver, and battery for car theft recovery. Car owner notifies DA of lost car via a call center. The call center agent will locate car upon owner's request and inform the police, or the police may have direct access to the application. The device could be used to locate car upon owner's request and inform the police. DA device could potentially sell at a lower price than LoJack (currently selling at about $650 per device). Additional services could be offered, i.e. medical alert, collision notification, remote open/close doors and disabling the engine. Potential customers would include car owners and car rental agencies or other fleet managers.

VALUABLES TRACKING

A device comprising a GPS receiver, transceiver, and battery located on valuable art pieces or place on merchandise mailings. Provide location services through a call center or web site. The device could be used to locate art pieces and merchandise upon owner's request or through request of a shipper. Potential customers would include shipping companies, art owners, museums, galleries, private security shippers, armored car transportation companies.

WIRELESS TELEPHONE HEADSETS

Integrate a GPS receiver, transceiver device to a handset. Location of person calling or receiving calls may be displayed through caller ID; handset may send location automatically when dialing 911 and other emergency services; person may be located through interfaces, i.e. a call center, web page, etc. Specially useful to fleet managers, sales representatives, real estate brokers, etc. The device could be used to enhance handset features to differentiate manufacturers product offerings. Manufacturers may offer "location ID" service for free or optional for an additional charge. Potential customers would include wireless manufacturers.

LUGGAGE TRACKING

As illustrated in FIG. 17, a wrist-watch size device comprising a GPS receiver, transceiver, and data storage attached to bags at the checking counter and taken off after luggage claim. In the near term, the device may be used to locate lost luggage. In the long term, the device will have to substitute for airlines current tracking system. The device could be used to substitute for current airlines luggage tracking and identification systems, i.e., bar code system. In addition, to locate lost bags via GPS technology. Potential customers would include the airline companies.

Similarly, a wrist-watch size device comprising a GPS receiver, transceiver, data storage, and battery attached to luggage to locate bag upon owner's request. Device may be sold directly to passengers at the airport, through the web, or by mail. The device could be used to locate bag upon owner's request. Bag owners may request to locate bag via call center or web site. Call center may notify location of bag to airline. Potential customers would include passengers and luggage manufacturers.

TRUCK AND FLEET TRACKING

An after market installation of a tracking device in trucks comprising a GPS receiver and a transceiver. Technology may be scalable "horizontally" and also integrated to possible vertical applications. The device could be used to locate trucks at all times. Help fleet owners and manufacturers to improve logistics management. Many "vertical" applications, i.e., improve real-time routing decisions, just in time production applications, delivery scheduling. Potential customers would include fleet owners, manufacturers, distribution companies, utilities, other businesses, government.

In the foregoing description, the method and the system of the present invention have been described with reference to specific embodiments. It is to be understood and expected that variations in the principles of the method and the system herein disclosed may be made by one of ordinary skill in the art and it is intended that such modifications, changes, and substitutions are to be included within the scope of the present invention as set forth in the appended claims. The specification and the drawings are accordingly to be regarded in an illustrative, rather than in a restrictive sense.

What is claimed is:

1. A system for localizing and sensing objects and providing alerts to users, the system comprising:
   a plurality of remote localizing and sensing devices associated with the objects, each remote localizing and sensing device including:
      a localization receiver for receiving localization signals;
      one or more sensors for providing sensor data;
      memory for storing the alert threshold values pertaining to one or more of the sensors and location;
      a processor configured to determine location based on the localization signals and to signal alerts by comparing the localization signals and sensor data to the alert threshold values; and
      a modem for communicating the alerts, the location and the sensor data to an ASP;
   a plurality of user alert devices for receiving the alerts, the location and the sensor data;
   a plurality of user interface devices for receiving from the users indication of the alert threshold values; and
   an application service provider (ASP) for receiving the alert threshold values from the user interface devices, the ASP including:
      a database for associating each user with a particular remote localizing and sensing device and associating the particular remote localizing and sensing device to particular alert threshold values and associating the particular remote localizing and sensing device to a group of the plurality of alert devices;
      a processor for communicating the particular alert threshold values to the particular remote localizing and sensing device; and
      a processor for communicating alerts generated by the particular remote localizing and sensing device and sensor data from the particular remote localizing and sensing device to the particular alert devices according to a predetermined priority.

* * * * *